(12) United States Patent
Nie

(10) Patent No.: US 12,406,367 B2
(45) Date of Patent: *Sep. 2, 2025

(54) IMAGE ENHANCEMENT TO ENABLE IMPROVED NUCLEI DETECTION AND SEGMENTATION

(71) Applicant: Ventana Medical Systems, Inc., Tucson, AZ (US)

(72) Inventor: Yao Nie, Sunnyvale, CA (US)

(73) Assignee: Ventana Medical Systems, Inc., Tucson, AZ (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/627,390

(22) Filed: Apr. 4, 2024

(65) Prior Publication Data

US 2024/0273719 A1 Aug. 15, 2024

Related U.S. Application Data

(63) Continuation of application No. 17/213,394, filed on Mar. 26, 2021, now Pat. No. 11,978,200, which is a
(Continued)

(51) Int. Cl.
*G06V 10/00* (2022.01)
*G06T 7/00* (2017.01)
(Continued)

(52) U.S. Cl.
CPC .......... *G06T 7/0012* (2013.01); *G06V 10/457* (2022.01); *G06V 20/695* (2022.01);
(Continued)

(58) Field of Classification Search
CPC ......... G06T 7/0012; G06T 7/11; G06T 7/155; G06T 7/45; G06T 7/215; G06T 7/246;
(Continued)

(56) References Cited

U.S. PATENT DOCUMENTS 5,978,497 A * 11/1999 Lee ........................ G06V 20/69
382/173
7,933,435 B2 4/2011 Hunter et al.
(Continued)

FOREIGN PATENT DOCUMENTS

JP 2005227097 A 8/2005
JP 2008545959 A 12/2008
(Continued)

OTHER PUBLICATIONS

Hodneland, A Unified Framework for Automated 3-D Segmentation of Surface-Stained Living Cells and a Comprehensive Segmentation Evaluation, IEEE Transactions on Medical Imaging, vol. 28, No. 5, May 2009.
(Continued)

*Primary Examiner* — Amir Alavi
(74) *Attorney, Agent, or Firm* — Charney IP Law LLC; Thomas M. Finetti

(57) ABSTRACT

Aspects of the present disclosure pertain to systems and methods for enhancing brightfield or darkfield images to better enable nucleus detection. In some embodiments, the systems and methods described herein are useful for identifying membrane stain biomarkers as well as nuclear/cytoplasm stain biomarkers in stained images of biological samples. In some embodiments, the presently disclosed systems and methods enable quick and accurate nucleus detection in stained images of biological samples, especially for original stained images of biological samples where the nuclei appear faint.

20 Claims, 32 Drawing Sheets

Related U.S. Application Data continuation of application No. PCT/US2019/055529, filed on Oct. 10, 2019.

(60) Provisional application No. 62/745,730, filed on Oct. 15, 2018.

(51) Int. Cl.
*G06V 10/44* (2022.01)
*G06V 20/69* (2022.01)

(52) U.S. Cl.
CPC ............ *G06T 2207/10056* (2013.01); *G06T 2207/30024* (2013.01)

(58) Field of Classification Search
CPC . G06T 2207/10056; G06T 2207/30024; G06T 2207/20041; G06T 2207/20212; G06T 5/008; G06T 5/00; G06V 10/457; G06V 20/695; G06V 10/82; G06K 9/00147; G06K 9/0014; G06K 9/4638
See application file for complete search history.

(56) References Cited

U.S. PATENT DOCUMENTS

| | | | |
|---|---|---|---|
| 8,060,348 B2 | 11/2011 | Cline et al. | |
| 8,107,711 B2 | 1/2012 | Ingermanson et al. | |
| 8,594,411 B2 | 11/2013 | Yoshihara et al. | |
| 8,718,340 B2* | 5/2014 | Madabhushi | G06T 7/0012 382/128 |
| 8,831,327 B2* | 9/2014 | Santamaria-Pang | G16B 40/20 382/133 |
| 8,995,740 B2 | 3/2015 | Santamaria-Pang et al. | |
| 9,122,907 B2* | 9/2015 | Lee | G06T 7/11 |
| 9,971,931 B2 | 5/2018 | Ajemba et al. | |
| 10,083,341 B2* | 9/2018 | Vu | G06V 20/695 |
| 10,388,014 B2* | 8/2019 | Yuan | G06T 7/0012 |
| 10,475,190 B2* | 11/2019 | Sarkar | G06V 20/695 |
| 10,801,015 B2 | 10/2020 | Bhatia et al. | |
| 11,842,483 B2* | 12/2023 | Bredno | G06T 7/0012 |
| 11,922,681 B2* | 3/2024 | Nie | G06F 18/231 |
| 11,978,200 B2* | 5/2024 | Nie | G06V 20/695 |
| 12,001,935 B2* | 6/2024 | Sjögren | G06N 3/092 |
| 2005/0136549 A1 | 6/2005 | Gholap et al. | |
| 2011/0234812 A1 | 9/2011 | Grunkin et al. | |
| 2011/0286654 A1 | 11/2011 | Krishnan | |
| 2019/0333197 A1* | 10/2019 | Kask | G06T 5/40 |
| 2020/0193139 A1 | 6/2020 | Behrooz et al. | |
| 2021/0295507 A1 | 9/2021 | Nie | |

FOREIGN PATENT DOCUMENTS

| | | | |
|---|---|---|---|
| JP | 2015208420 A | 11/2015 | |
| JP | 2018529950 A | 10/2018 | |
| WO | 2012016242 A2 | 2/2012 | |

OTHER PUBLICATIONS

Can, Techniques for Cellular and Tissue-Based Image Quantitation of Protein Biomarkers, Published in: J. Rittscher, R. Machiraju, S.T.C. Wong; Microscopic Image Analysis for Lifescience Applications, 2018.

Ajemba, Integrated segmentation of cellular structures, Medical Imaging 2011: Image Processing, edited by Benoit M. Dawant, David R. Haynor, Proc. of SPIE vol. 7962, 79620I-1.

B. Pang, Y. Zhang, Q. Chen, Z. Gao, Q. Peng and X. You, "Cell Nucleus Segmentation in Color Histopathological Imagery Using Convolutional Networks," 2010 Chinese Conference on Pattern Recognition (CCPR), Chongqing, China, 2010, pp. 1-5, doi: 10.1109/CCPR.2010.5659313.

Torizawa, Using Multi-Imaging Technique for Cell Membrane Extraction in Hepatic Histologic Images, 2009, IEICE.

Santamaria-Pang, Cell Segmentation and Classification Via Unsupervised Shape Ranking, 2013 IEEE 10th International Symposium on Biomedical Imaging, San Francisco, CA, Apr. 7- 11, 2013.

International Search Report and Written Opinion for PCT/US2019/055529, mailed on Dec. 18, 2019.

International Search Report and Written Opinion for PCT/US2019/055529, mailed Dec. 18, 2019.

Ajemba Peter et al, "Integrated segmentation of cellular structures", Medical Imaging 2011: Image Processing, SPIE, 1000 20th St. Bellingham WA 98225-6705 USA, vol. 7962, No. 1, Mar. 3, 2011 (Mar. 3, 2011), p. 1-10.

Ali Can et al, "Techniques for Cellular Quantitation of Cancer Biomarkers", "Analytical Chemistry", p. 1-29, Jun. 1, 2018 (Jun. 1, 2018), USAmerican Chemical Society.

Hodneland E et al, "A Unified Framework for Automated 3-D Segmentation of Surface-Stained Living Cells and a Comprehensive Segmentation Evaluation", IEEE Transactions On Medical Imaging, IEEE Service Center, Piscataway, NJ, US, vol. 28, No. 5, May 1, 2009 (May 1, 2009 ), p. 720-738.

* cited by examiner

| 2D | | Orientation pattern |
|---|---|---|
| $\lambda_1$ | $\lambda_2$ | |
| N | N | Noisy, no preferred direction |
| L | H− | Tubular structure (bright) |
| L | H+ | Tubular structure (dark) |
| H− | H− | Blob-like structure (bright) |
| H+ | H+ | Blob-like structure (dark) |

FIG. 10B

IMAGE ENHANCEMENT TO ENABLE IMPROVED NUCLEI DETECTION AND SEGMENTATION

CROSS-REFERENCE TO RELATED APPLICATIONS

This application is a continuation of U.S. patent application Ser. No. 17/213,394, filed on Mar. 26, 2021, which application is a continuation of International Application No. PCT/US2019/055529 filed on Oct. 10, 2019, which application claims priority to and the benefit of the filing date of U.S. Patent Application No. 62/745,730 filed on Oct. 15, 2018, the disclosure of which is hereby incorporated by reference herein in its entirety.

BACKGROUND OF THE DISCLOSURE

Digital pathology involves scanning of whole histopathology or cytopathology glass slides into digital images interpretable on a computer screen. These images are to be processed subsequently by an imaging algorithm or interpreted by a pathologist. In order to examine tissue sections (which are virtually transparent), tissue sections are prepared using colored histochemical stains that bind selectively to cellular components. Color-enhanced, or stained, cellular structures are used by clinicians or a computer-aided diagnosis (CAD) algorithm to identify morphological markers of a disease, and to proceed with therapy accordingly. Observing the assay enables a variety of processes, including diagnosis of disease, assessment of response to treatment, and development of new drugs to fight disease.

Immunohistochemical (IHC) slide staining can be utilized to identify proteins in cells of a tissue section and hence is widely used in the study of different types of cells, such as cancerous cells and immune cells in biological tissue. Thus, IHC staining may be used in research to understand the distribution and localization of the differentially expressed biomarkers of immune cells (such as T-cells or B-cells) in a cancerous tissue for an immune response study. For example, tumors often contain infiltrates of immune cells, which may prevent the development of tumors or favor the outgrowth of tumors.

In-situ hybridization (ISH) can be used to look for the presence of a genetic abnormality or condition such as amplification of cancer-causing genes specifically in cells that, when viewed under a microscope, morphologically appear to be malignant. In situ hybridization (ISH) employs labeled DNA or RNA probe molecules that are anti-sense to a target gene sequence or transcript to detect or localize targeted nucleic acid target genes within a cell or tissue sample. ISH is performed by exposing a cell or tissue sample immobilized on a glass slide to a labeled nucleic acid probe which is capable of specifically hybridizing to a given target gene in the cell or tissue sample. Several target genes can be simultaneously analyzed by exposing a cell or tissue sample to a plurality of nucleic acid probes that have been labeled with a plurality of different nucleic acid tags. By utilizing labels having different emission wavelengths, simultaneous multicolored analysis may be performed in a single step on a single target cell or tissue sample. For example, INFORM HER2 Dual ISH DNA Probe Cocktail Assay from Ventana Medical Systems, Inc., is intended to determine HER2 gene status by enumeration of the ratio of the HER2 gene to Chromosome 17. The HER2 and Chromosome 17 probes are detected using a two-color chromogenic ISH in formalin-fixed, paraffin-embedded human breast cancer tissue specimens.

BRIEF SUMMARY OF THE DISCLOSURE

Cell detection is an important task for quantified evaluation of biomarker expression in histopathological images stained by IHC assays. There exist many nucleus detection and segmentation methods in the literature for both brightfield images (e.g., IHC and H&E) as well as darkfield images (e.g., immunofluorescence). Most of the methods focus on developing feature extraction or machine learning techniques for nucleus detection/segmentation in an original RGB image or a single channel image that represents the nucleus stain (e.g., hematoxylin channel image obtained through color unmixing algorithm for brightfield IHC, or the DAPI channel image obtained directly through immunofluorescence multiplex imaging). In some instances, the nuclear stain quality may be poor or not even present in the image (see, for example, FIGS. 6A and 8A), thus making nucleus detection challenging.

Aspects of the present disclosure pertain to systems and methods designed to enhance brightfield or darkfield images to better enable nucleus detection within stained images of biologicals samples. In some embodiments, the image processing systems and methods disclosed herein enable existing cell detection algorithms to be applied to a wider range of cell staining patterns, including those having poor nuclear stain quality. In some embodiments, an image pre-processing algorithm is applied to enhance the cell boundary defining structures (e.g. the natural boundary delineated by a nucleus stain, or the boundary defined by a separate membrane/cytoplasm stain) such that all the cells, regardless of their original morphology, appear as similar patterns (e.g. "blobs") in an enhanced image (i.e. an image generated after the application of the image pre-processing algorithm). In some embodiments, the "boundary structure" includes the natural boundary delineated by a nuclear stain, or the boundary defined by a separate membrane stain. In some embodiments, a Frangi filter is utilized to enhance a boundary structure or a continuous edge surrounding the cell nuclei. In some embodiments, the image enhanced through the application of the Frangi filter may be further processed before nuclei are detected. For example, the enhanced image may be combined with at least a second image, such as one of the original input images, to generate a refined image onto which an automated nucleus detection algorithm may be applied. Automated cell detection algorithms may then be run on the enhanced image, so as to provide computationally quicker and more accurate detection results. Examples of the methods as applied both darkfield and brightfield images are disclosed herein.

In one aspect of the present disclosure is a method of enhancing the detection of cell nuclei within an image of a stained biological sample comprising: obtaining one or more input image channel images (e.g. image channel images obtained after unmixing a multiplexed brightfield image), wherein each obtained input image channel image comprises signals corresponding to one of a membrane stain (e.g. a lymphocyte biomarker membrane stain) or a nuclear stain (hematoxylin); enhancing the signals corresponding to the membrane stain or the nuclear stain in a first of the one or more obtained input channel images by applying a filter adapted to enhance boundary structures (e.g. a Frangi filter) to the first of the one or more obtained input channel images to provide a first enhanced image; and detecting nuclei (e.g.

with an automated nuclei detection algorithm) within a refined image derived from at least the first enhanced image. In some embodiments, the membrane stain is 3,3'-Diaminobenzidine (DAB) and the nuclear stain is hematoxylin. In some embodiments, the obtained input channel images are unmixed brightfield images. In some embodiments, the obtained input channel images are darkfield images.

In some embodiments, the refined image is generated by thresholding the first enhanced image. In some embodiments, the refined image is generated by: (i) combining the first enhanced image with at least a second image to provide a combination image; and (ii) thresholding the combination image. In some embodiments, the second image is a second enhanced image (i.e. a second obtained input channel image which has had a Frangi filter applied thereto). In some embodiments, the second enhanced image is derived from a second of the one or more input channel images. In some embodiments, the second enhanced image is a derived from the first of the one or more input channel images, and wherein first and second enhanced images are generated by applying the Frangi filter at a different scaling factor (e.g. a scaling factor of 2 applied to one image, and a scaling factor of 5 applied to another image).

In some embodiments, both the first and second of the one or more input channel images comprise a membrane stain. In some embodiments, the membrane stain is selected from the group consisting of a tumor membrane stain and a lymphocyte membrane stain. In some embodiments, one of the first and second of the one or more input channel images comprises a nuclear stain.

In some embodiments, a combination image is derived from at least the first enhanced image, a second image, and a third image. In some embodiments, at least one of the second image or the third image has been enhanced by application of the Frangi filter. In some embodiments, the second image comprises a membrane stain and wherein the third image comprises a nuclear stain. In some embodiments, a combination image is further derived from a fourth image.

In some embodiments, the refined image is a combination image derived by combining an inverse of the first enhanced image at least a second image. In some embodiments, one of the first enhanced image or the second image comprises a nuclear stain. In some embodiments, the at least the second image is a second of the one or more input channel images. In some embodiments, the second of the one or more input channel images comprises a nuclear stain, and wherein the first of the one or more input channel images comprises a membrane stain.

In another aspect of the present disclosure is a method of enhancing the detection of cell nuclei within an image of a stained biological sample comprising: (a) obtaining one or more input image channel images, wherein each obtained input image channel image comprises signals corresponding to one of a membrane stain or a nuclear stain; (b) enhancing the signals corresponding to the membrane stain or the nuclear stain in a first of the one or more obtained input channel images by applying a Frangi filter to the first of the one or more obtained input channel images to provide a first enhanced image; (c) generating a refined image based at least on the first enhanced image, and (d) automatically detecting nuclei within the generated refined image, wherein the nuclei are detected by applying an automatic nuclei detection algorithm. In some embodiments, the detected nuclei are then superimposed, i.e. visualized, over an original whole slide image or any portion thereof. In some embodiments, the membrane stain is DAB and the nuclear stain is hematoxylin. In some embodiments, the nuclear stain is DAPI. In some embodiments, the obtained input channel images are unmixed brightfield images. In some embodiments, the obtained input channel images are darkfield images.

In some embodiments, the refined image is a segmentation mask image. In some embodiments, the segmentation mask image is derived from a combination image, the combination image being generated from at least the first enhanced image and a second image, whereby the at least the first enhanced image and the second image are combined in an additive manner or in a weighted manner. In some embodiments, the combination image is derived from at least first and second enhanced images, such as a combination of membrane enhanced images and nuclear stain enhanced images.

In some embodiments, the refined image is a combination image which is derived from at least the first enhanced image and a second image, e.g. a second enhanced image, another obtained input image or further processed variant thereof. In some embodiments, the first and second images are combined in an additive manner, i.e. they are summed together. In some embodiments, the first enhanced image is further processed prior to the generation of the combination image. In some embodiments, further processing of the first enhanced image comprises generating an inverse of the first enhanced image.

In another aspect of the present disclosure is a method of enhancing detection of cell nuclei within an image of a stained biological sample comprising: obtaining one or more input image channel images, wherein each obtained input image channel image comprises signals corresponding to one of a membrane stain or a nuclear stain; enhancing the signals corresponding to the membrane stain or the nuclear stain in a first of the one or more obtained input channel images by applying a Frangi filter to the first of the one or more obtained input channel images to provide a first enhanced image; generating a refined image based at least upon the first enhanced image; and detecting nuclei within the refined image. In some embodiments, the refined image is generated by thresholding the first enhanced image. In some embodiments, the refined image is generated by combining the first enhanced image with at least a second image to provide a combined image. In some embodiments, the refined image is generated by: (i) combining the first enhanced image with at least a second image to provide a combined image; and (ii) thresholding the combined image. In some embodiments, the second image is a second of the one or more input channel images. In some embodiments, the second image is a second enhanced image. In some embodiments, any combination image may be derived from three or more images, including any combination of original input image channel images or enhanced images.

In another aspect of the present disclosure is a method of enhancing detection of cell nuclei within an image of a stained biological sample comprising: (a) obtaining at least one input channel image comprising signals corresponding to a nuclear stain; (b) enhancing the signals corresponding to the nuclear stain in the at least one obtained input channel image comprising signals corresponding to the nuclear stain by applying a Frangi filter to the at least one obtained input channel image comprising signals corresponding to the nuclear stain to provide a first enhanced image; (c) generating a refined image from at least the first enhanced image; and (d) automatically detecting nuclei within the generated refined image, wherein the nuclei are detected by applying an automatic nuclei detection algorithm. In some embodiments, the method further comprises: obtaining at least one input channel image comprising signals correspond to a membrane stain; enhancing the membrane stain in the at least one obtained input channel image comprising signals corresponding to the membrane stain by applying a Frangi filter to the at least one obtained input channel image comprising signals corresponding to the membrane stain to provide a second enhanced image. In some embodiments, at least the first and second enhanced images are combined, such as in an additive or weighted manner, to provide the refined image. In some embodiments, the combination image may be used to detect nuclei; or, alternatively, a threshold may be applied to the combination image and the resulting segmentation mask image may be used to detect nuclei.

In another aspect of the present disclosure is a method of enhancing detection of cell nuclei within an image of a stained biological sample comprising: (a) obtaining at least one input channel image comprising signals corresponding to a membrane stain; (b) enhancing the signals corresponding to the membrane stain in the at least one obtained input channel image comprising signals corresponding to the membrane stain by applying a Frangi filter to the at least one obtained input channel image comprising signals corresponding to the membrane stain to provide a first enhanced image; (c) generating a refined image from at least the first enhanced image; and (d) automatically detecting nuclei within the generated refined image, wherein the nuclei are detected by applying an automatic nuclei detection algorithm. In some embodiments, the refined image is a combination image comprising: (i) a further processed variant of the first enhanced image, and (ii) a second obtained input channel image, the second obtained image channel image comprising signals corresponding to a nuclear stain. In some embodiments, the further processed variant of the first enhanced image is an inverse of the first enhanced image. In some embodiments, the other obtained input channel image comprises signals corresponding to hematoxylin.

In another aspect of the present disclosure is a method of enhancing detection of cell nuclei within an image of a biological sample stained with hematoxylin and eosin and/or stained for the presence of a plurality of biomarkers comprising: obtaining one or more input image channel images, wherein each obtained input image channel image comprises signals corresponding to one of hematoxylin, DAPI, or a stain indicative of the presence of a biomarker; enhancing boundary structures within at least a first of the one or more input image channel images by applying a Frangi filter to the at least the first of the one or more image channel images to provide at least a first Frangi enhanced image channel image; and detecting nuclei within a refined image derived from the at least one Frangi enhanced image channel.

In some embodiments, the refined image is a segmentation mask image. In some embodiments, the segmentation mask image is generated by thresholding the at least the first Frangi enhanced image channel image. In some embodiments, the segmentation mask image is generated by thresholding a combination image derived from the at least the first Frangi enhanced image channel image. In some embodiments, the combination image is derived by combining (i) the at least the first Frangi enhanced image channel image; and (ii) at least one of (a) a second of the one or more input image channel images, and/or (b) a second Frangi enhanced image channel image. In some embodiments, the combination image comprises a combination of the at least the first Frangi enhanced image channel image and the second Frangi enhanced image channel image. In some embodiments, the first Frangi enhanced image channel image and the second Frangi enhanced image channel images are derived from different input image channel images. In some embodiments, the first Frangi enhanced image channel image and the second Frangi enhanced image channel image are derived from the same input image channel image. In some embodiments, the first and second Frangi enhanced image channel images are derived by applying the Frangi filter at a different scaling factor. In some embodiments, one of the first or second Frangi enhanced image channel images comprise enhanced membrane boundaries; and another of the first or second Frangi enhanced image channel images comprise enhanced nuclear boundaries. In some embodiments, the combination image comprises a combination of the at least the first Frangi enhanced image channel image, the second Frangi enhanced image channel image, and a third Frangi enhanced image channel image, wherein at least two of the first, second, or third Frangi enhanced image channel images are derived from different input channel images.

In some embodiments, the refined image is a combination image derived by combining (i) an inverse of the first Frangi enhanced image channel image; and (ii) a second of the one or more input channel images. In some embodiments, the combination image is derived by combining (i) the at least the first Frangi enhanced image channel image; and (ii) at least one of (a) a second of the one or more input image channel images, and/or (b) a second Frangi enhanced image channel image.

In another aspect of the present disclosure is a system for enhancing detection of cell nuclei within an image of a stained biological sample, the system comprising: (i) one or more processors, and (ii) one or more memories coupled to the one or more processors, the one or more memories to store computer-executable instructions that, when executed by the one or more processors, cause the system to perform operations comprising: obtaining one or more input image channel images, wherein each obtained input image channel image comprises signals corresponding to a membrane stain or a nuclear stain; enhancing the signals corresponding to the membrane stain or nuclear stain in a first of the one or more obtained input channel images by applying a Frangi filter to the first of the one or more obtained input channel images to provide a first enhanced image; generating a refined image based at least upon the first enhanced image; and detecting nuclei within the generated refined image.

In some embodiments, the first of the one or more obtained input channel images comprises a membrane stain. In some embodiments, the refined image is generated by combining (i) the first enhanced image or a further processed variant thereof, and (ii) a second of the one or more obtained input channel images, wherein the second of the one or more obtained input channel images comprises a nuclear stain. In some embodiments, the system further comprises instructions for generating a second enhanced image from a second of the one or more obtained input channel images. In some embodiments, the refined image is generated by thresholding the first enhanced image.

In some embodiments, the refined image is generated by (a) computing a combination image, the combination image derived at least from the first enhanced image and the second enhanced image, and (b) applying a threshold to the computed combination image. In some embodiments, the second of the one or more obtained input channel images comprises membrane staining. In some embodiments, the second of the one or more obtained input channel images comprises nuclear staining. In some embodiments, the combination is derived from the first and second enhanced images and at least a third enhanced image, the third enhanced image comprising signals corresponding to a nuclear stain.

In another aspect of the present disclosure is a non-transitory computer-readable medium storing instructions for enhancing detection of cell nuclei within an image of a stained biological sample comprising: obtaining one or more input image channel images, wherein each obtained input image channel image comprises signals corresponding to one of a membrane stain or a nuclear stain; enhancing the signals corresponding to the membrane stain or the nuclear stain in a first of the one or more obtained input channel images by applying a filter adapted to enhance boundary structures to the first of the one or more obtained input channel images to provide a first enhanced image; generating a combination image based at least upon the first enhanced image; and detecting nuclei within the generated combination image or a segmentation mask image derived from the generated combination image. In some embodiments, the filter adapted to enhance boundary structures is an image preprocessing algorithm. In some embodiments, the filter adapted to enhance boundary structures is a Frangi filter. In some embodiments, the combination image is generated by computing a summation of the first enhanced image or a further processed variant thereof and at least a second image. In some embodiments, the second image is a second of the one or more obtained input channel images. In some embodiments, the first of the one or more obtained input channel images comprises a membrane stain, and wherein the second of the one or more obtained input channel images comprises a nuclear stain. In some embodiments, the combination image is derived from an inverse of the first enhanced image.

BRIEF DESCRIPTION OF THE FIGURES

For a general understanding of the features of the disclosure, reference is made to the drawings. In the drawings, like reference numerals have been used throughout to identify identical elements.

FIG. 6A illustrates an original image where the DAB stain is very strong.

FIG. 6B illustrates the hematoxylin channel image generated by color unmixing algorithm, where the morphology of each individual nucleus is hard to be recognized.

FIG. 6C illustrates the unmixed DAB image.

FIG. 6D illustrates the output image after application of the Frangi filter with a scaling factor of 2.

FIG. 6E illustrates the combination of the hematoxylin channel image (FIG. 6B) with an inverse of the Frangi filter enhanced image of FIG. 6C.

FIG. 10B summarizes how the 2-dimensional Hessian eigenvectors indicate the presence of local structures, where H=high, L=low, N=noisy, usually small, +/− indicate the sign of the eigenvalue.

DETAILED DESCRIPTION

Figure 1:
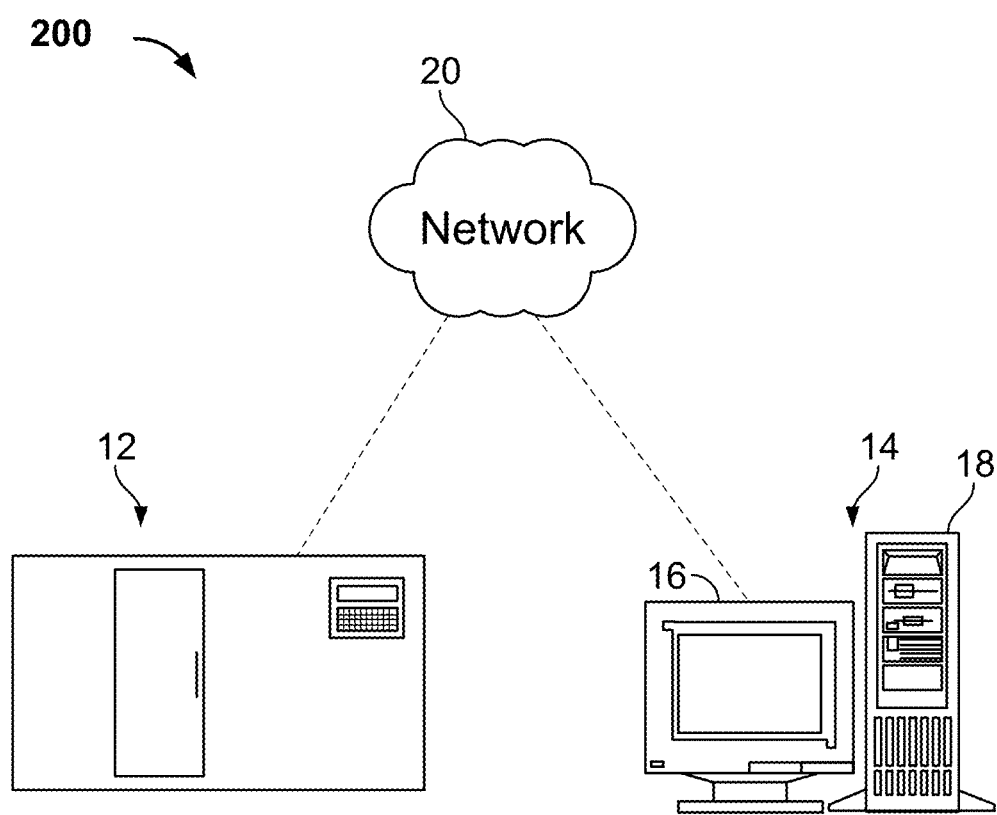
FIG. 1 illustrates a representative digital pathology system including an image scanner and a computer system in accordance with some embodiments.

It should also be understood that, unless clearly indicated to the contrary, in any methods claimed herein that include more than one step or act, the order of the steps or acts of the method is not necessarily limited to the order in which the steps or acts of the method are recited.

As used herein, the singular terms "a," "an," and "the" include plural referents unless context clearly indicates otherwise. Similarly, the word "or" is intended to include "and" unless the context clearly indicates otherwise. The term "includes" is defined inclusively, such that "includes A or B" means including A, B, or A and B.

As used herein, the term "or" should be understood to have the same meaning as "and/or" as defined above. For example, when separating items in a list, "or" or "and/or" shall be interpreted as being inclusive, i.e., the inclusion of at least one, but also including more than one, of a number or list of elements, and, optionally, additional unlisted items. Only terms clearly indicated to the contrary, such as "only one of or "exactly one of," or, when used in the claims, "consisting of," will refer to the inclusion of exactly one element of a number or list of elements. In general, the term "or" as used herein shall only be interpreted as indicating exclusive alternatives (i.e. "one or the other but not both") when preceded by terms of exclusivity, such as "either," "one of," "only one of" or "exactly one of." "Consisting essentially of," when used in the claims, shall have its ordinary meaning as used in the field of patent law.

As used herein, the terms "comprising," "including," "having," and the like are used interchangeably and have the same meaning. Similarly, "comprises," "includes," "has," and the like are used interchangeably and have the same meaning. Specifically, each of the terms is defined consistent with the common United States patent law definition of "comprising" and is therefore interpreted to be an open term meaning "at least the following," and is also interpreted not to exclude additional features, limitations, aspects, etc. Thus, for example, "a device having components a, b, and c" means that the device includes at least components a, b, and c. Similarly, the phrase: "a method involving steps a, b, and c" means that the method includes at least steps a, b, and c. Moreover, while the steps and processes may be outlined herein in a particular order, the skilled artisan will recognize that the ordering steps and processes may vary.

As used herein, the phrase "at least one," in reference to a list of one or more elements, should be understood to mean at least one element selected from any one or more of the elements in the list of elements, but not necessarily including at least one of each and every element specifically listed within the list of elements and not excluding any combinations of elements in the list of elements. This definition also allows that elements may optionally be present other than the elements specifically identified within the list of elements to which the phrase "at least one" refers, whether related or unrelated to those elements specifically identified. Thus, as a non-limiting example, "at least one of A and B" (or, equivalently, "at least one of A or B," or, equivalently "at least one of A and/or B") can refer, in one embodiment, to at least one, optionally including more than one, A, with no B present (and optionally including elements other than B); in another embodiment, to at least one, optionally including more than one, B, with no A present (and optionally including elements other than A); in yet another embodiment, to at least one, optionally including more than one, A, and at least one, optionally including more than one, B (and optionally including other elements); etc.

As used herein, the terms "biological sample," "biological sample," "specimen" or the like refer to any sample including a biomolecule (such as a protein, a peptide, a nucleic acid, a lipid, a carbohydrate, or a combination thereof) that is obtained from any organism including viruses. Other examples of organisms include mammals (such as humans; veterinary animals like cats, dogs, horses, cattle, and swine; and laboratory animals like mice, rats, and primates), insects, annelids, arachnids, marsupials, reptiles, amphibians, bacteria, and fungi. Biological samples include biological samples (such as tissue sections and needle biopsies of tissue), cell samples (such as cytological smears such as Pap smears or blood smears or samples of cells obtained by microdissection), or cell fractions, fragments, or organelles (such as obtained by lysing cells and separating their components by centrifugation or otherwise). Other examples of biological samples include blood, serum, urine, semen, fecal matter, cerebrospinal fluid, interstitial fluid, mucous, tears, sweat, pus, biopsied tissue (for example, obtained by a surgical biopsy or a needle biopsy), nipple aspirates, cerumen, milk, vaginal fluid, saliva, swabs (such as buccal swabs), or any material containing biomolecules that is derived from a first biological sample. In certain embodiments, the term "biological sample" as used herein refers to a sample (such as a homogenized or liquefied sample) prepared from a tumor or a portion thereof obtained from a subject.

As used herein, a "blob" refers to a region of a digital image in which some properties are constant or approximately constant. In some embodiments, all the pixels in a blob can be considered in some sense to be similar to each other.

As used herein, the term "image data" encompasses raw image data acquired from the biological sample, such as by means of an optical sensor or sensor array, or pre-processed image data. In particular, the image data may comprise a pixel matrix.

As used herein, the terms "image," "image scan," or "scanned image" encompasses raw image data acquired from the biological sample, such as by means of an optical sensor or sensor array, or pre-processed image data. In particular, the image data may comprise a pixel matrix.

As used herein, the terms "multi-channel image" or "multiplex image" encompasses a digital image obtained from a biological sample in which different biological structures, such as nuclei and tissue structures, are simultaneously stained with specific fluorescent dyes, quantum dots, chromogens, etc., each of which fluoresces or are otherwise detectable in a different spectral band thus constituting one of the channels of the multi-channel image.

As used herein, the term "slide" refers to any substrate (e.g., substrates made, in whole or in part, glass, quartz, plastic, silicon, etc.) of any suitable dimensions on which a biological specimen is placed for analysis, and more particularly to a "microscope slide" such as a standard 3 inch by 1-inch microscope slide or a standard 75 mm by 25 mm microscope slide. Examples of biological specimens that can be placed on a slide include, without limitation, a cytological smear, a thin tissue section (such as from a biopsy), and an array of biological specimens, for example a tissue array, a cellular array, a DNA array, an RNA array, a protein array, or any combination thereof. Thus, in one embodiment, tissue sections, DNA samples, RNA samples, and/or proteins are placed on a slide at particular locations. In some embodiments, the term slide may refer to SELDI and MALDI chips, and silicon wafers.

As used herein, the term "specific binding entity" refers to a member of a specific-binding pair. Specific binding pairs are pairs of molecules that are characterized in that they bind each other to the substantial exclusion of binding to other molecules (for example, specific binding pairs can have a binding constant that is at least 10^3 M−1 greater, 10^4 M−1 greater or 10^5 M−1 greater than a binding constant for either of the two members of the binding pair with other molecules in a biological sample). Particular examples of specific binding moieties include specific binding proteins (for example, antibodies, lectins, avidins such as streptavidins, and protein A). Specific binding moieties can also include the molecules (or portions thereof) that are specifically bound by such specific binding proteins.

As used herein, the terms "stain," "staining," or the like as used herein generally refers to any treatment of a biological specimen that detects and/or differentiates the presence, location, and/or amount (such as concentration) of a particular molecule (such as a lipid, protein or nucleic acid) or particular structure (such as a normal or malignant cell, cytosol, nucleus, Golgi apparatus, or cytoskeleton) in the biological specimen. For example, staining can provide contrast between a particular molecule or a particular cellular structure and surrounding portions of a biological specimen, and the intensity of the staining can provide a measure of the amount of a particular molecule in the specimen. Staining can be used to aid in the viewing of molecules, cellular structures, and organisms not only with bright-field microscopes, but also with other viewing tools, such as phase contrast microscopes, electron microscopes, and fluorescence microscopes. Some staining performed by the system can be used to visualize an outline of a cell. Other staining performed by the system may rely on certain cell components (such as molecules or structures) being stained without or with relatively little staining other cell components. Examples of types of staining methods performed by the system include, without limitation, histochemical methods, immunohistochemical methods, and other methods based on reactions between molecules (including non-covalent binding interactions), such as hybridization reactions between nucleic acid molecules. Particular staining methods include, but are not limited to, primary staining methods (e.g., H&E staining, Pap staining, etc.), enzyme-linked immunohistochemical methods, and in situ RNA and DNA hybridization methods, such as fluorescence in situ hybridization (FISH).

Disclosed herein are systems and methods designed to enhance brightfield and/or darkfield images to better enable nucleus detection within the images. In some embodiments, a filter is applied that is adapted to enhance a boundary structure or a continuous edge surrounding the cell nuclei. In some embodiments, the filter applied is a Frangi filter. Following the generation of the enhanced image, a refined image may be computed, where the refined image is based at least in part on the enhanced image. In some embodiments, the refined image may then be used as the input image for an automated nuclei detection algorithm. Applicant believes that the systems and methods disclosed herein allow for improved nuclei detection, especially in instances where membrane or nuclear stain is weak or not detectable. In some embodiments, the systems and methods are comparatively more efficient and require fewer computing resources to enable detection of cell nuclei. In some embodiments, the systems allow for quicker detection of nuclei than prior art systems.

At least some embodiments of the present disclosure relate to digital pathology systems and methods for analyzing image data captured from biological samples, including biological samples, stained with one or more primary stains (e.g. hematoxylin and eosin (H&E)) and one or more detection probes (e.g. probes containing a specific binding entity which facilitates the labeling of targets within the sample). In some embodiments, the biological specimens are stained for such that cell nuclei and/or cell membranes are detected (e.g. staining the biological sample for the presence of a membrane biomarker, or a nuclear biomarker).

A digital pathology system 200 for imaging and analyzing specimens, in accordance with some embodiments, is illustrated in FIG. 1. In some embodiments, a digital pathology system includes, for example, a digital data processing device, e.g. a computer, comprising an interface for receiving image data from a slide scanner, a camera, a network and/or a storage medium. In other embodiments, a digital pathology system 200 may comprise an imaging apparatus 12 (e.g. an apparatus having means for scanning a specimen-bearing microscope slide) and a computer 14, whereby the imaging apparatus 12 and computer may be communicatively coupled together (e.g. directly, or indirectly over a network 20). The computer system 14 can include a desktop computer, a laptop computer, a tablet, or the like, digital electronic circuitry, firmware, hardware, memory, a computer storage medium, a computer program or set of instructions (e.g. where the program is stored within the memory or storage medium), one or more processors (including a programmed processor), and any other hardware, software, or firmware modules or combinations thereof. For example, the computing system 14 illustrated in FIG. 1 may comprise a computer with a display device 16 and an enclosure 18. The computer can store digital images in binary form (locally, such as in a memory, on a server, or another network connected device). The digital images can also be divided into a matrix of pixels. The pixels can include a digital value of one or more bits, defined by the bit depth. The skilled artisan will appreciate that other computer devices or systems may be utilized and that the computer systems described herein may be communicatively coupled to additional components, e.g. specimen analyzers, microscopes, other imaging systems, automated slide preparation equipment, etc. Some of these additional components and the various computers, networks, etc. that may be utilized are described further herein.

In general, the imaging apparatus 12 (or other image source including pre-scanned images stored in a memory or in one or more memories) can include, without limitation, one or more image capture devices. Image capture devices can include, without limitation, a camera (e.g., an analog camera, a digital camera, etc.), optics (e.g., one or more lenses, sensor focus lens groups, microscope objectives, etc.), imaging sensors (e.g., a charge-coupled device (CCD), a complimentary metal-oxide semiconductor (CMOS) image sensor, or the like), photographic film, or the like. In digital embodiments, the image capture device can include a plurality of lenses that cooperate to prove on-the-fly focusing. An image sensor, for example, a CCD sensor can capture a digital image of the specimen. In some embodiments, the imaging apparatus 12 is a brightfield imaging system, a multispectral imaging (MSI) system or a fluorescent microscopy system. The digitized tissue data may be generated, for example, by an image scanning system, such as a VENTANA DP200 scanner by VENTANA MEDICAL SYSTEMS, Inc. (Tucson, Arizona) or other suitable imaging equipment. Additional imaging devices and systems are described further herein. The skilled artisan will appreciate that the digital color image acquired by the imaging apparatus 12 can be conventionally composed of elementary color pixels. Each colored pixel can be coded over three digital components, each comprising the same number of bits, each component corresponding to a primary color, generally red, green, or blue, also denoted by the term "RGB" components.

Figure 2:
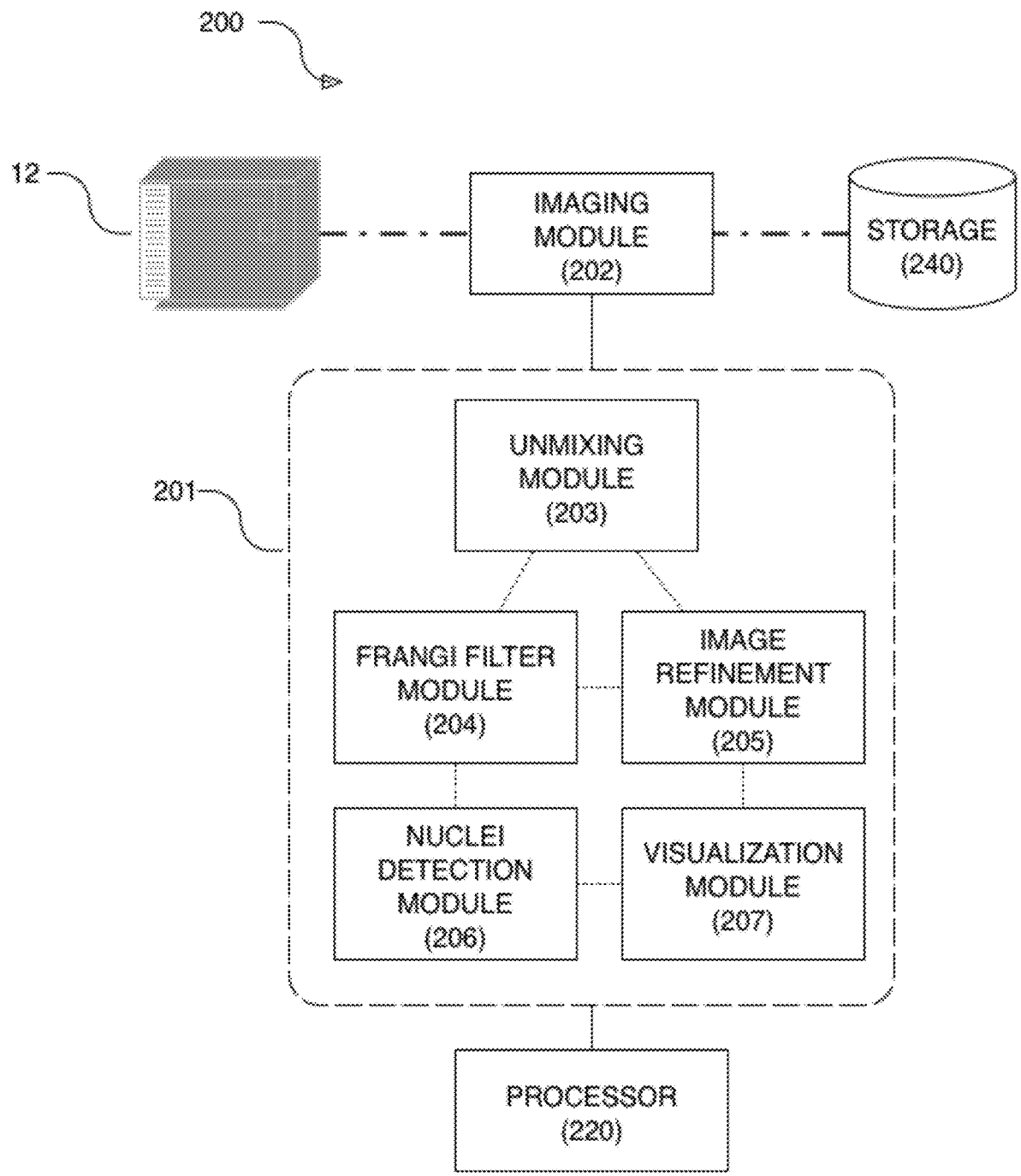
FIG. 2 sets forth various modules that can be utilized in a digital pathology system or within a digital pathology workflow in accordance with some embodiments.

FIG. 2 provides an overview of the various modules utilized within the presently disclosed digital pathology system 200. In some embodiments, the digital pathology system 200 employs a computer device or computer-implemented method having one or more processors 220 and at least one memory 201, the at least one memory 201 storing non-transitory computer-readable instructions for execution by the one or more processors to cause the one or more processors (220) to execute instructions (or stored data) in one or more modules (e.g. modules 202 through 210).

With further reference to FIG. 2, in some embodiments, the system comprises: (a) an imaging module 202 adapted to generate image data of a stained biological sample, e.g. a first image stained for the presence of one or more protein biomarkers and a second image stained for the presence of one or more nucleic acid biomarkers; (b) an unmixing module 203 to unmix acquired images (e.g. brightfield images) having more than one stain into individual channel images; (c) a Frangi filter module 204 adapted to apply a Frangi filter to enhance certain boundary structures within an obtained input image; (d) an image refinement module 205 to further process images, such as a Frangi filter enhanced images; (e) a nuclei detection module 206 to detect nuclei seed centers; and (f) a visualization module 207 for generating certain image overlays. The skilled artisan will also appreciate that additional modules or databases not depicted in FIG. 2 may be incorporated into the workflow. For example, an image pre-processing module may be run to apply certain filters to the acquired images or to identify certain histological and/or morphological structures within the tissue samples. In addition, a region of interest selection module may be utilized to select a particular portion of an image for analysis.

Figure 3A:
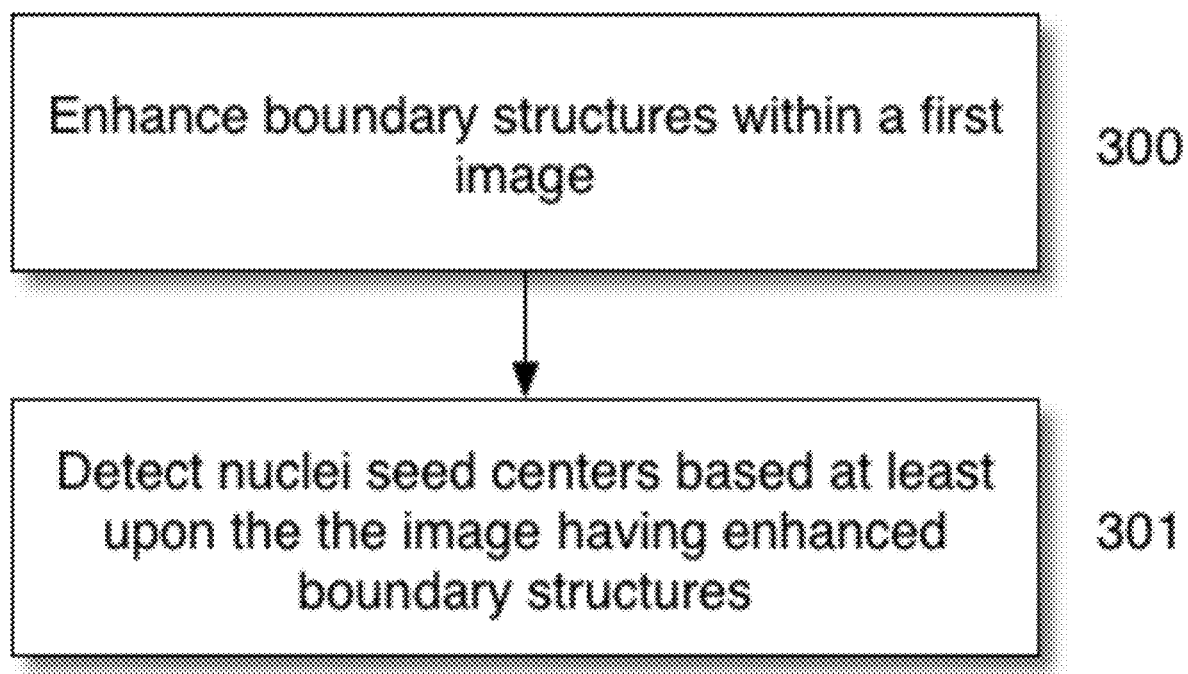
FIGS. 3A and 3B set forth a flowchart illustrating the steps of detecting nuclei in obtained input images in accordance with some embodiments.

Turning to FIG. 3A, the present disclosure provides a computer-implemented system and method of enhancing boundary structures within a first input image (step 300). The boundary structures may be enhanced through application of a Frangi filter, such as with the Frangi filter module 204. In some embodiments, the boundary structures enhanced through application of the Frangi filter include membrane structures, structures in the cytoplasm, and nuclear structures. Following the generation of an image enhanced through the application of a Frangi filter, nuclei seed centers are detected within at least the generated image (step 310). Of course, the boundary structure enhanced image generated at step 300 may be combined (e.g. additive or weighted combinations) with other images, e.g. other obtained input images or other enhanced images, and that combined image, or a variant thereof, may be used for the detection of the nuclei seed centers.

Figure 3B:
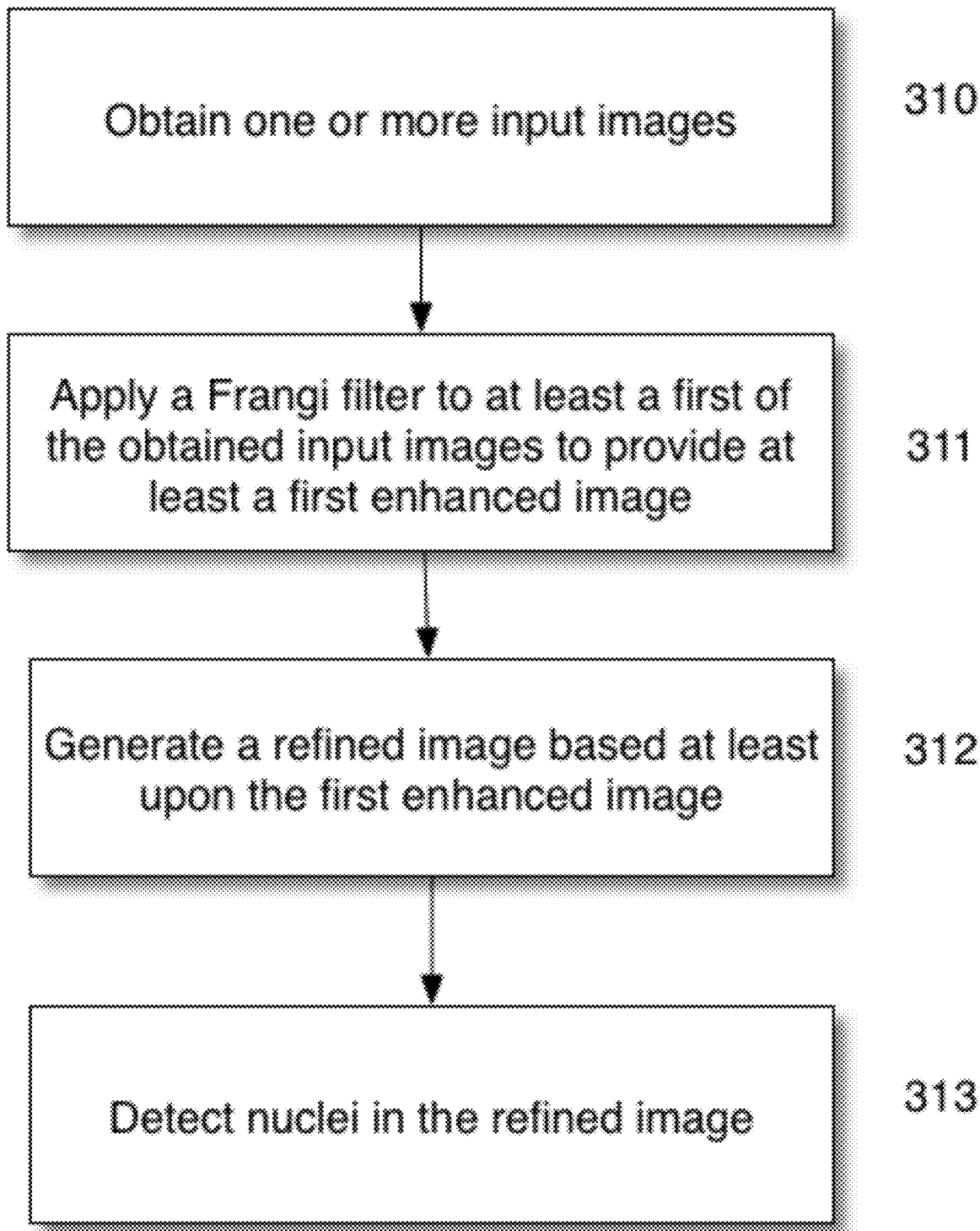

In some embodiments, and with reference to FIG. 3B, a computer-implemented method is provided comprising: (a) obtaining one or more input images, e.g. unmixed image channel images, darkfield images, etc. (step 310); (b) applying a Frangi filter to at least a first of the obtained input images to provide at least a first enhanced image (step 311); (c) generate a refined image based at least upon the first enhanced image (step 312); and (d) detect nuclei in the refined image (step 313). Each of these steps will be described in further detail herein.

Image Acquisition Module

In some embodiments, as an initial step, and with reference to FIG. 2, the digital pathology system 200 runs an imaging module 202 to capture images or image data (such as from a scanning device 12) of a biological sample having one or more stains (step 310). In some embodiments, the images received or acquired are RGB images or multispectral images (e.g. multiplex brightfield and/or darkfield images). In some embodiments, the images captured are stored in memory 201. In some embodiments, the acquired images are used as the one or more obtained input images (see step 310 of FIG. 3B).

The images or image data (used interchangeably herein) may be acquired using the scanning device 12, such as in real-time. In some embodiments, the images are acquired from a microscope or other instrument capable of capturing image data of a specimen-bearing microscope slide, as noted herein. In some embodiments, the images are acquired using a 2D scanner, such as one capable of scanning image tiles, or a line scanner capable of scanning the image in a line-by-line manner, such as the VENTANA DP 200 scanner. Alternatively, the images may be images that have been previously acquired (e.g. scanned) and stored in one or more memories 201 (or, for that matter, retrieved from a server via network 20).

In some embodiments, the images received as input are whole slide images. In other embodiments, the images received as input are portions of a whole slide image. In some embodiments, a whole slide image is broken down into several portions, e.g. tiles, and each portion or tile may be independently analyzed (e.g. using the modules set forth in FIG. 2 and the methods illustrated in at least FIG. 3B). After the portions or tiles are independently analyzed, the data from each portion or tile may be stored independently and/or reported at the whole slide level.

The biological sample may be stained through application of one or more stains, and the resulting image or image data comprises signals corresponding to each of the one or more stains. Chromogenic stains include Hematoxylin, Eosin, Fast Red, or 3,3'-Diaminobenzidine (DAB). In some embodiments, the biological sample is stained with a primary stain (e.g. hematoxylin). In some embodiments, the biological sample is also stained with a secondary stain (e.g. eosin). In some embodiments, the biological sample is stained in an IHC assay for a particular biomarker. Of course, the skilled artisan will appreciate that any biological sample may also be stained with one or more fluorophores.

In some embodiments, the input images are simplex images having only a single stain (e.g., stained with 3,3'-diaminobenzidine (DAB)). In some embodiments, the obtained input channel images are a series of simplex images. In some embodiments, the biological sample may be stained in a multiplex assay for two or more stains (thus providing multiplex images). In some embodiments, the biological samples are stained for at least two biomarkers. In other embodiments, the biological samples are stained for the presence of at least two biomarkers and also stained with a primary stain (e.g. hematoxylin).

In some embodiments, the samples are stained for the presence of at least a lymphocyte marker. Lymphocyte markers include CD3, CD4, and CD8. In general, CD3 is the "universal marker" for T cells. In some embodiments, further analysis (staining) is performed to identify a specific type of T cell, e.g. regulatory, helper, or cytotoxic T cell. For example, CD3+ T-cells can be further distinguished as being cytotoxic T-lymphocytes positive for the CD8 biomarker (CD8 is a specific marker for cytotoxic T lymphocytes). CD3+ T cells can also be distinguished as being cytotoxic T-lymphocytes positive for Perforin (Perforin is a membranolytic protein that is expressed in the cytoplasmic granules of cytotoxic T cells and natural killer cells). Cytotoxic T cells are effector cells that actually "kill" tumor cells. They are believed to act by direct contact to introduce the digestive enzyme granzyme B into the tumor cell cytoplasm, thereby killing it. Similarly, CD3+ T cells can be further distinguished as regulatory T cells positive for the FOXP3 biomarker. FOXP3 is a nuclear transcription factor that is the most specific marker for regulatory T cells. Likewise, CD3+ T cells may be further distinguished as helper T cells positive for the CD4 biomarker.

In some embodiments, the sample is stained for one or more immune cell markers including at least CD3 or total lymphocytes as detected by hematoxylin and eosin staining. In some embodiments, at least one additional T cell specific marker may also be included, such as CD8 (marker for cytotoxic T-lymphocytes), CD4 (marker for helper T-lymphocytes), FOXP3 (marker for regulatory T-lymphocytes), CD45RA (marker for naïve T-lymphocytes), and CD45RO (marker for memory T-lymphocytes). In one specific embodiment, at least two markers including human CD3 (or total lymphocytes as detected by H&E staining) and human CD8 are used, in which case a single section of the tumor tissue may be labeled with both markers, or serial sections may be used. In other cases, at least one of the immune cell biomarkers is lymphocytes identified in a hematoxylin & eosin stained section.

In some embodiments, the samples are stained for the presence of a lymphocyte biomarker and a tumor biomarker. For example, in epithelial tumors (carcinomas), cytokeratin staining identifies tumor cells as well as the normal epithelium. This information, together with the fact that tumor cells abnormally overexpress the cytokeratins compared to normal epithelial cells, allows one to identify tumor versus normal tissue. For melanoma tissue of neuroectodermal origin, the S100 biomarker serves a similar purpose.

T-cells, for example CD8-positive cytotoxic T-cells, can be further distinguished by a variety of biomarkers that include PD-1, TIM-3, LAG-3, CD28, and CD57. As such, in some embodiments, T-cells are stained with at least one of a variety of lymphocyte biomarkers (e.g., CD3, CD4, CD8, FOXP3) for their identification, and additional biomarkers (LAG-3, TIM-3, PD-L1, etc.) for further differentiation. In some embodiments, the biological samples are stained for a lymphocyte biomarker and PD-L1. For example, tumor cells can be distinguished as being positive for the biomarker PD-L1, which is believed to impact the interaction of tumor cells and immune cells.

A typical biological sample is processed in an automated staining/assay platform that applies a stain to the sample. There are a variety of commercial products on the market suitable for use as the staining/assay platform, one example being the Discovery™ product of Ventana Medical Systems, Inc. (Tucson, AZ). The camera platform may also include a brightfield microscope, such as the VENTANA iScan HT or the VENTANA DP 200 scanners of Ventana Medical Systems, Inc., or any microscope having one or more objective lenses and a digital imager. Other techniques for capturing images at different wavelengths may be used. Further camera platforms suitable for imaging stained biological specimens are known in the art and commercially available from companies such as Zeiss, Canon, Applied Spectral Imaging, and others, and such platforms are readily adaptable for use in the system, methods, and apparatus of this subject disclosure.

In some embodiments, the input images are masked such that only tissue regions are present in the images. In some embodiments, a tissue region mask is generated to mask non-tissue regions from tissue regions. In some embodiments, a tissue region mask may be created by identifying the tissue regions and automatically or semi-automatically (i.e., with minimal user input) excluding the background regions (e.g. regions of a whole slide image corresponding to glass with no sample, such as where there exists only white light from the imaging source). The skilled artisan will appreciate that in addition to masking non-tissue regions from tissue regions, the tissue masking module may also mask other areas of interest as needed, such as a portion of a tissue identified as belonging to a certain tissue type or belonging to a suspected tumor region. In some embodiments, a segmentation technique is used to generate the tissue region masked images by masking tissue regions from non-tissue regions in the input images. Suitable segmentation techniques are as such known from the prior art, (cf. Digital Image Processing, Third Edition, Rafael C. Gonzalez, Richard E. Woods, chapter 10, page 689 and Handbook of Medical Imaging, Processing and Analysis, Isaac N. Bankman Academic Press, 2000, chapter 2).

In some embodiments, an image segmentation technique is utilized to distinguish between the digitized tissue data and the slide in the image, where the tissue data corresponds to the foreground and the slide corresponds to the background. In some embodiments, an Area of Interest (AOI) is computed in a whole slide image in order to detect all tissue regions in the AOI while limiting the amount of background non-tissue area that is analyzed. A wide range of image segmentation techniques (e.g., HSV color-based image segmentation, Lab image segmentation, mean-shift color image segmentation, region growing, level set methods, fast marching methods, etc.) can be used to determine, for example, boundaries of the tissue data and non-tissue or background data. Based at least in part on the segmentation, the method can also generate a tissue foreground mask that can be used to identify those portions of the digitized slide data that correspond to the tissue data. Alternatively, the method can generate a background mask used to identify those portions of the digitized slide date that do not correspond to the tissue data.

This identification may be enabled by image analysis operations such as edge detection, etc. A tissue region mask may be used to remove the non-tissue background noise in the image, for example the non-tissue regions. In some embodiments, the generation of the tissue region mask comprises one or more of the following operations (but not limited to the following operations): computing the luminance of the low resolution analysis input image, producing a luminance image, applying a standard deviation filter to the luminance image, producing a filtered luminance image, and applying a threshold to filtered luminance image, such that pixels with a luminance above a given threshold are set to one, and pixels below the threshold are set to zero, producing the tissue region mask. Additional information and examples relating to the generation of tissue region masks is disclosed in US Publication No. 2017/0154420, entitled "An Image Processing Method and System for Analyzing a Multi-Channel Image Obtained from a Biological sample Being Stained by Multiple Stains," the disclosure of which is hereby incorporated by reference herein in its entirety.

Unmixing Module

In some embodiments, the images received as input may be multiplex images, i.e. the image received is of a biological sample stained with more than one stain. In these embodiments, and prior to further processing, the multiple image is first unmixed into its constituent channels, such as with an unmixing module 203, where each unmixed channel corresponds to a particular stain or signal. In some embodiments, multiplexed brightfield images are first unmixed to obtain at least two image channel images, e.g. a DAB image channel image or a hematoxylin image channel image. In some embodiments, the unmixed image channel images may be used as the obtained one or more input images to which a Frangi filter may be applied (see step 310 of FIG. 3B).

In some embodiments, in a sample comprising one or more stains, individual images may be produced for each channel of the one or more stains. The skilled artisan will appreciate that features extracted from these channels are useful in describing the different biological structures present within any image of a tissue (e.g. nuclei, membranes, cytoplasm, nucleic acids, etc.).

In some embodiments, the multi-spectral image provided by the imaging module 202 is a weighted mixture of the underlying spectral signals associated the individual biomarkers and noise components. At any particular pixel, the mixing weights are proportional to the biomarker expressions of the underlying co-localized biomarkers at the particular location in the tissue and the background noise at that location. Thus, the mixing weights vary from pixel to pixel. The spectral unmixing methods disclosed herein decompose the multi-channel pixel value vector at each and every pixel into a collection of constituent biomarker end members or components and estimate the proportions of the individual constituent stains for each of the biomarkers.

Unmixing is the procedure by which the measured spectrum of a mixed pixel is decomposed into a collection of constituent spectra, or endmembers, and a set of corresponding fractions, or abundances, that indicate the proportion of each endmember present in the pixel. Specifically, the unmixing process can extract stain-specific channels to determine local concentrations of individual stains using reference spectra that are well known for standard types of tissue and stain combinations. The unmixing may use reference spectra retrieved from a control image or estimated from the image under observation. Unmixing the component signals of each input pixel enables retrieval and analysis of stain-specific channels, such as a hematoxylin channel and an eosin channel in H&E images, or a diaminobenzidine (DAB) channel and a counterstain (e.g., hematoxylin) channel in IHC images. The terms "unmixing" and "color deconvolution" (or "deconvolution") or the like (e.g. "deconvolving," "unmixed") are used interchangeably in the art.

In some embodiments, the multiplex images are unmixed with unmixing module 205 using liner unmixing. Linear unmixing is described, for example, in 'Zimmermann "Spectral Imaging and Linear Unmixing in Light Microscopy" Adv Biochem Engin/Biotechnology (2005) 95:245-265' and in in C. L. Lawson and R. J. Hanson, "Solving least squares Problems," PrenticeHall, 1974, Chapter 23, p. 161,' the disclosures of which are incorporated herein by reference in their entirety. In linear stain unmixing, the measured spectrum ($S(\lambda)$) at any pixel is considered a linear mixture of stain spectral components and equals the sum of the proportions or weights (A) of each individual stain's color reference ($R(\lambda)$) that is being expressed at the pixel $$S(\lambda) = A_1 \cdot R_1(\lambda) + A_2 \cdot R_2(\lambda) + A_3 \cdot R_3(\lambda) \ldots A_i ry(\lambda)$$

which can be more generally expressed as in matrix form as $$S(\lambda) = \sum A_i ry(\lambda) \text{ or } S = R \cdot A$$

If there are M channels images acquired and N individual stains, the columns of the M×N matrix R are the optimal color system as derived herein, the N×1 vector A is the unknown of the proportions of individual stains and the M×1 vector S is the measured multichannel spectral vector at a pixel. In these equations, the signal in each pixel (S) is measured during acquisition of the multiplex image and the reference spectra, i.e. the optimal color system, is derived as described herein. The contributions of various stains ($A_i$) can be determined by calculating their contribution to each point in the measured spectrum. In some embodiments, the solution is obtained using an inverse least squares fitting approach that minimizes the square difference between the measured and calculated spectra by solving the following set of equations, $$[\partial \Sigma_j \{S(\lambda_j) - \Sigma_i A_i ry(\lambda_j)\}2]/\partial A_i = 0$$

In this equation, j represents the number of detection channels and i equals the number of stains. The linear equation solution often involves allowing a constrained unmixing to force the weights (A) to sum to unity.

In other embodiments, unmixing is accomplished using the methods described in WO2014/195193, entitled "Image Adaptive Physiologically Plausible Color Separation," filed on May 28, 2014, the disclosure of which is hereby incorporated by reference in its entirety herein. In general, WO2014/195193 describes a method of unmixing by separating component signals of the input image using iteratively optimized reference vectors. In some embodiments, image data from an assay is correlated with expected or ideal results specific to the characteristics of the assay to determine a quality metric. In the case of low-quality images or poor correlations against ideal results, one or more reference column vectors in matrix R are adjusted, and the unmixing is repeated iteratively using adjusted reference vectors, until the correlation shows a good quality image that matches physiological and anatomical requirements. The anatomical, physiological, and assay information may be used to define rules that are applied to the measured image data to determine the quality metric. This information includes how the tissue was stained, what structures within the tissue were intended or not intended to be stained, and relationships between structures, stains, and markers specific to the assay being processed. An iterative process results in stain-specific vectors that can generate images that accurately identify structures of interest and biologically relevant information, are free from any noisy or unwanted spectra, and therefore fit for analysis. The reference vectors are adjusted to within a search space. The search space defines a range of values that a reference vector can take to represent a stain. The search space may be determined by scanning a variety of representative training assays including known or commonly occurring problems and determining high-quality sets of reference vectors for the training assays.

Frangi Filter Module

In some embodiments, a Frangi filter module 204 may be utilized by the system 200 to apply a Frangi filter to one or more obtained input images (individually or in combination), including obtained unmixed image channel images, to provide one or more enhanced images (see step 311 of FIG.

3B). In some embodiments, the Frangi filter may be applied to enhance membrane stained cells and/or to enhance faint nuclei in one or more input images. In some embodiments, the Frangi filter module 204 may be utilized to generate at least two enhanced images, such as a first enhanced image having enhancements in a membrane boundary structure and a second enhanced image having enhancements in a nuclear boundary structure (or, for that matter, two images enhanced in nuclear boundary structure or, alternatively, two images enhanced in membrane boundary structure). In other embodiments, the Frangi filter module 204 may be utilized to generate a plurality of enhanced images, e.g. three or more enhanced images (including any combination of membrane enhanced images and/or nuclear enhanced images). In some embodiments, the enhanced images generated by module 204 may then be used as the input for the image refinement module 205.

Frangi filters are described by Alejandro F. Frangi, Wiro J. Niessen, Koen L. Vincken, Max A. Viergever, "Multiscale vessel enhancement filtering," MICCAI 1998, the disclosure of which is hereby incorporated by reference herein in its entirety. The Frangi filter utilizes the eigenvector direction and eigenvalues of the Hessian matrix of the line structure to enhance line structure. In some embodiments, the Frangi filter is utilized to enhance boundary structures within an input image, e.g. membrane boundary structures or nucleus boundary structures. In some embodiments, the application of the Frangi filter generates an image where elongate structures, such as membranes, and blob-like structures, such as cell nuclei, are enhanced. In some embodiments, the Frangi filter can be configured to detect structures which have different levels of local linearity. In some embodiments, the membrane and nuclei edges present certain linearity at each local point. To account for this, in some embodiments, the β variable of the Frangi filter (shown below) may be altered (e.g. setting β=0.5) as described further herein.

A "vesselness" measure is obtained on the basis of all eigenvalues of the Hessian matrix. Analyzing the second order information (Hessian) has an intuitive justification in the context of vessel detection. The second derivative of a Gaussian kernel at scale s generates a probe kernel that measures the contrast between the regions inside and outside the range (−s,s) in the direction of the derivative (see equations herein, and FIG. 4A).

The Hessian matrix of an "n" dimensional continuous function "f" includes second-order derivatives. The Hessian matrix for a two dimensional image is given as $$H(f) = \begin{pmatrix} \frac{\partial^2 f}{\partial x^2} & \frac{\partial^2 f}{\partial x \partial y} \\ \frac{\partial^2 f}{\partial y \partial x} & \frac{\partial^2 f}{\partial y^2} \end{pmatrix}.$$

The Hessian matrix $H_{o,s}$ is calculated at each pixel position $x_0$ and scale s. The Frangi filter uses s as the standard deviation (σ) of Gaussians to approximate the second-order derivatives. A "vesselness" feature $V_0(s)$ is calculated at pixel position $x_0$ from the eigenvalues $\lambda 1 < \lambda 2$ of the Hessian matrix $H_{0,s}$ using equations of "dissimilarity measure" $R_B$ and "second order structuredness" S (see below). For a 2D image, let $\lambda_k$ be the eigenvalue of Hessian with the k-th smallest magnitude (i.e., $|\lambda_1| \leq |\lambda_2|$). In particular, a pixel belonging to a vessel region will be signaled by $\lambda_1$ being small (ideally zero), and $\lambda_2$ being of a large magnitude (the sign is an indicator of brightness/darkness). The definition of Frangi filter for detecting bright linear structure at scale s is as follows:

$$\begin{cases} 0, & \text{if } \lambda_2 > 0 \\ \exp\left(-\frac{R_B^2}{2\beta^2}\right)\left(1 - \exp\left(-\frac{S^2}{2c^2}\right)\right), & \text{if } \lambda_2 \leq 0 \end{cases}$$

where $$R_B = \frac{\lambda_1}{\lambda_2} S = \sqrt{\sum_{j \leq D} \lambda_j^2},$$

$$R_B = \frac{\lambda_1}{\lambda_2} S = \sqrt{\sum_{j \leq D} \lambda_j^2},$$

where β and c are constants which control the sensitivity of the filter. D is the dimension of the image. $R_B$ is the blobness measure in 2D and accounts for the eccentricity of the second order ellipse. $R_B$ accounts for the deviation from blob-like structures but cannot differentiate background noise from real vessels. Since the background pixels have a small magnitude of derivatives and, thus; small eigenvalues, S helps to distinguish between noise and background. The parameter β and c are user defined and can be tuned to control the sensitivity of the filter. In some embodiments, a smaller β parameter causes the Frangi filer to be sensitive to more elongated structure. In some embodiments, a smaller c parameter makes the filter more sensitive to weak signals. The parameter s represents the spatial scale of the filter, which corresponds to the width of the Gaussian kernel probe used for calculating the derivatives. Applying a larger s parameter causes the Frangi filter to be more sensitive to a wider structure.

Figure 10A:
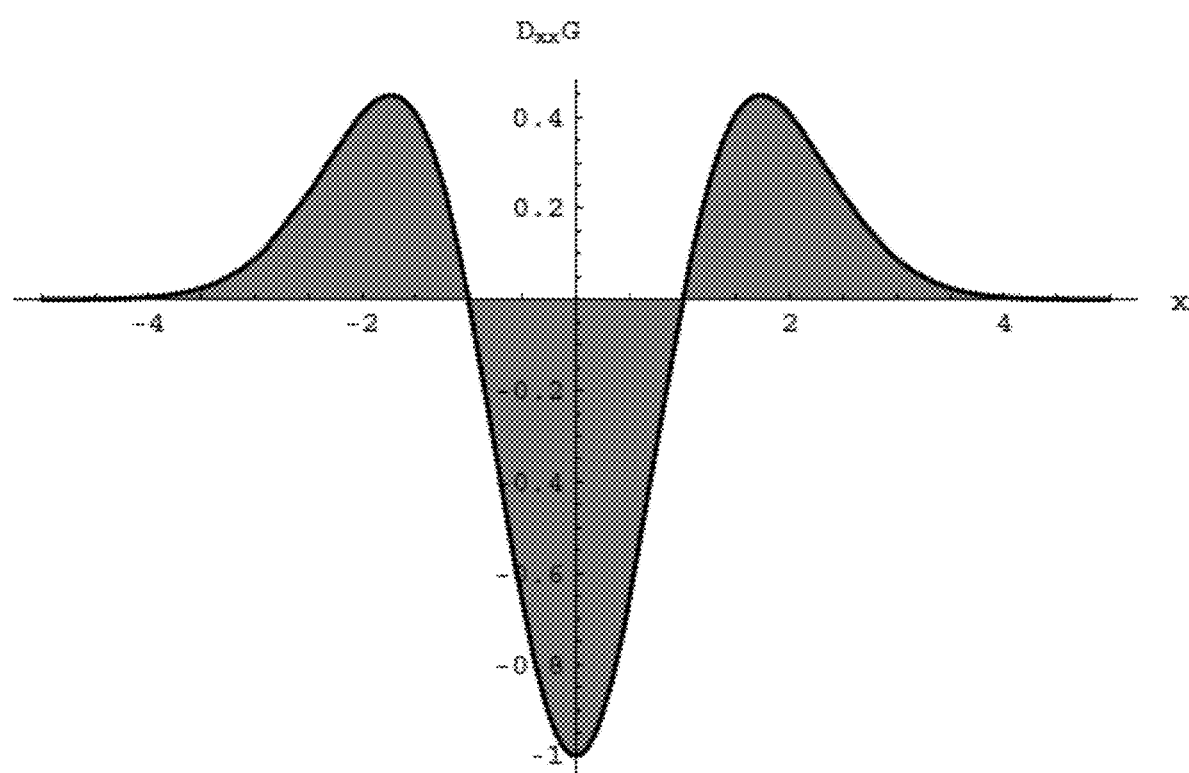
FIG. 10A illustrates the second order derivative of a Gaussian kernel probes inside/outside contrast of the range (−s,s).

FIG. 10A illustrates the second order derivative of Gaussian kernel probes inside/outside contrast of the range (−s,s). In the particular example set forth in FIG. 10A, s=1. FIG. 10B illustrates how the 2D Hessian eigenvectors indicate the presence of local structures. For example, H=high, L=low, N=noisy, usually small, +/− indicates the sign of the eigenvalue. In some embodiments, if the absolute value of both eigenvalues are small (N, N), there is no presence of obvious linear structure. In other embodiments, if one eigenvalue is low, and the other eigenvalue is high, it is indicated that there exists a linear structure, either bright (L,H−), like a "ridge," or dark (L,H+) like a "valley." In yet other embodiments, if both eigenvalues are high, it is indicated that there exists a blob-like structure, either bright (H−,H−) or dark (H+,H+).

The versatility of the Frangi filter for detecting both bright and dark linear structures at different scales can be utilized to detect various boundary defining structures of cells (e.g. membrane structures, nuclear structures, cytoplasmic structures). For this specific task, since the morphological linearity of the cell boundary defining structures (e.g., the edge of a nucleus, or the cell membrane) is intuitively between a perfect line and a blob, the parameter β is first set to equal 0.5 to make the filter more sensitive to the structures that are morphologically close to an ellipse at any local point.

Depending on the original staining pattern, i.e., whether the biomarker to be detected is a nucleus marker or membrane/cytoplasm marker, either the Frangi+ or Frangi− filter may be used. In some embodiments, cell "edges" that appear in the nucleus or cytoplasm stained image should be detected as dark structure (i.e., using Frangi− filter), because the dark side of the "edge" of a cell usually has better signal uniformity in an IHC image. On the other hand, in a membrane stained image, membranes appear as "ridges" in the stain intensity map and should be detected as bright structure (i.e., using Frangi+ filter).

Regarding the scale of the Frangi filter, for cell detection it is believed that there does not exist a large variation of the width of cell edges or membranes. Experiments have shown that a fixed value works generally well for various cell types in different tissue indications. In some embodiments, the value s is set at about 1 micron, which roughly corresponds to about 2 pixels in a microscopic image scanned at about 20× magnification.

Finally, the parameter "c" is the only parameter that needs to be empirically set according to the signal level of the image. In some embodiments, this parameter does not enforce strong signal level dependency of the filter since the filter response is heavily governed by the blobness measurement term as well. By setting parameter "c" we are actually closer to setting a minimal requirement for the signal level, which is desired in practical applications.

In some embodiments, a scaling factor used during application of the Frangi filter to an obtained input image ranges from about 2 pixels to about 5 pixels, which corresponds to about 1 micron to about 3 microns in an image scanned at about 20× magnification, i.e., about 0.5 micron per pixel. In other embodiments, a scaling factor is chosen to favor enhancement of cell boundaries, e.g. a scaling factor of about 2 (see, FIG. 9C). In yet other embodiments, a scaling factor is chosen to favor enhancement of cell bodies, e.g. a scaling factor of about 5 (see, FIG. 9D). In some embodiments, enhancement of cell bodies is desired when the nuclei of the cells present in the image, which is beneficial for cell segmentation task (i.e., delineate the area covered by each individual cell).

In some embodiments, the Frangi filter may be applied more than once to the same obtained input image, but where the Frangi filter is independently applied to each image using a different scaling factor. For example, a Frangi filter may be first applied to an obtained input image stained with DAPI at a first scaling factor (e.g. 2), and then separately to the same original image at a second scaling factor (e.g. 5) to provide first and second enhanced images, each having a different enhancement pattern (compare FIGS. 9C and 9D). In some embodiments, by using a relatively larger scaling factor (e.g. a scaling factor of 5), whole cells with a width within the scale will be enhanced. In some embodiments, for wider (bigger) cells, the contour will be enhanced such that all the cells, regardless of the original signal level, are enhanced to have a similar contrast to the background, making cell detection/segmentation on an image enhanced using a Frangi filter a comparatively easier task than performing the same operation on the original image (i.e. one where the Frangi filter was not applied). In other embodiments, a smaller scaling factor (e.g., a scaling factor of 2) is used to enhance the cell edge (dark side is desired because of the uniformity of the signal in the background), which can be optional in addition to the enhancement of other cell boundary defining structure, e.g., membrane.

Image Refinement Module

Following the generation of one or more enhanced images through application of the Frangi filter to an obtained image channel image, an image refinement module 205 is used to generate a refined image (step 312 of FIG. 3B) based at least upon one of the generated enhanced images.

In some embodiments, the refined image generated by the image refinement module is generated by combining at least two images, where the combination may, for example, be additive or weighted. In some embodiments, input images (e.g. obtained input channel images, enhanced images, or any combination thereof) are combined, such as by averaging or summing (on a pixel-by-pixel basis) to produce the output combination image. In other embodiments, the combination image is a weighted combination of two or more images. In some embodiments, a weighted combination image is desired when the dynamic range of one input image is different from the dynamic range of the Frangi filter output image. In some embodiments, image weighting is used to prevent or mitigate an undesired inverse enhancement (e.g., creating valleys in the nuclei stained image in the region where membranes locate) when the membrane signal is present on top of a nucleus. It is believed that this could happen for elongated cells, or when some membrane debris from other cells appears on top of the nucleus in an image. For example, an enhanced membrane image may be weighted more highly when a DAPI signal is low; and alternatively, an enhanced membrane image may be weighted comparatively less when the DAPI signal is high.

Figure 4A:
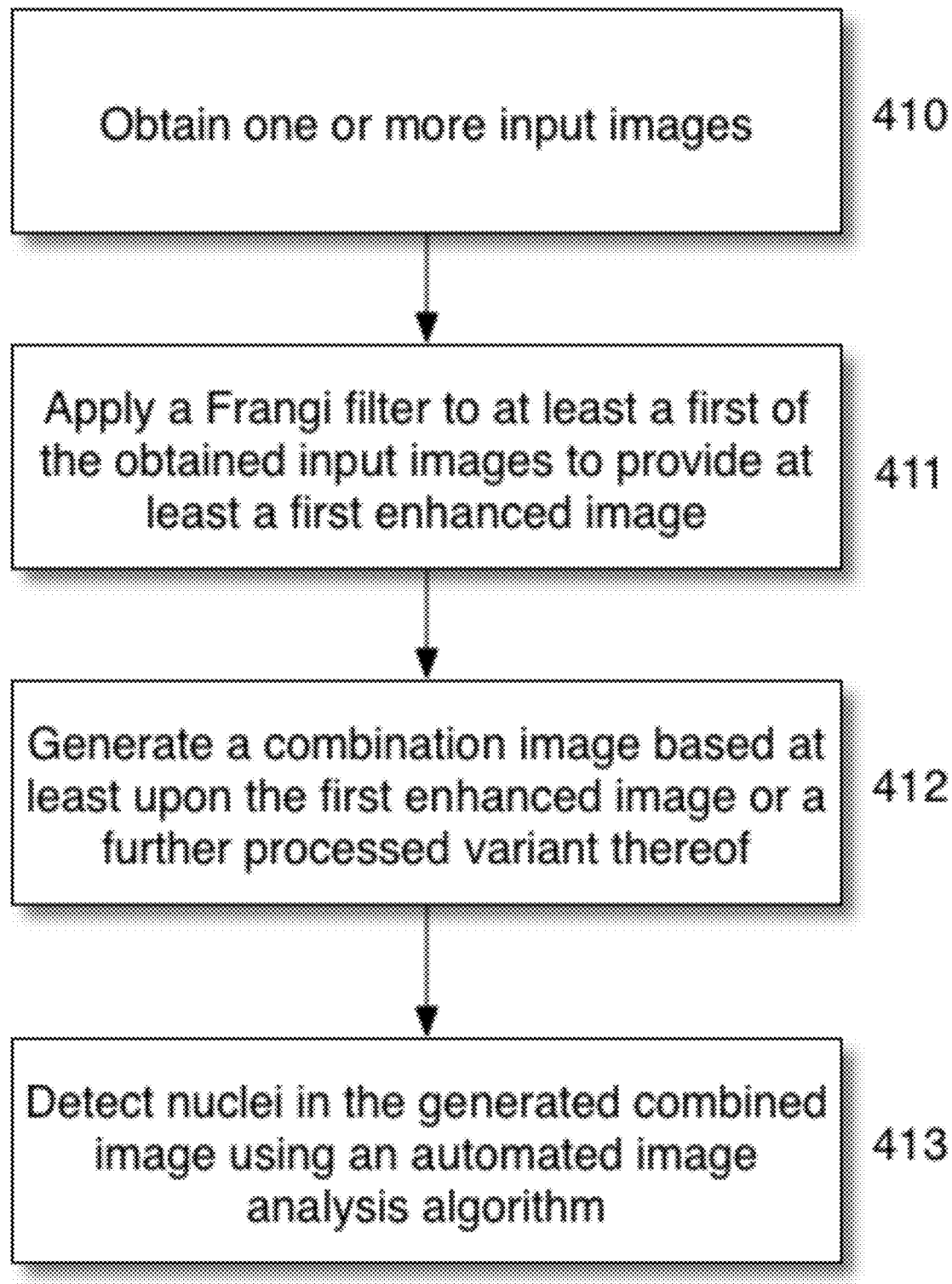
FIGS. 4A and 4B set forth a flowchart illustrating the steps of detecting nuclei in obtained input images in accordance with some embodiments.

Turning to FIG. 4A, in some embodiments, one or more input images obtained (step 410) may be enhanced through the application of the Frangi filter (step 411). Those enhanced images may then be combined with the image refinement module 205 to generate a combination image derived at least from one of the enhanced images (step 412). In some embodiments, the combination image is derived from an enhanced image and a second image. In some embodiments, the second image is an obtained input channel image. In other embodiments, the second image is another enhanced image. In yet other embodiments, the combination image is derived from at least three images, the at least three images derived from any combination of enhanced images or obtained input images. By way of example, assume that 4 input channel images are obtained A, B, C, and D. Also assume, that two enhanced images are generated through application of the Frangi filter, to provide B' and C' enhanced images. According to this example, a combination image may comprise A+B.' Alternatively, a combination image could comprise A+A'. Yet another possible combination image includes A+C'+D.

In some embodiments, the image refinement module 205 may be used to further process an input image or an enhanced image before it is combined with another image. In some embodiments, the refinement module 205 generates an inverse of an image received as an input. For example, the refinement module may include instructions where an inverse (or a compliment) of an enhanced image is generated (compare, for example, FIGS. 6D and 6E). In furtherance of the example set forth above, an inverse of enhanced image B' may be generated to provide B". A resulting combination image may comprise, for example, an additive combination of B"+A; or may, for example, comprise an additive or weighed combination of B"+A+D.

In some embodiments, the refinement module 205 generates a segmentation mask image, either from an enhanced image or a combination image. A "segmentation mask" is, for example, an image mask created by a segmentation algorithm that allows separating one or more pixel blobs (to be used as "foreground pixels") from other pixels (constituting the "background"). For example, the segmentation mask may be generated by a nuclear segmentation algorithm and the application of the segmentation mask on an image depicting a tissue section may allow identification of nuclear blobs in an image.

Figure 4B:
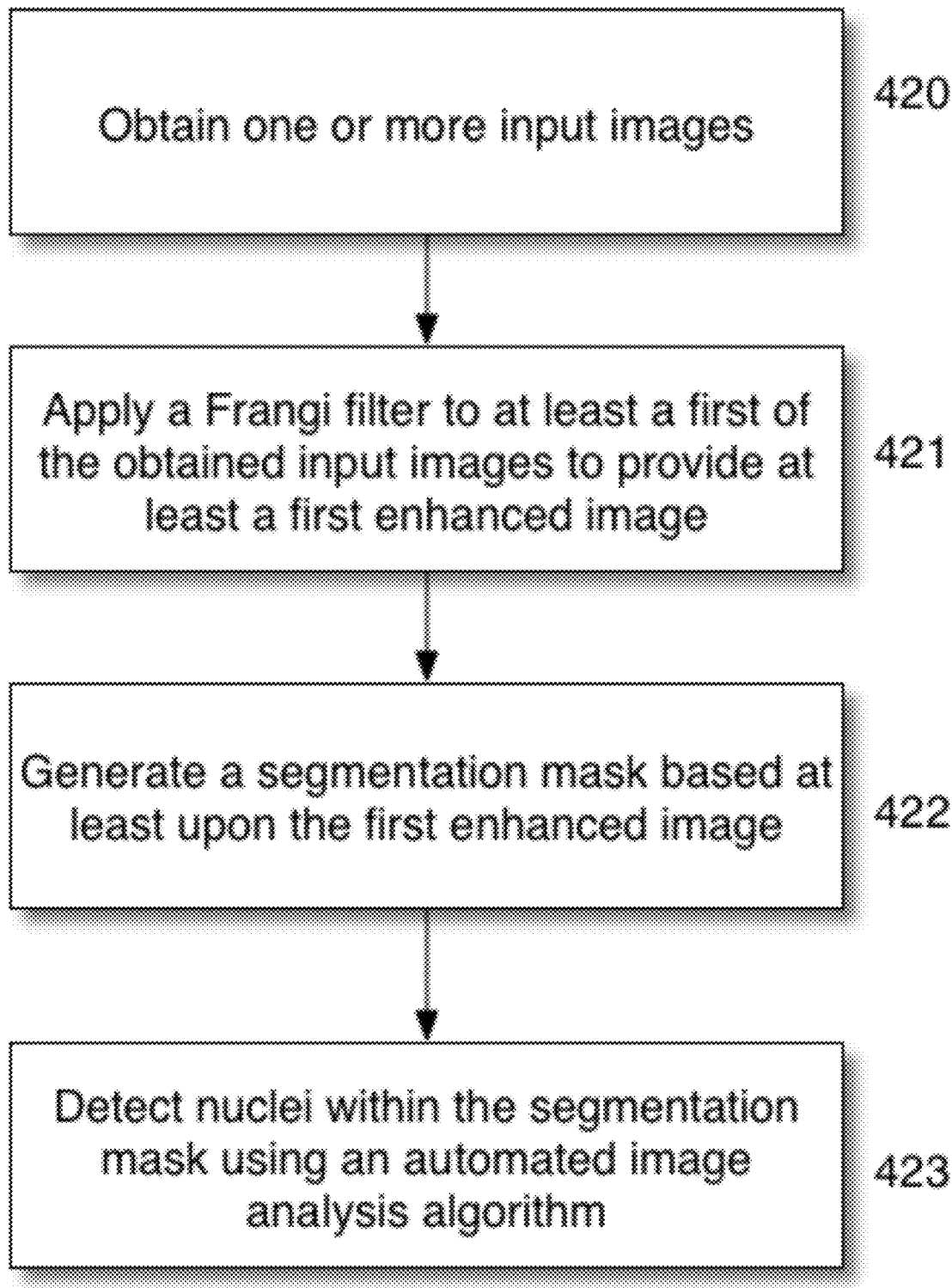

Turning to FIG. 4B, in some embodiments, one or more input images obtained (step 420) may be enhanced through the application of the Frangi filter (step 421). The resulting enhanced images may then be supplied to the image refinement module 205 such that a segmentation mask image may be generated (step 422), whereby the segmentation mask image may be used for the detection of nuclei (step 423).

In some embodiments, the segmentation mask image is generated from a single enhanced image. For example, a single enhanced image may be generated and thresholded to provide for a segmentation mask image. In other embodiments, the segmentation mask image is generated from a combination image, the combination image derived from at least a first enhanced image and another image (e.g. a second enhanced image, another input channel image, or any combination thereof). A combination image may be generated using any of the procedures described above and as illustrated in the aforementioned examples.

Any filters known to those of ordinary skill in the art may be applied to provide for a segmentation mask meeting the criteria of the present disclosure. In some embodiments foreground segmentation is achieved by applying a series of filters, including global thresholding, local adaptive thresholding, morphological operations, and watershed transformations. The filters may be run sequentially or in any order deemed necessary by those of ordinary skill in the art. Of course, any filter may be applied iteratively until the desired outcome is achieved. In some embodiments, the segmentation mask image is generated by thresholding either the first enhanced image or a combination image derived at least from the computed enhanced image. In general, thresholding is a method used for converting an intensity image (I) into a binary image (I') by assigning to all pixels the value one or zero if their intensity is above or below some threshold value, here a global threshold value. In other words, global thresholding is applied to partition pixels depending on their intensity value. Additional methods of thresholding are described in U.S. Patent Publication Nos. 2017/0337695 and 2018/0240239, the disclosures of which are hereby incorporated by reference herein in their entireties. In some embodiments, the generated segmentation mask image is supplied to the nuclei detection module 206.

In some embodiments, morphological operators are applied to remove artifacts and/or fill holes. Indeed, any of the morphological operators known in the art may be applied provided that the application of the morphological operators results in the removal of artifacts and/or hole filling as needed.

Morphology is a set-theoretic approach that considers an image as the elements of a set and processes images as geometrical shapes. The basic idea is to probe an image with a simple, predefined shape, where the algorithm draws conclusions on how this shape fits or misses the shapes within the image. This simple probe is referred to as a structuring element. In some embodiments, a morphological operation is performed using a disk shaped structural element. In some embodiments, the radius of the disk shaped element ranges from about 2 to about 3. In other embodiments, the radius of the disk shaped element is 2.

In some embodiments, a "closing" morphological operation is performed such that a circular nature of a foreground object may be retained. It is believed that "closing" fuses narrow breaks and fills small holes and gaps in the image. In some embodiments, when a "fill holes" morphological operation is performed, connected components is used to determine any "holes" having a size of less than or equal to about 150 pixels. It is believed that the "fill holes" operation assists in returning meaningful blobs, once any internal holes have been filled, and ultimately a more accurate segmentation mask is returned.

Alternatively, a hole may be filled by a morphological operation, namely a conditional dilation operation. For example, let A be a set containing one or more connected components. An array $X_0$ is formed (of the same size as the array containing A), whose elements are zeros (background values), except at each location known to correspond to a point in each connected component in A, which is set to one (foreground value). The objective is to start with $X_0$ and find all the connected components by the following iterative procedure:

$$X_k = (X_{k-1} \oplus B) \cap A \, k = 1, 2, 3, \ldots$$

where B is a suitable structuring element. The procedure terminates when $X_k = X_{k-1}$ with $X_k$ containing all the connected components of A. The results of the dot detection module are then provided to a classification module.

In some embodiments, connected components labeling is then applied to the foreground segmentation mask (i.e. the binary image rendered through application of the segmentation filers described above, where the connected components labeling provides access to the individual nuclei in the segmentation mask. In some embodiments, the connected components labeling process is used to return contiguous regions in the binary image using standard algorithms, such as described by 'Hanan Samet and Markku Tamminen, "An improved approach to connected component labeling of images," in Proceedings of the IEEE Conference on Computer Vision and Pattern Recognition, Miami, Florida, 1986, pp. 312-318,' the disclosure of which is hereby incorporated by reference in its entirety. As applied here, connected components labeling scans an image and groups its pixels into components based on pixel connectivity, i.e. all pixels in a connected component have non-zero values in the corresponding locations in the binary foreground segmented mask and are in some way connected with each other.

Automated Nuclei Detection Module

Following the generation of a refined image, the refined image is provided to a nuclei detection module 206 to automatically detect nuclei within the refined image. In some embodiments the refined image received as input is processed to detect nucleus centers (seeds) and/or to segment the nuclei. In some embodiments, automatic candidate nucleus detection can be performed by applying a radial symmetry-based method (see Parvin, Bahram, et al. "Iterative voting for inference of structural saliency and characterization of subcellular events." Image Processing, IEEE Transactions on 16.3 (2007): 615-623, the disclosure of which is incorporated by reference in its entirety herein). In some embodiments, nuclei are detected using radial symmetry to detect centers of nuclei and then the nuclei are classified based on the intensity of stains around the cell centers. In some embodiments, a radial symmetry-based nuclei detection operation is used as described in commonly-assigned and co-pending patent application WO/2014/140085A1, the entirety of which is incorporated herein by reference. For example, an image magnitude may be computed within an image and one or more votes at each pixel are accumulated by adding the summation of the magnitude within a selected region. Mean shift clustering may be used to find the local centers in the region, with the local centers representing actual nuclear locations.

In some embodiments, nuclei detection based on radial symmetry voting is executed on color image intensity data and makes explicit use of the a priori domain knowledge that the nuclei are elliptical shaped blobs with varying sizes and eccentricities. To accomplish this, along with color intensities in the input image, image gradient information is also used in radial symmetry voting and combined with an adaptive segmentation process to precisely detect and localize the cell nuclei. A "gradient" as used herein is, for example, the intensity gradient of pixels calculated for a particular pixel by taking into consideration an intensity value gradient of a set of pixels surrounding said particular pixel. Each gradient may have a particular "orientation" relative to a coordinate system whose x- and y-axis are defined by two orthogonal edges of the digital image. For instance, nuclei seed detection involves defining a seed as a point which is assumed to lie inside a cell nucleus and serve as the starting point for localizing the cell nuclei. The first step is to detect seed points associated with each cell nuclei using a highly robust approach based on the radial symmetry to detect elliptical-shaped blobs, structures resembling cell nuclei. The radial symmetry approach operates on the gradient image using a kernel-based voting procedure. A voting response matrix is created by processing each pixel that accumulates a vote through a voting kernel. The kernel is based on the gradient direction computed at that particular pixel and an expected range of minimum and maximum nucleus size and a voting kernel angle (typically in the range $[\pi/4, \pi/8]$). In the resulting voting space, local maxima locations that have a vote value higher than a predefined threshold value are saved out as seed points. Extraneous seeds may be discarded later during subsequent segmentation or classification processes. Other methods are discussed in US Patent Publication No. 2017/0140246, the disclosure of which is incorporated by reference herein.

In some embodiments, nuclei may be identified using other techniques known to those of ordinary skill in the art. For example, an image magnitude may be computed from the refined image, and each pixel around a specified magnitude may be assigned a number of votes that is based on a summation of the magnitude within a region around the pixel. Alternatively, a mean shift clustering operation may be performed to find the local centers within a voting image, which represents the actual location of the nucleus. In other embodiments, nuclear segmentation may be used to segment the entire nucleus based on the now-known centers of the nuclei via morphological operations and local thresholding. In yet other embodiments, model-based segmentation may be utilized to detect nuclei (i.e. learning the shape model of the nuclei from a training data set and using that as the prior knowledge to segment the nuclei in the testing image).

In some embodiments, the nuclei are then subsequently segmented using thresholds individually computed for each nucleus. For example, Otsu's method may be used for segmentation in a region around an identified nucleus since it is believed that the pixel intensity in the nuclear regions varies. As will be appreciated by those of ordinary skill in the art, Otsu's method is used to determine an optimal threshold by minimizing the intra-class variance and is known to those of skill in the art. More specifically, Otsu's method is used to automatically perform clustering-based image thresholding or, the reduction of a gray level image to a binary image. The algorithm assumes that the image contains two classes of pixels following a bi-modal histogram (foreground pixels and background pixels). It then calculates the optimum threshold separating the two classes such that their combined spread (intra-class variance) is minimal, or equivalent (because the sum of pairwise squared distances is constant), so that their inter-class variance is maximal.

In some embodiments, the systems and methods further comprise automatically analyzing spectral and/or shape features of the identified nuclei in an image for identifying nuclei of non-tumor cells. For example, blobs may be identified in the first digital image in a first step. A "blob" as used herein can be, for example, a region of a digital image in which some properties, e.g. the intensity or grey value, are constant or vary within a prescribed range of values. All pixels in a blob can be considered in some sense to be similar to each other. For example, blobs may be identified using differential methods which are based on derivatives of a function of position on the digital image, and methods based on local extrema. A nuclear blob is a blob whose pixels and/or whose outline shape indicate that the blob was probably generated by a nucleus stained with the first stain. For example, the radial symmetry of a blob could be evaluated to determine if the blob should be identified as a nuclear blob or as any other structure, e.g. a staining artifact. For example, in case a blob has a lengthy shape and is not radially symmetric, said blob may not be identified as a nuclear blob but rather as a staining artifact. Depending on the embodiment, a blob identified to be a "nuclear blob" may represent a set of pixels which are identified as candidate nuclei and which may be further analyzed for determining if said nuclear blob represents a nucleus. In some embodiments, any kind of nuclear blob is directly used as an "identified nucleus." In some embodiments, filtering operations are applied on the identified nuclei or nuclear blobs for identifying nuclei which do not belong to biomarker-positive tumor cells and for removing said identified non-tumor nuclei from the list of already identified nuclei or not adding said nuclei to the list of identified nuclei from the beginning.

For example, additional spectral and/or shape features of the identified nuclear blob may be analyzed to determine if the nucleus or nuclear blob is a nucleus of a tumor cell or not. For example, the nucleus of a lymphocyte is larger than the nucleus of other tissue cell, e.g. of a lung cell. In case the tumor cells are derived from a lung tissue, nuclei of lymphocytes are identified by identifying all nuclear blobs of a minimum size or diameter which is significantly larger than the average size or diameter of a normal lung cell nucleus. The identified nuclear blobs relating to the nuclei of lymphocytes may be removed (i.e., "filtered out from") the set of already identified nuclei. By filtering out the nuclei of non-tumor cells, the accuracy of the method may be increased. Depending on the biomarker, also non-tumor cells may express the biomarker to a certain extent and may therefore produce an intensity signal in the first digital image which does not stem from a tumor cell. By identifying and filtering out nuclei which do not belong to tumor cells from the totality of the already identified nuclei, the accuracy of identifying biomarker-positive tumor cells may be increased. These and other methods are described in U.S. Patent Publication 2017/0103521, the disclosure of which is incorporated by reference herein in its entirety. In some embodiments, once the seeds are detected, a locally adaptive thresholding method may be used, and blobs around the detected centers are created. In some embodiments, other methods may also be incorporated, such as marker-based watershed algorithms can also be used to identify the nuclei blobs around the detected nuclei centers. These and other methods are described in PCT Publication No. WO2016/120442, the disclosure of which is incorporated by reference herein in its entirety.

Visualization Module

A visualization module 207 may be utilized such that detected nuclei or seed points may be illustrated to facilitate quick and robust analysis. In some embodiments, an overlay is generated which may then be superimposed over a whole slide image or any portion thereof (e.g. to facilitate the conveyance of results to a reviewer). In some embodiments, a visualization module 207 is used to compute an overlay which may be subsequently superimposed over an input image. FIGS. 7D and 8E provide examples of suitable overlays where individual detected spots (red dots) for each cell are superimposed over a portion of a whole slide image. In some embodiments, detected nuclei and/or seed points may be illustrated as a shaped object (e.g. dots, open circles, squares, etc.) having a particular color.

In some embodiments, each detected nucleus is visualized with a seed point, such as one centered within each cell. Seed points are derived by calculating a centroid or center of mass of each identified lymphocyte (such as based on a derived area of the lymphocyte). Methods of determining centroids of irregular objects are known to those of ordinary skill in the art. Once calculated, the centroid of the nucleus is labeled. In some embodiments, the position of the centroid or center of mass may be superimposed on the input image, which may again be a whole slide image or any portion thereof.

Example—Detection of Membrane Stained Cells Having Nuclei with Poor Morphology

In some embodiments, the systems and methods disclosed herein may be used to detect nuclei in images having poor morphology by enhancing membrane stained cells. In some embodiments, for brightfield images, color unmixing (such as with the unmixing module 203) is first applied to separate a nuclear stain and a target biomarker stain. In some embodiments, and with reference to FIG. 5A, in a first step 510, membrane stained cells are enhanced through the application of a Frangi filter to provide a first enhanced image. In some embodiments, a scaling factor of 2 is applied. Subsequently, a refined image may be generated (step 511). In some embodiments, the refined image is a combination image. In some embodiments, the combination image is a combination of at least the first enhanced image and a second image. In some embodiments, the second image is another input image, i.e. one that has not had a Frangi filter applied. In some embodiments, the second image is an image having signals corresponding to a nuclear stain, e.g. hematoxylin or DAPI. Following generation of the refined image, nuclei are detected (step 512) in the refined image. In some embodiments, the detected nuclei are superimposed over a whole slide image or a portion thereof.

Figure 6A:
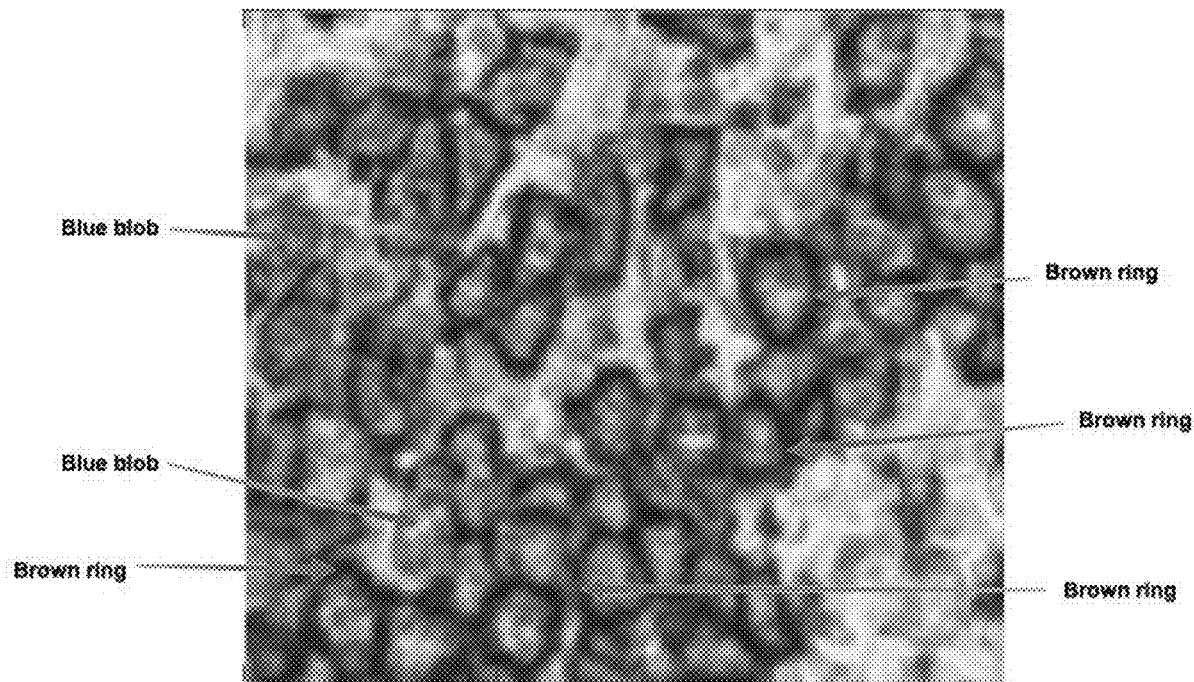
FIGS. 6A-6E provide fields of view of IHC brightfield images stained for CD20 in B cell lymphoma.
Figure 6B:

FIG. 6A illustrates an example of a DAB stained CD20 lymphoma image (where DAB and hematoxylin are used to detect the CD20 biomarker in B-cell lymphoma tissue samples). Since CD20 is a membrane marker, CD20+ cells are characterized, as shown in FIG. 6A, by "brown rings." Meanwhile, the nuclei, which appear typically as "blue blobs" for CD20− cells, may or may not be present in CD20+ cells. Thus, a cell detection method which functions to find "ring" or "blob" patterns, may fail to detect cells that do not adhere to the typical staining pattern. FIG. 6B provides the unmixed hematoxylin image channel image ($I_{HTX}$). As shown in the $I_{HTX}$ image, the morphology of each nucleus is difficult to discern (again, indicating that the nuclei of CD20+ cells often to not have a well-defined "blob" like appearance).

Figure 5A:
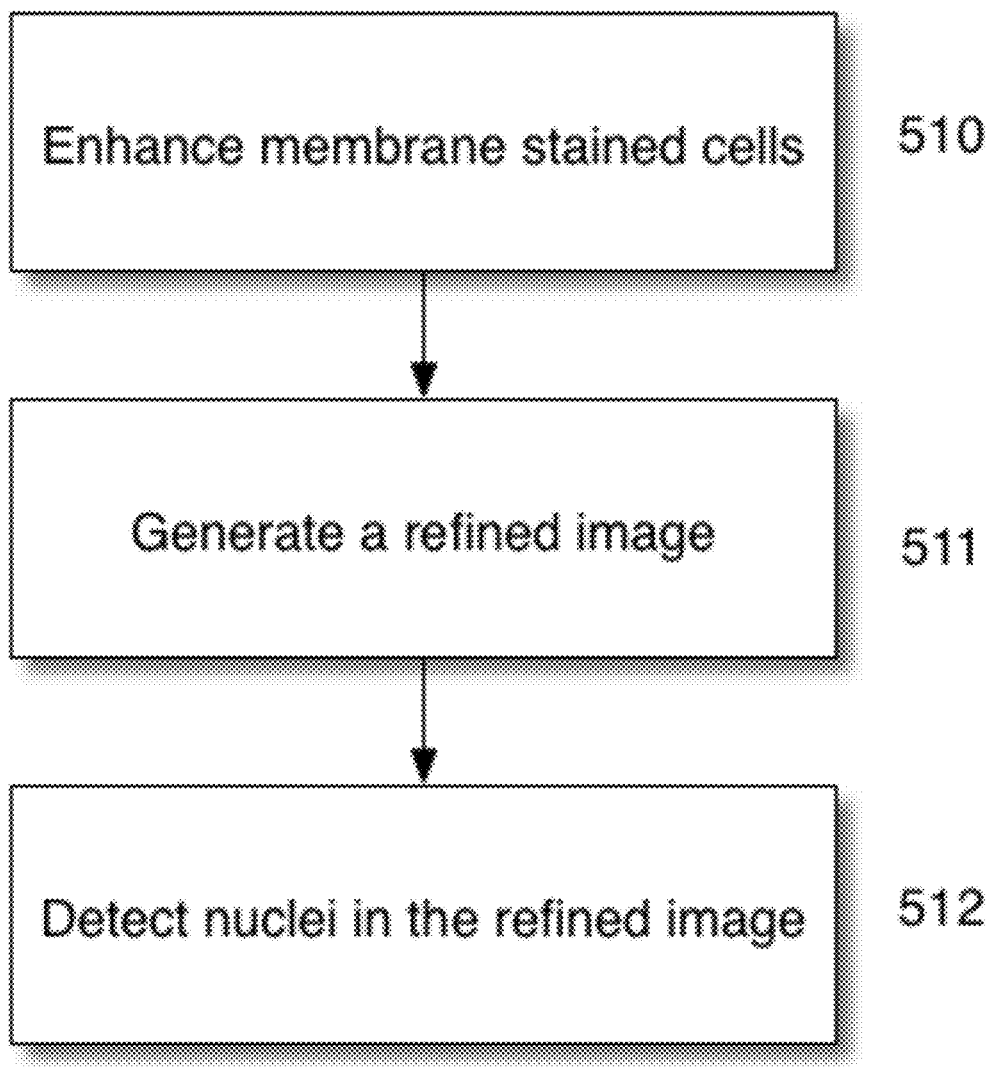
FIG. 5A sets forth a flowchart illustrating the steps of enhancing membrane stained cells in obtained input images in accordance with some embodiments.
Figure 6C:
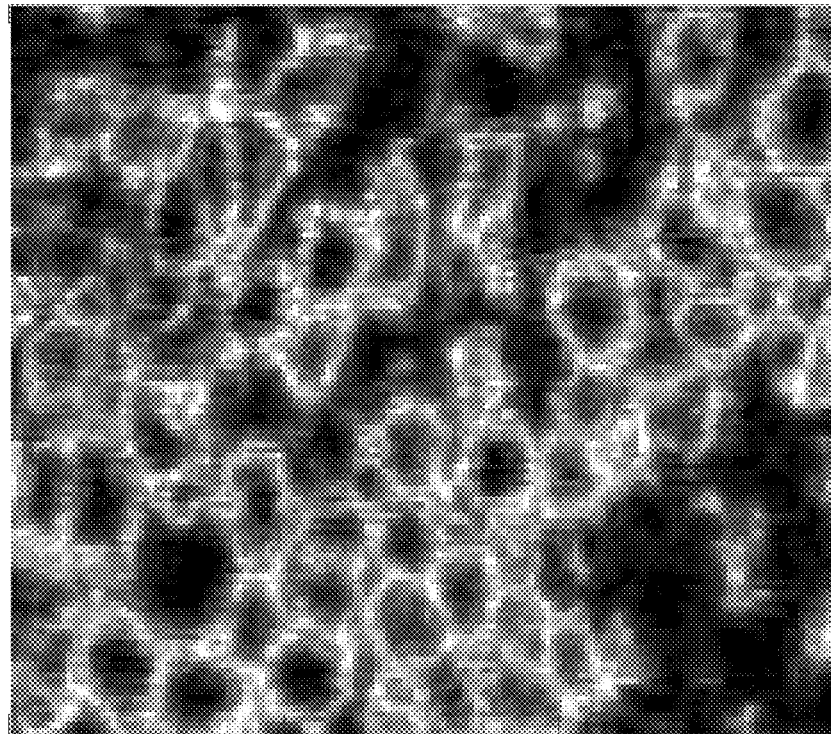
Figure 6D:
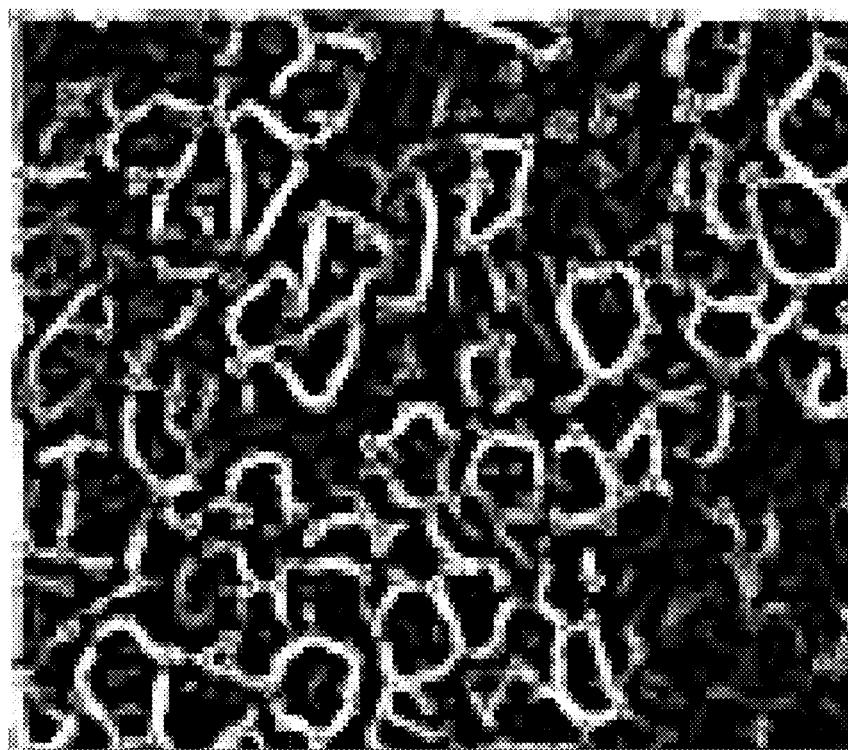
Figure 6E:
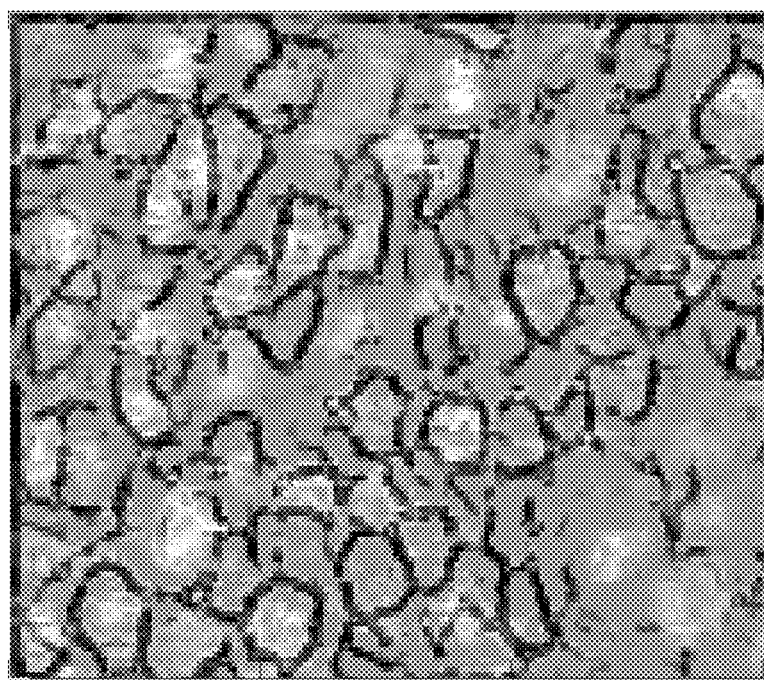

As set forth in FIG. 5A, a Frangi filter is applied on the unmixed DAB image, $I_{DAB}$ (FIG. 6C), and the output is illustrated in FIG. 6D (Frangi_DAB). The unmixed hematoxylin image (FIG. 6B) is then combined with the Frangi filter output image (FIG. 6D) using the formula which follows. In this particular embodiment, the combined image is a combination of the nuclear stain image and the inverse of the enhanced membrane stained image. Said another way, an inverse of the Frangi_DAB enhanced image is generated and combined with the unmixed hematoxylin image channel image. The resulting image, FIG. 6E, is used for nuclei detection.

$$I_{Combine1.} = I_{HTX} + \max(I_{Frangi+\_DAB}) - I_{Frangi+\_DAB}$$

In some embodiments, the unmixed images are derived from an 8-bit RGB input image. Although it is believed that there is no theoretical upper bound of the intensity value (which represents optical density), the optical density values are generally within the range of 0 to about 5, which is believed to make an additive operation numerically reasonable. Also, as compared with the original membrane stain image (i.e., $I_{DAB}$), the enhanced membrane images ($I_{Frangi+\_DAB}$) are spatially much less noisy and have less variations in intensity (due to the fact that the output dynamic range is confined to a range of 0 to 1). In the resulting combined image (FIG. 6E), both the CD20− and CD20+ cells appear as clear "blobs" on a black or grey background. Thus, a general "blob" detection method can be applied on the combined image for cell detection, e.g. an automated image analysis algorithm may be run on the output image presented in FIG. 6E.

Figure 7A:
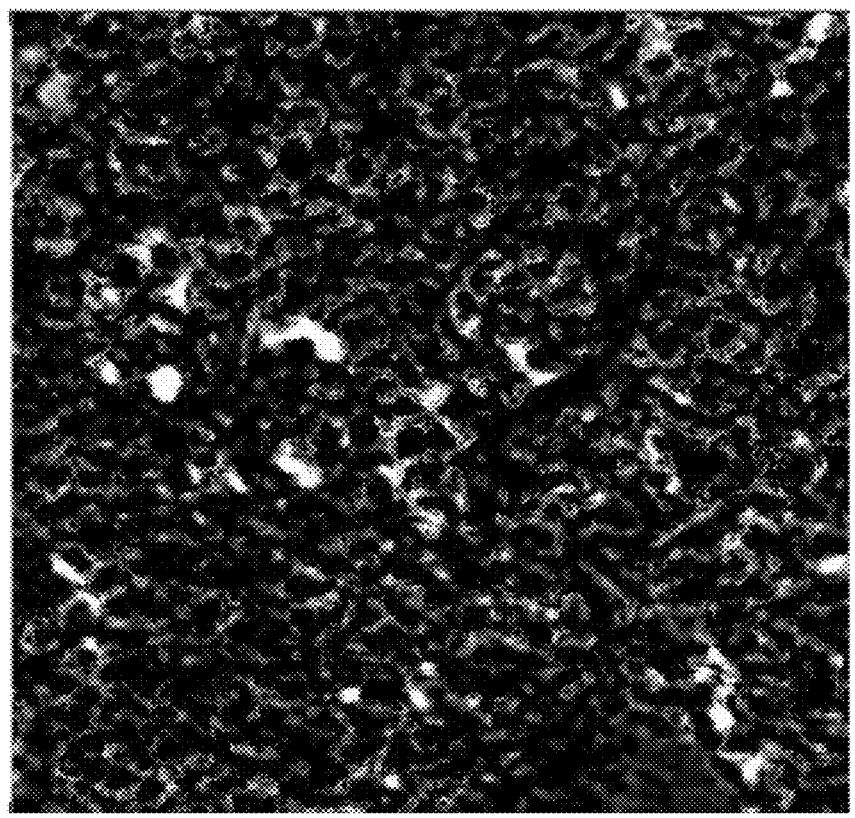
FIG. 7A illustrates an unmixed hematoxylin image channel image.
Figure 7B:
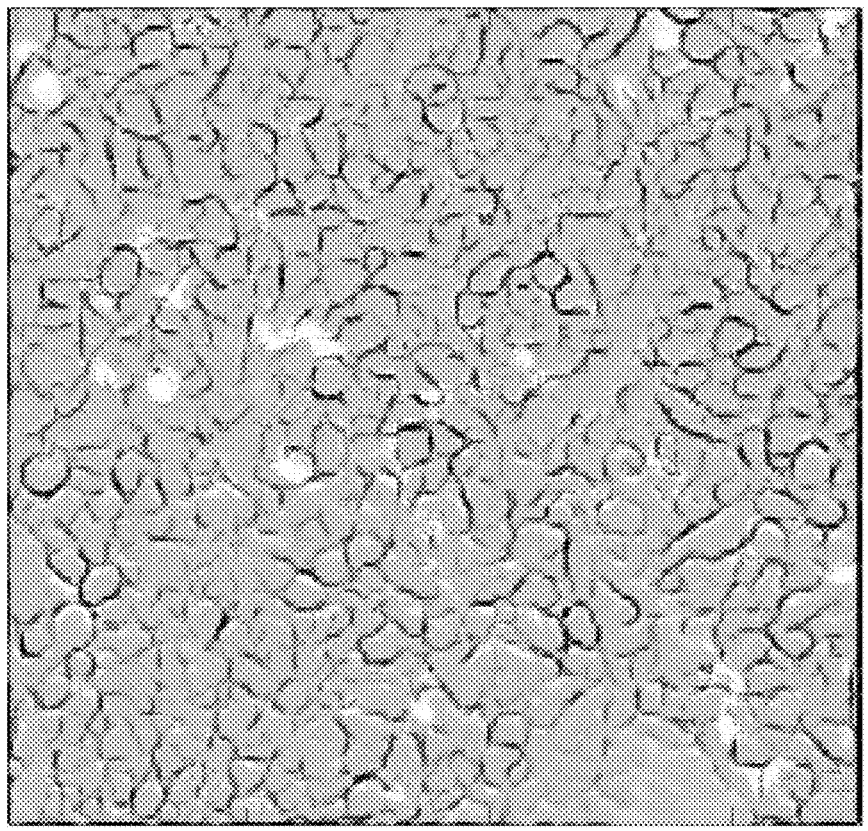
FIG. 7B illustrates a combined image, namely a combination of a hematoxylin image channel image and an inverse of a DAB image channel image which was enhanced using a Frangi Filter.
Figure 7C:
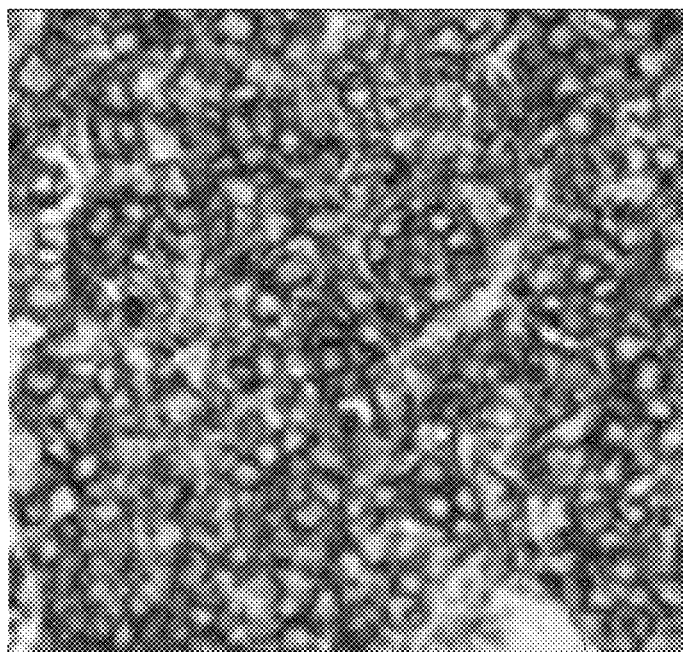
FIG. 7C illustrates the results of applying an automated nuclei detection algorithm on the hematoxylin channel image of FIG. 7A.
Figure 7D:
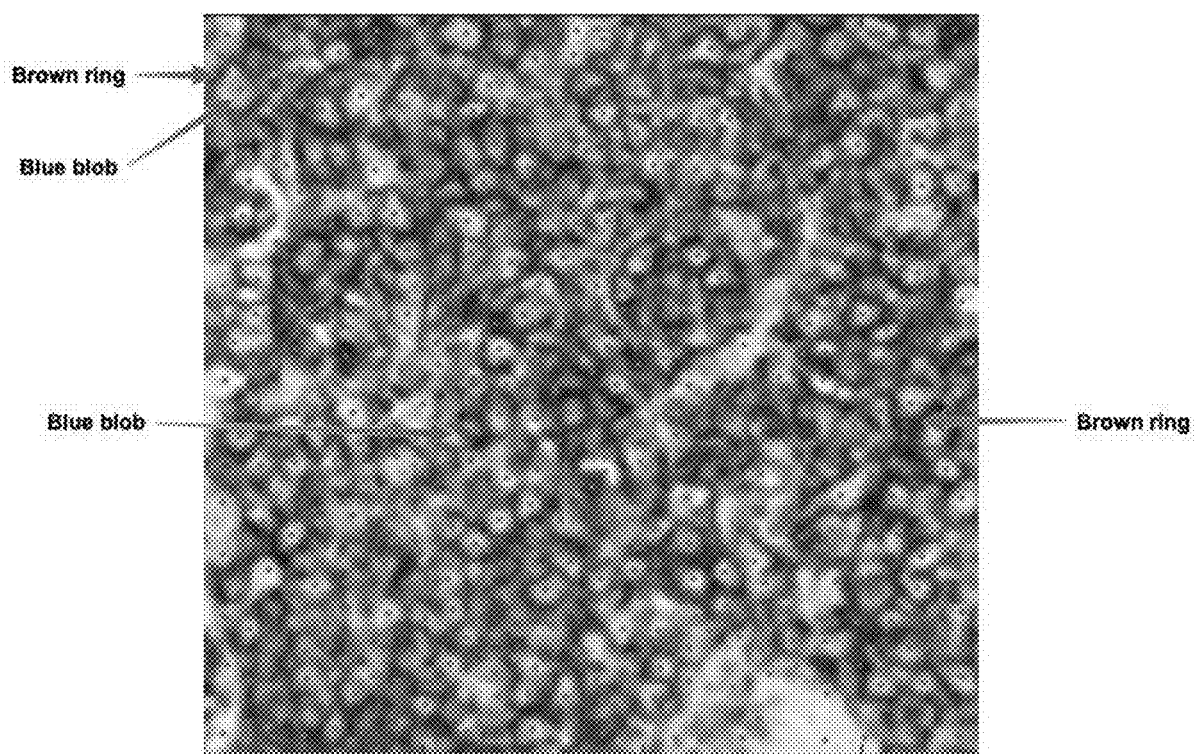
FIG. 7D illustrates the results of applying an automated nuclei detection algorithm on the image of FIG. 7B, whereby a comparison of FIGS. 7C and 7D show the superiority of nuclei detection using the Frangi enhanced combination image.

FIGS. 7A-7D comparatively illustrate that the application of an automatic nuclei detection algorithm to a refined image in accordance with certain embodiments of the present disclosure (e.g. FIG. 7B) reduces the chance of under detecting nuclei (compare FIGS. 7D and 7C). FIG. 7C illustrates an example of cell detection results by applying a radial symmetry based cell detection method (as described herein) on an unmixed HTX image, where the CD20+ cells are believed to be under detected. In contrast, by using a generated combined image (such as outlined in FIG. 5A), both the "blue blobs" and "brown rings" are detected (FIG. 7D). This examples establishes that a single conventional cell detection method may be employed to detect highly clustered cells with different staining patterns after the proposed image preprocessing step.

Example—Detection of Faint Nuclei

Figure 5B:
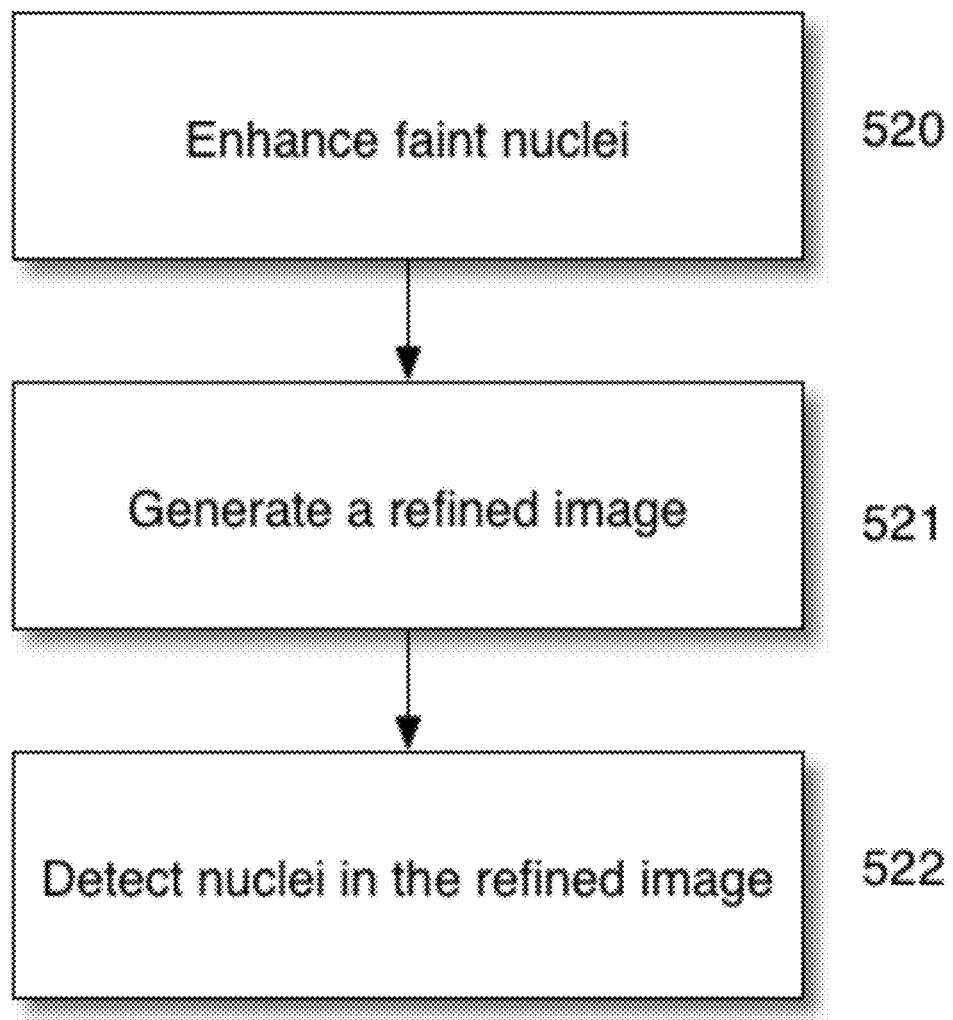
FIG. 5B sets forth a flowchart illustrating the steps of enhancing faint nuclei in obtained input images in accordance with some embodiments.

In some embodiments, the systems and method disclosed herein may be used to detect faint nuclei in obtained images. Turning to FIG. 5B, in a first step 5230, nuclear stained cells are enhanced through the application of a Frangi filter to provide a first enhanced image. In some embodiments, a scaling factor applied is 5. Subsequently, a refined image may be generated (step 521). In some embodiments, the refined image is a segmentation mask image. Following generation of the refined image, nuclei are detected (step 522) in the refined image. In some embodiments, the detected nuclei are superimposed over a whole slide image or a portion thereof.

Figure 8A:
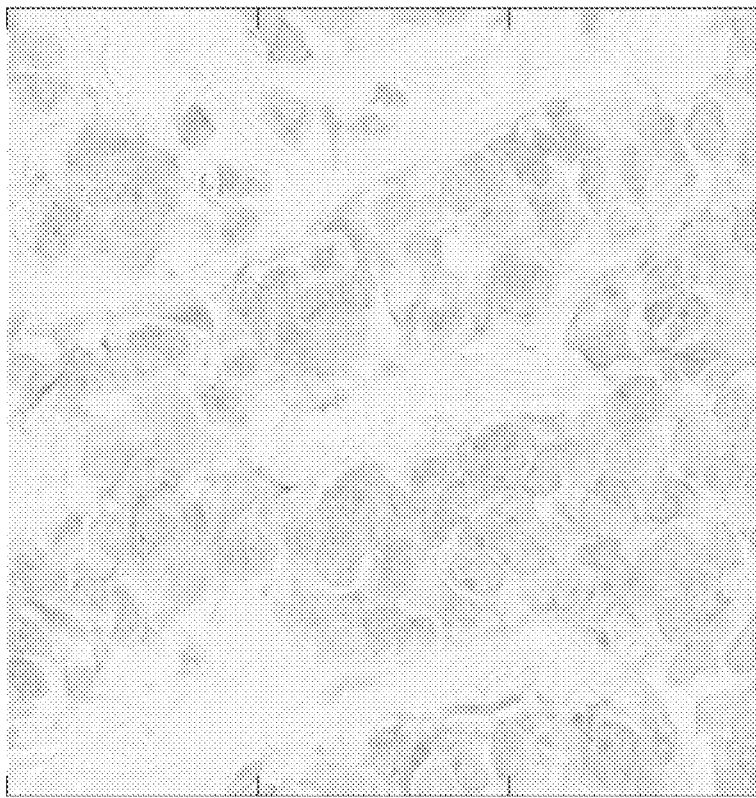
FIG. 8A illustrates an input image.
Figure 8B:
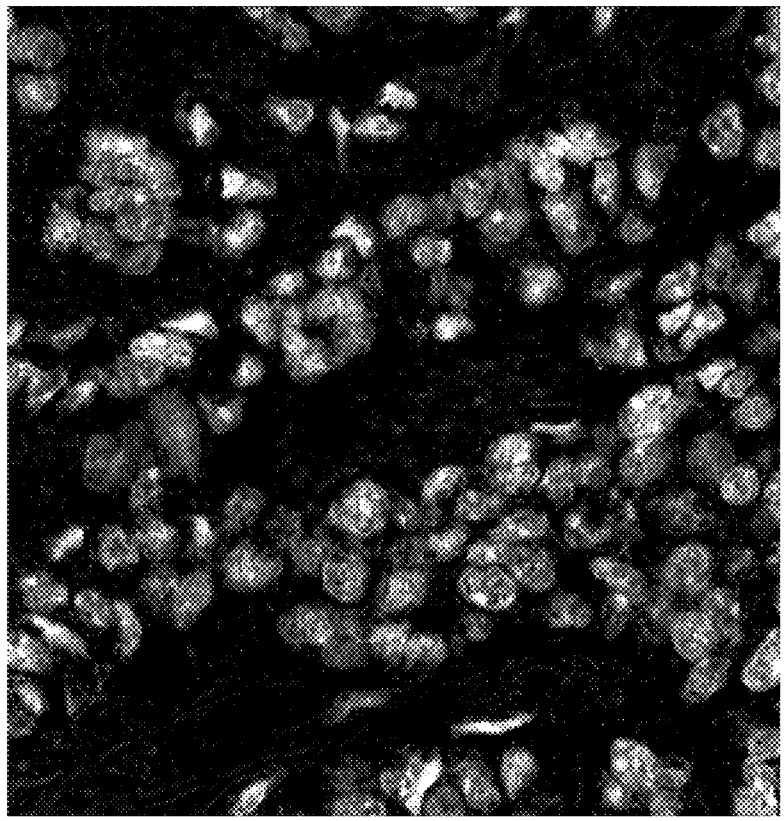
FIG. 8B illustrates a hematoxylin image channel image derived by unmixing the image of FIG. 8A.
Figure 8C:
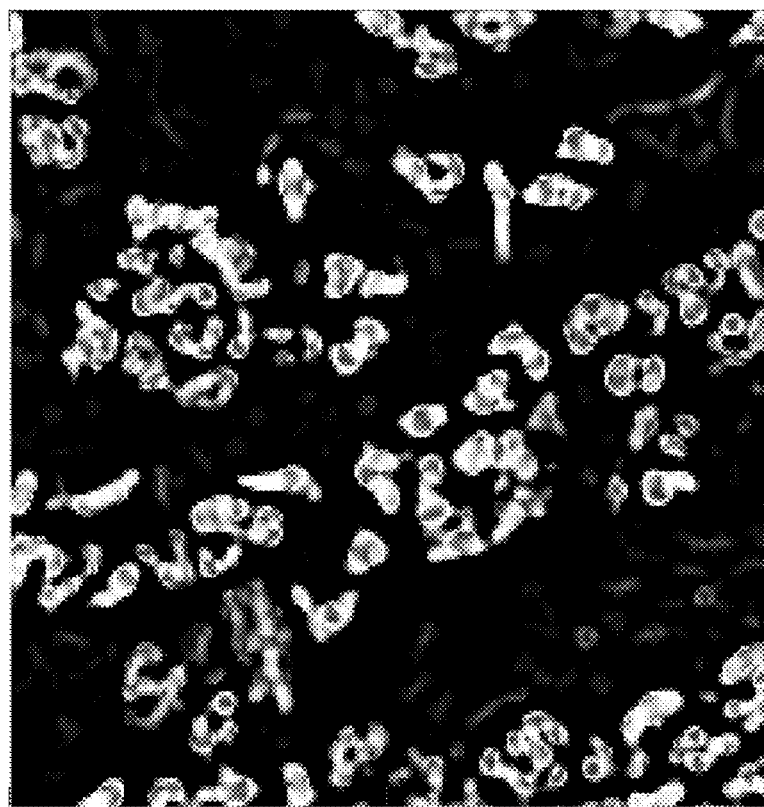
FIG. 8C illustrates the application of a Frangi filter to the hematoxylin image channel image of FIG. 8B with a scaling factor of 5.
Figure 8D:
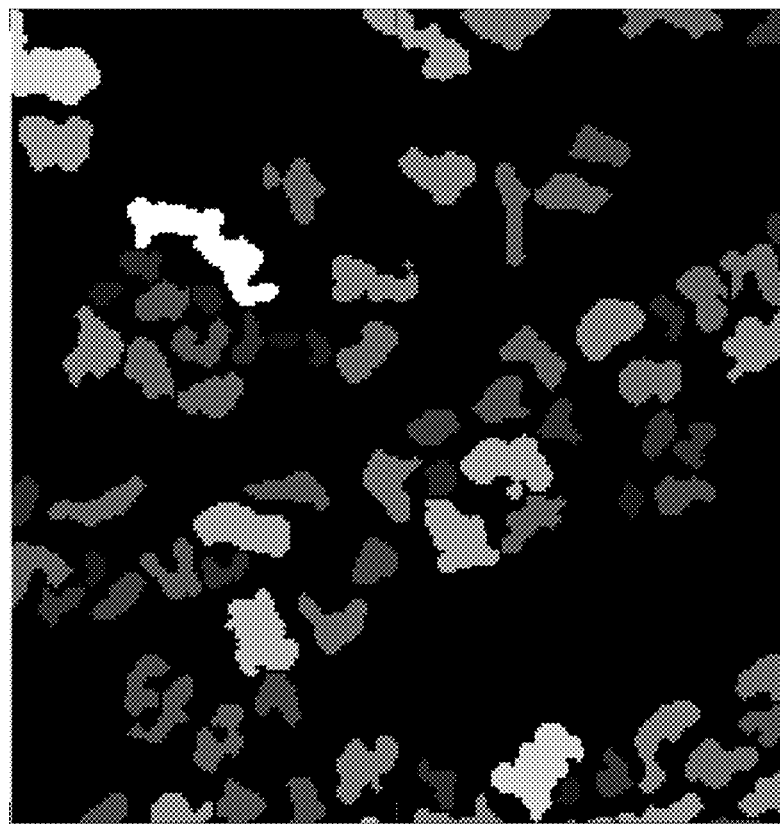
FIG. 8D illustrates the nuclei mask image obtained by applying a threshold on the Frangi filter enhanced image of FIG. 8C.
Figure 8E:
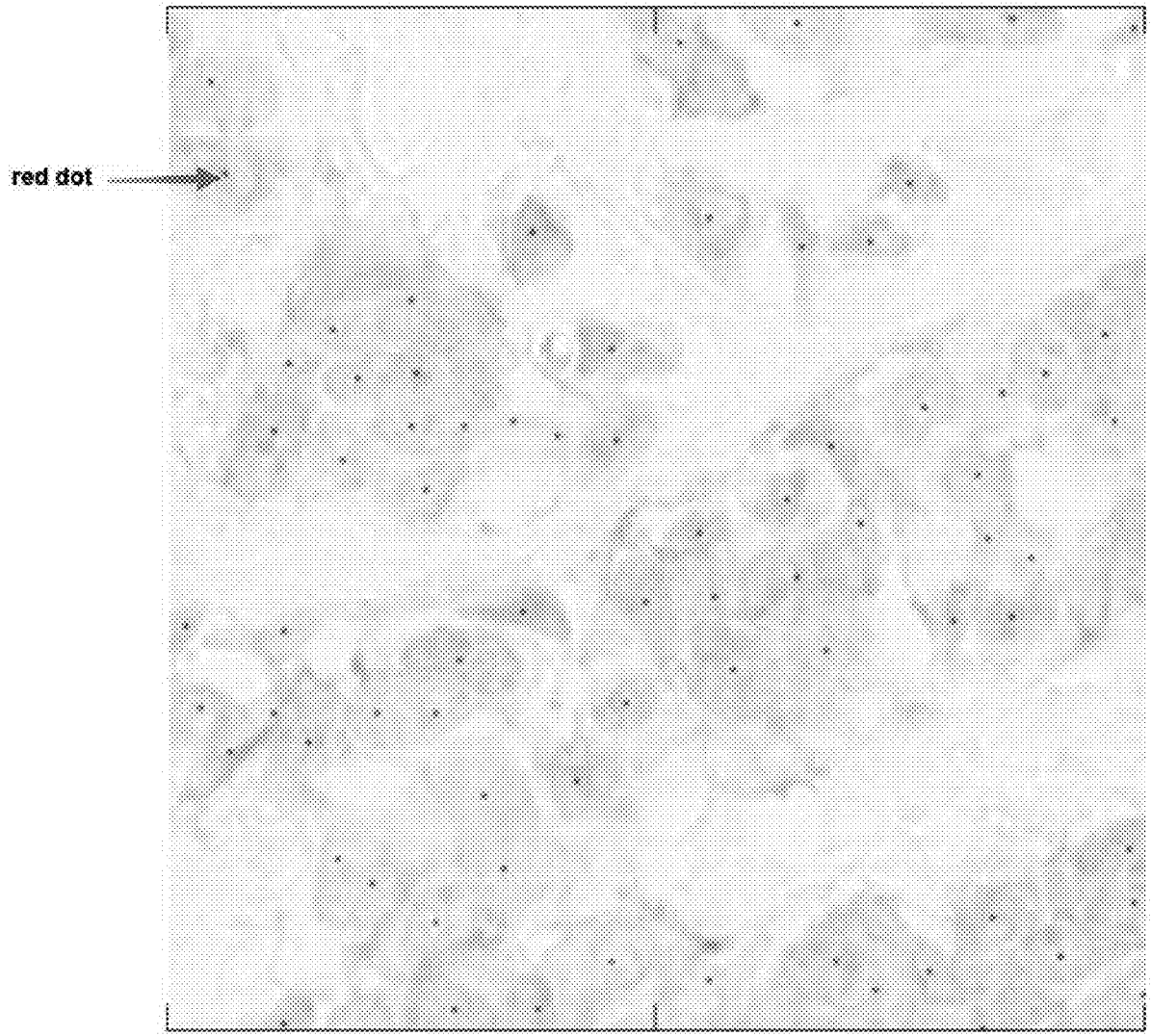
FIG. 8E illustrates the nuclei center obtained after running an automated nuclei detection algorithm on the nuclei mask image of FIG. 8D.

FIG. 8A illustrates a breast cancer HER2 stain image scanned using the Ventana DP200 scanner. As shown, the hematoxylin stain appears very faint (see FIG. 8B). A Frangi filter with larger scale parameter (e.g. a scaling factor of 5) is used to enhance the nuclei in the hematoxylin unmixed image channel image to provide the enhanced image shown in FIG. 8C. Then, a fixed threshold is applied to the Frangi filter output to generate the nuclei mask image (FIG. 8D). It is believed that is an effective way to enhance weakly stained nuclei, and where it is relatively straightforward to derive a threshold to generate the segmentation mask since the Frangi filter output are within the value (0 to 1).

$$\text{Image\_combination2} = Frangi\_HTX\_Scale5$$

FIG. 8E provides the output after nuclei detection, the nuclei being superimposed over the whole slide image of FIG. 8A.

Example—Detect Multiplexed Membrane Stained Cells

Figure 5C:
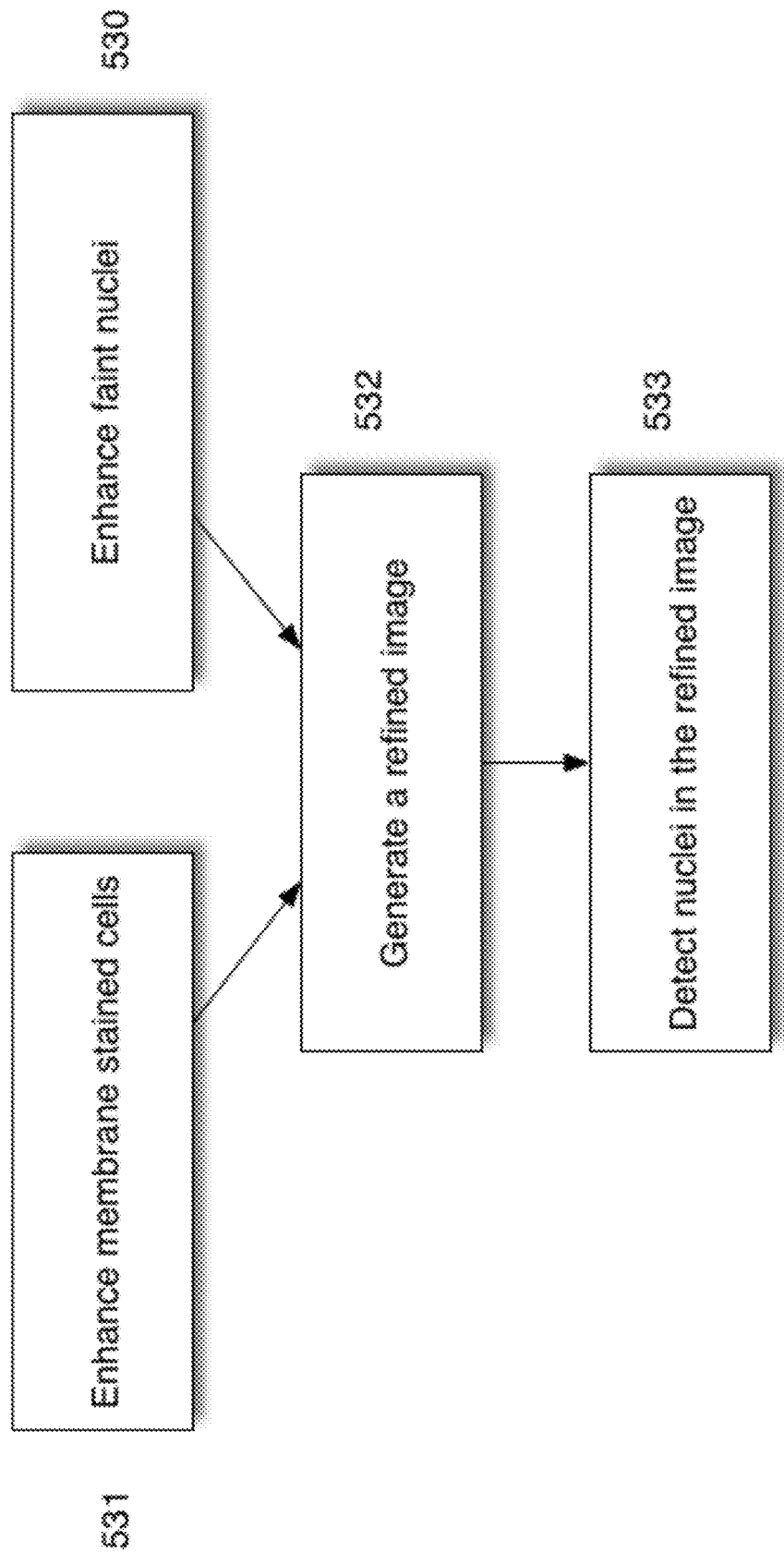
FIGS. 5C and 5D set forth flowcharts illustrating the steps of both enhancing faint nuclei and enhancing membrane stained cells in obtained input images in accordance with some embodiments.
Figure 5D:
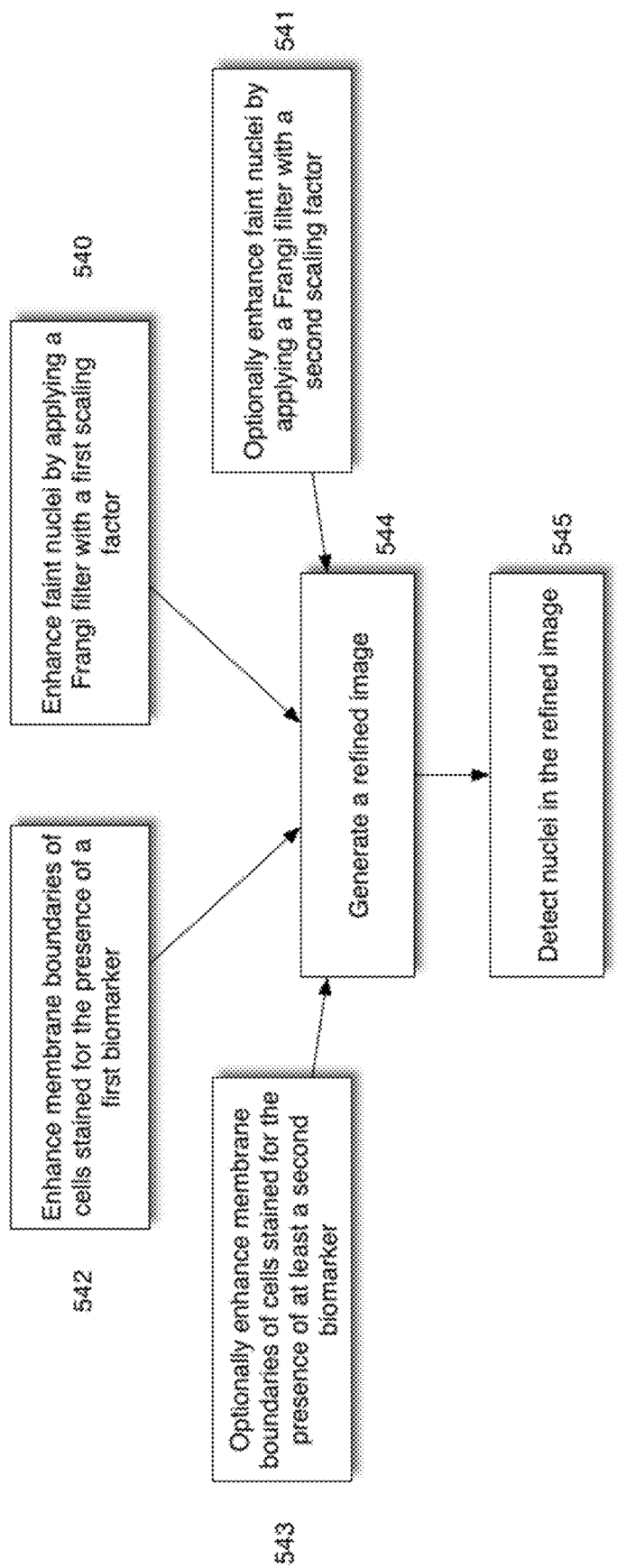

In some embodiments, as is the case for multiplexing darkfield images, each channel image is used to visualize one biomarker. In some embodiments, both nuclear and membrane stains may be enhanced by application of the Frangi filter, and the automated nucleus detection/segmentation method may be applied on a generated refined image. As such, the systems and method disclosed herein may be used to detect faint nuclei in obtained images and also to enhance membrane boundaries in obtained images, such as illustrated in FIGS. 5C and 5D. In some embodiments, nuclear stained cells are enhanced through the application of a Frangi filter to provide a first enhanced image (steps 530 or 540). In some embodiments, the Frangi filter is run a second time on the same input image but at a different scaling factor to provide a second enhanced image (step 541). Subsequently or simultaneously, membrane stained cells are enhanced through the application of a Frangi filter to provide a third enhanced image (step 531). In some embodiments, the Frangi filter is applied to different input images each having membrane staining, such as to provide third and fourth enhanced images (steps 542 or 543). Following generation of the enhanced images, a refined image is generated (steps 532 or 544). In some embodiments, the refined image is a combination image, such as one comprised of at least two of the first, second, third, or fourth enhanced images, where the combination may be additive or weighted. In some embodiments, any of the first, second, third, or fourth enhanced images may be further processed before being combination into the combination image (e.g. an inverse of one of the enhanced images may be generated and used to derive the combination image). In some embodiments, a threshold is then applied to the combination image, to generate a segmentation mask image. In some embodiments, nuclei are then detected in the generated segmentation mask image (steps 533 or 545). In some embodiments, the nuclei detection results are visualized, e.g. superimposed over a whole slide image or any portion thereof.

Figure 9A:
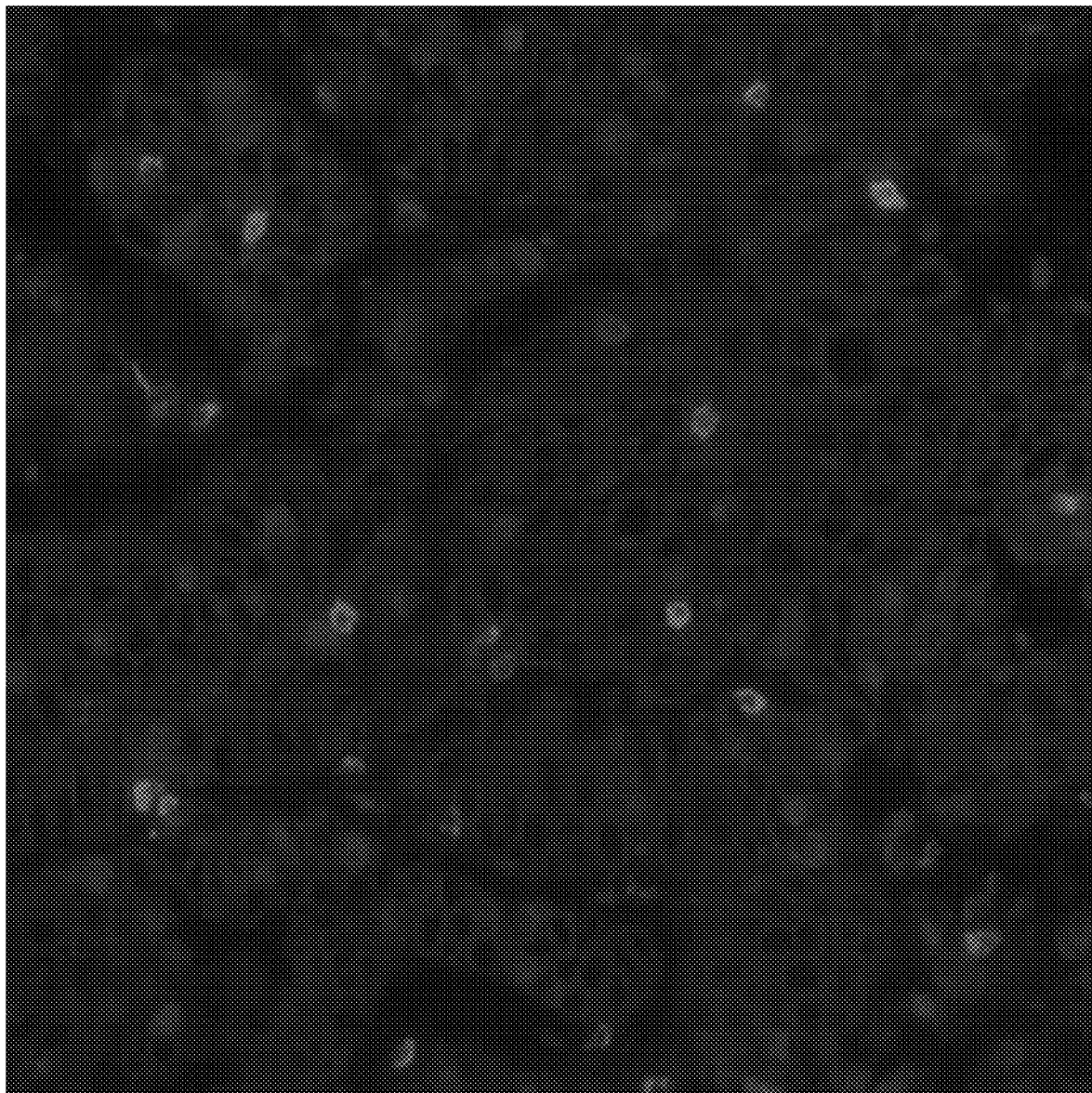
FIG. 9A illustrates a multiplex image comprising signals corresponding to Ki67, KRT, PDCD1, DAPI, CD8A, CD3E.
Figure 9B:
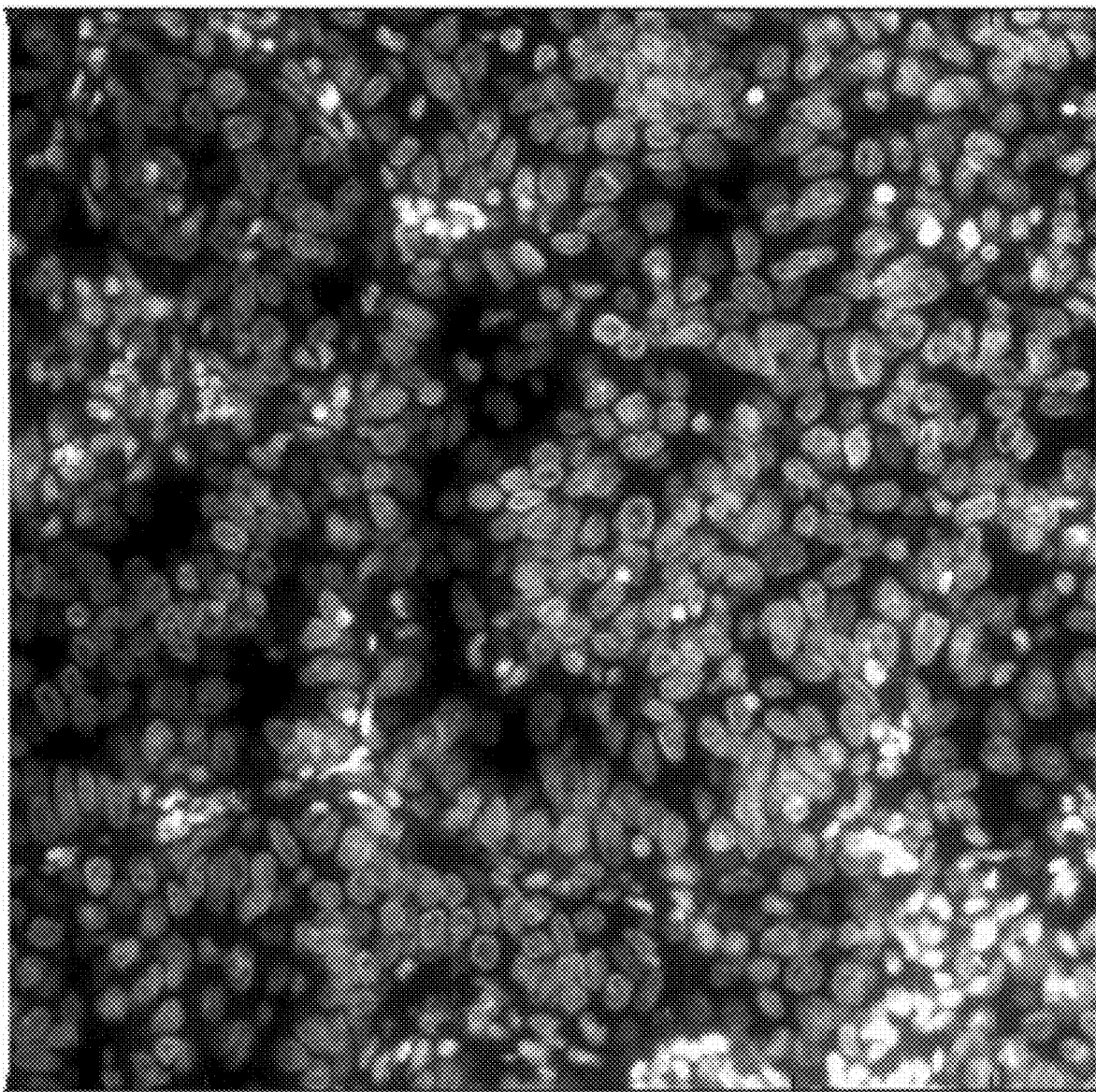
FIG. 9B illustrates the DAPI channel.
Figure 9C:
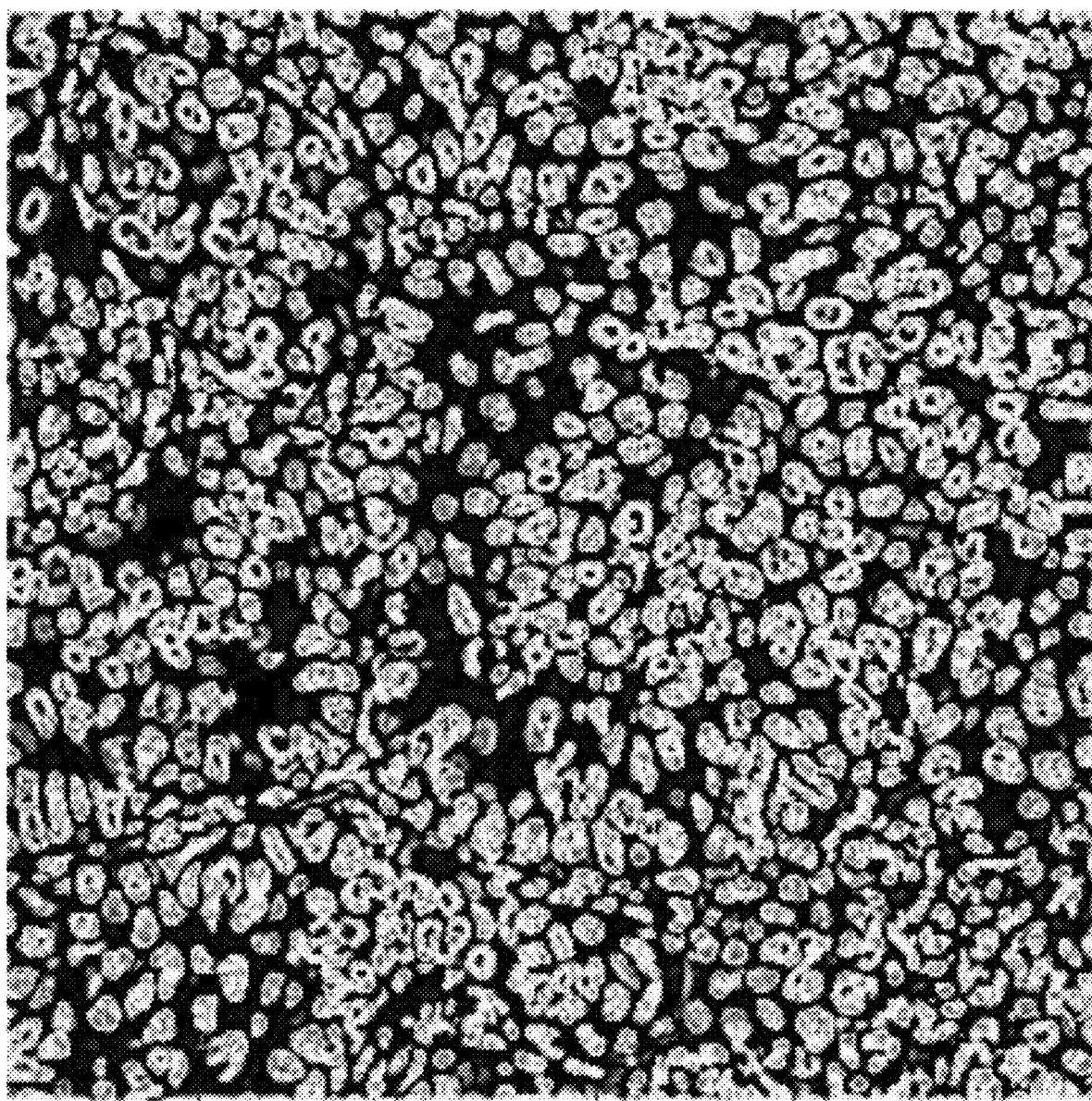
FIG. 9C illustrates the resulting enhanced image after the Frangi filter is applied (at scaling factor of 5) to the image of FIG. 9B.
Figure 9D:
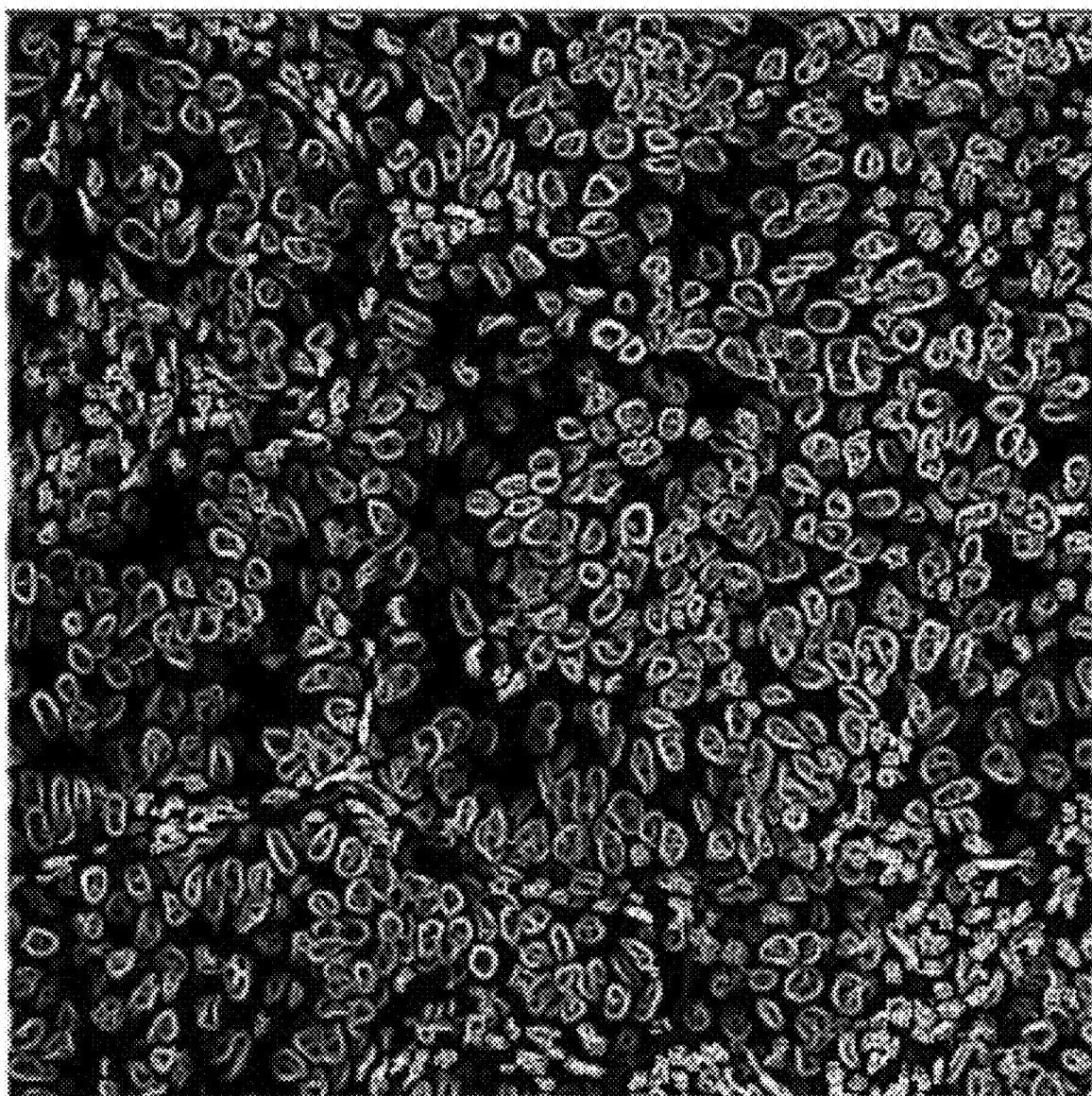
FIG. 9D illustrates the resulting enhanced image after the Frangi filter is applied (at scaling factor of 2) to the image of FIG. 9B.

As an example, FIG. 9A illustrates a 5Plex image, where the Ki67, KRT, PDCD1, DAPI, CD8A, CD3E are represented in false color. In particular, a 6-channel immunofluorescence (IF) panel is used to detect different 5 biomarkers, including the CD3, CD8 and PD1 membrane markers for identifying different types of T-cells (here, cytokeratin is a cytoplasmic marker for identifying the tumor cells; Ki67 is a nucleus marker for identifying the proliferating cells; and finally, DAPI is used to stain all the cell nuclei). This example enables the identification of cells with three different staining patterns, with the strategy of applying the Frangi filter to enhance the membrane, cytoplasm, and nuclear stains separately, and then combine all the generated enhanced boundary defining structures with a DAPI channel image to form a refined image, which may be supplied to the nuclei detection module 206.

Figure 9E:
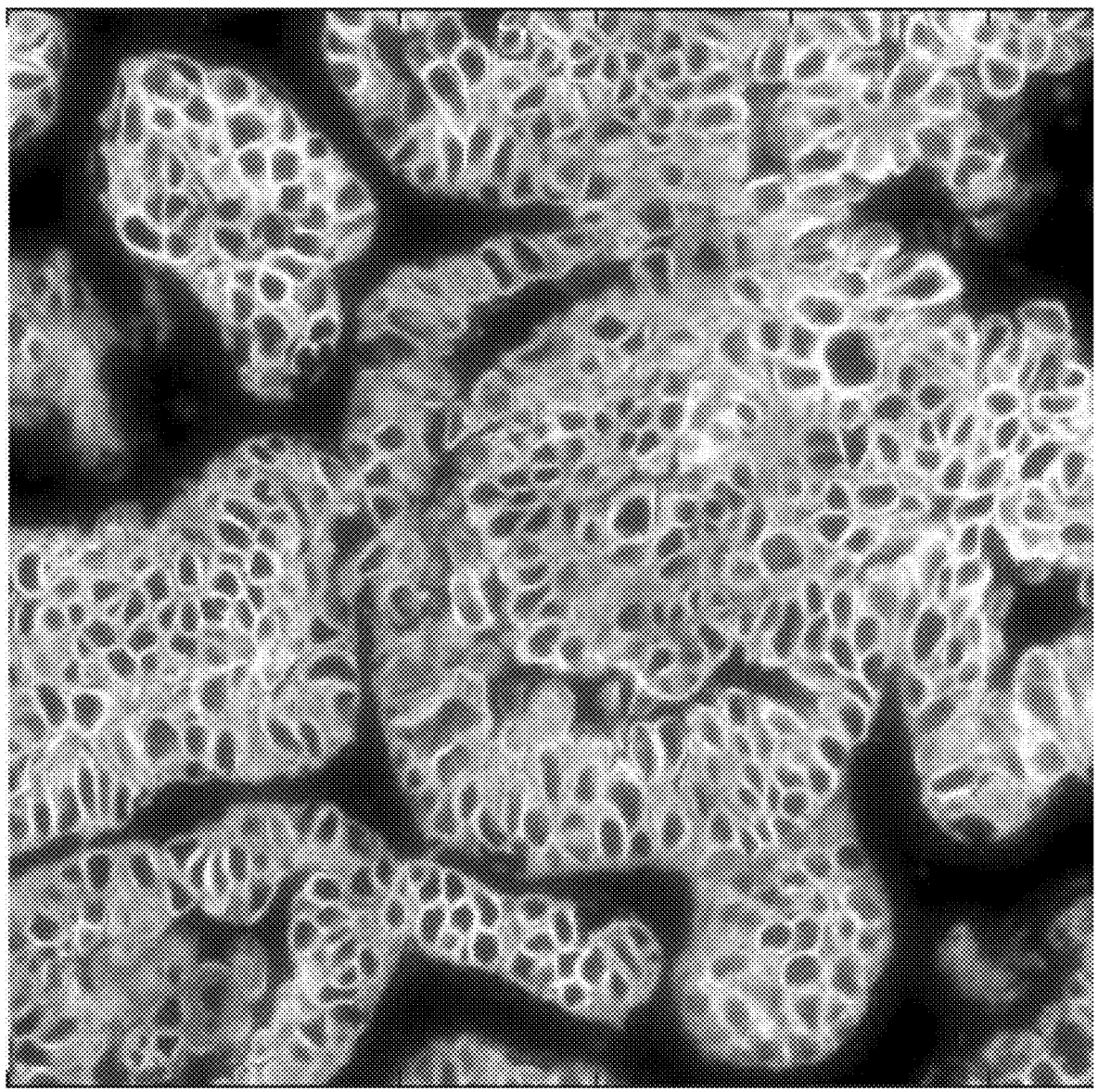
FIG. 9E illustrates a cytokeratin (KRT) image channel image.
Figure 9F:
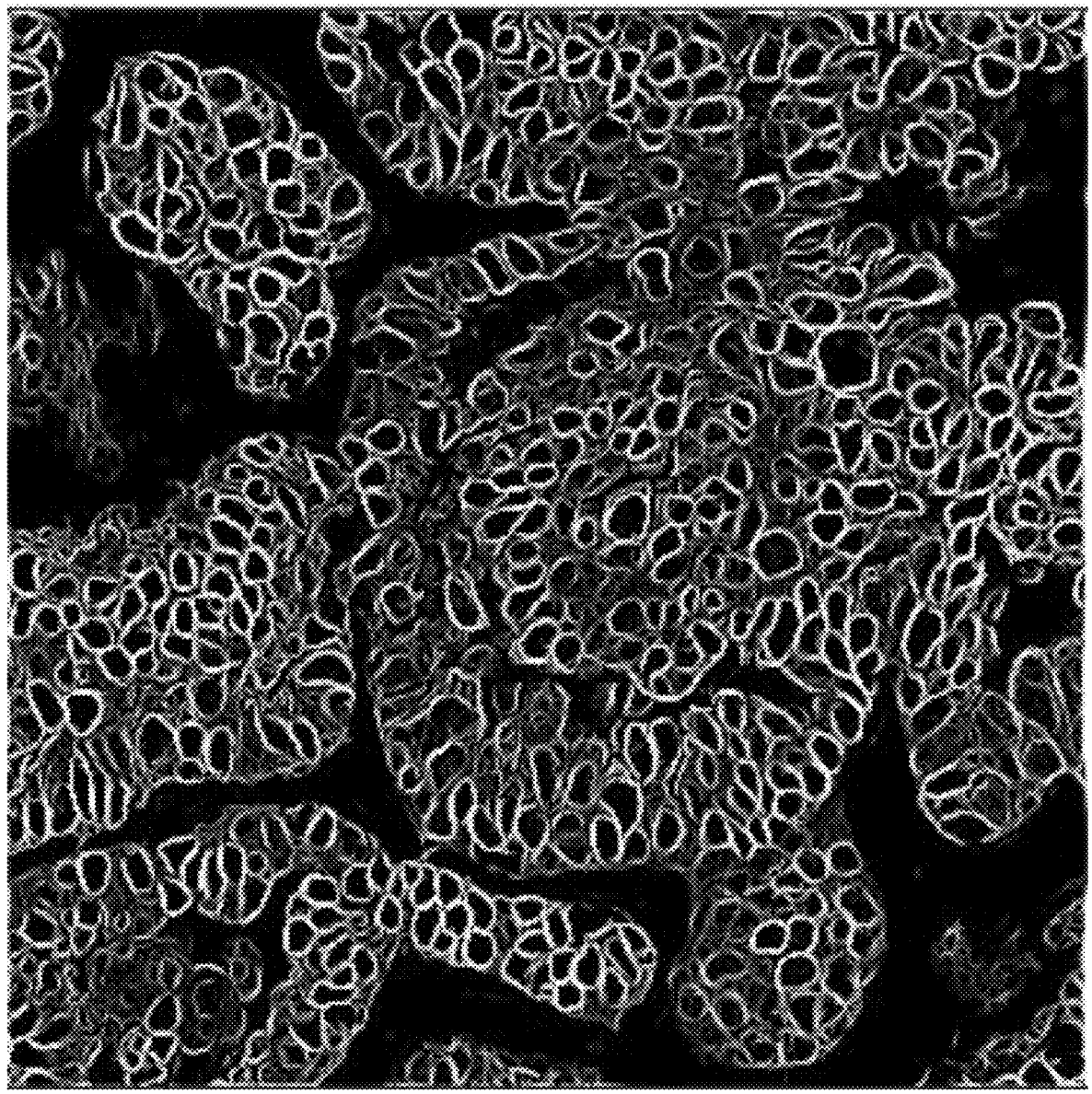
FIG. 9F illustrates the resulting enhanced image after the Frangi filter is applied to the image of FIG. 9E.
Figure 9G:
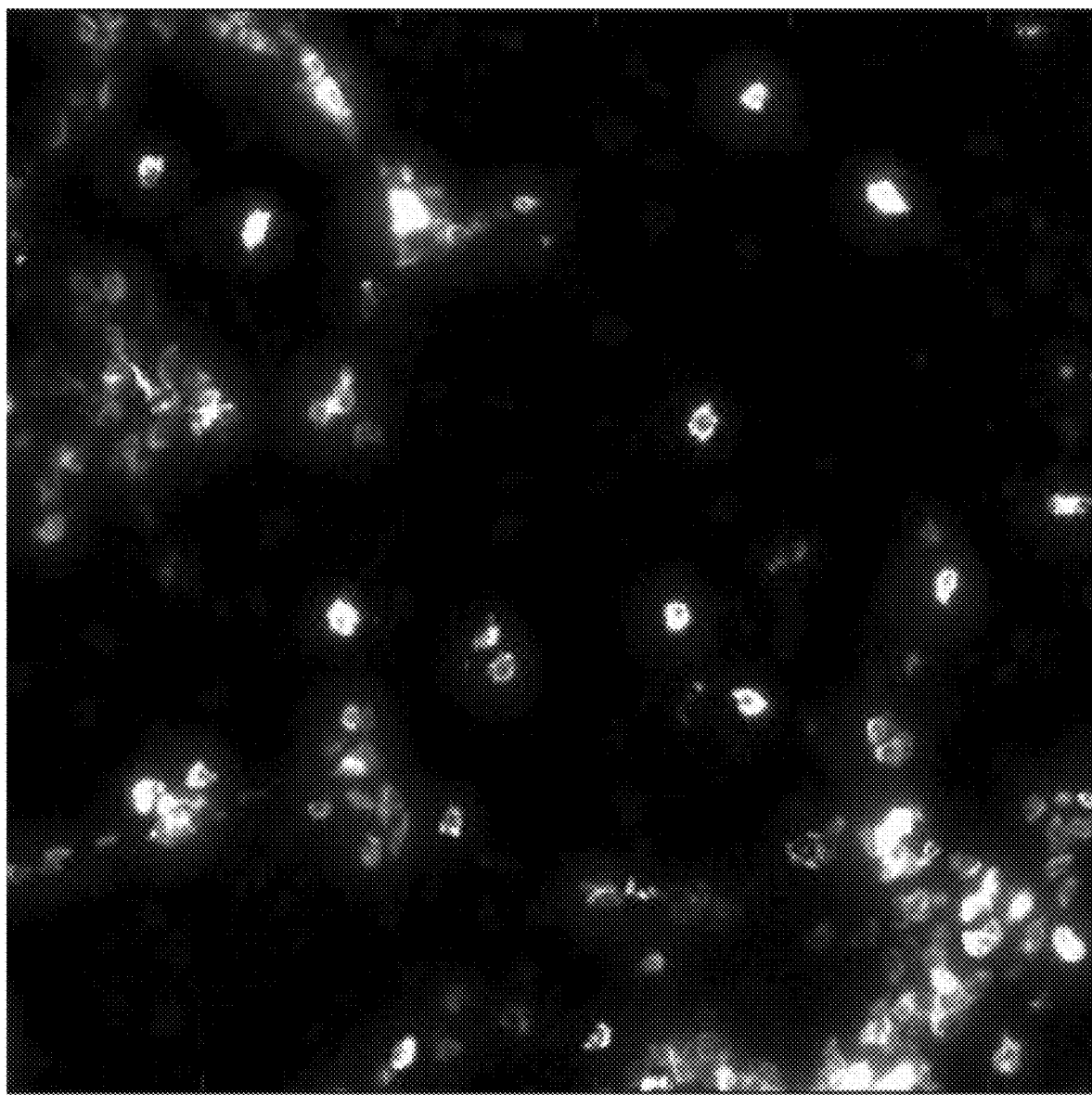
FIG. 9G illustrates the combined images for all T cell stains.
Figure 9H:
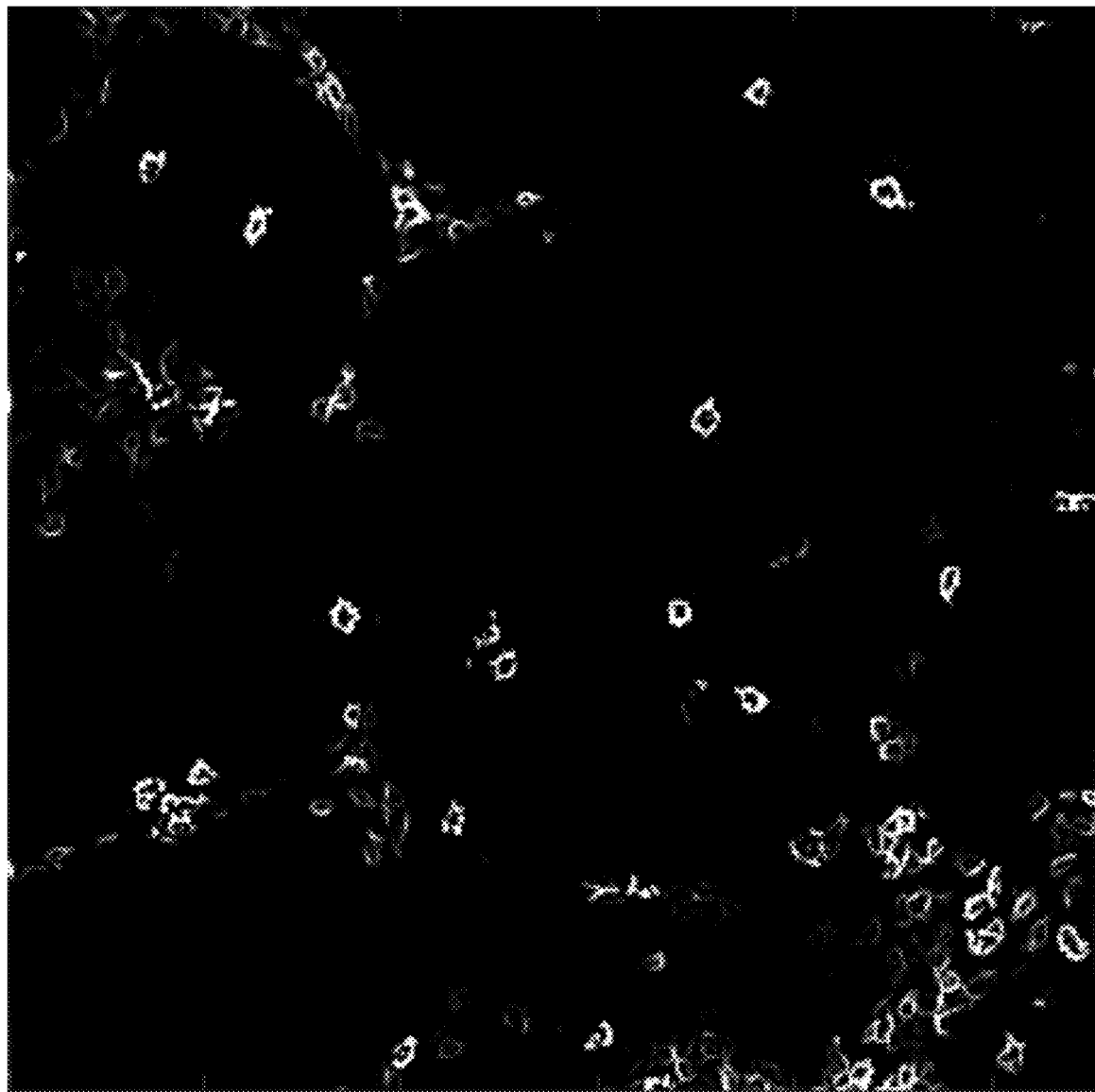
FIG. 9H illustrates the resulting enhanced image after the Frangi filter is applied to the image of FIG. 9G.
Figure 9I:
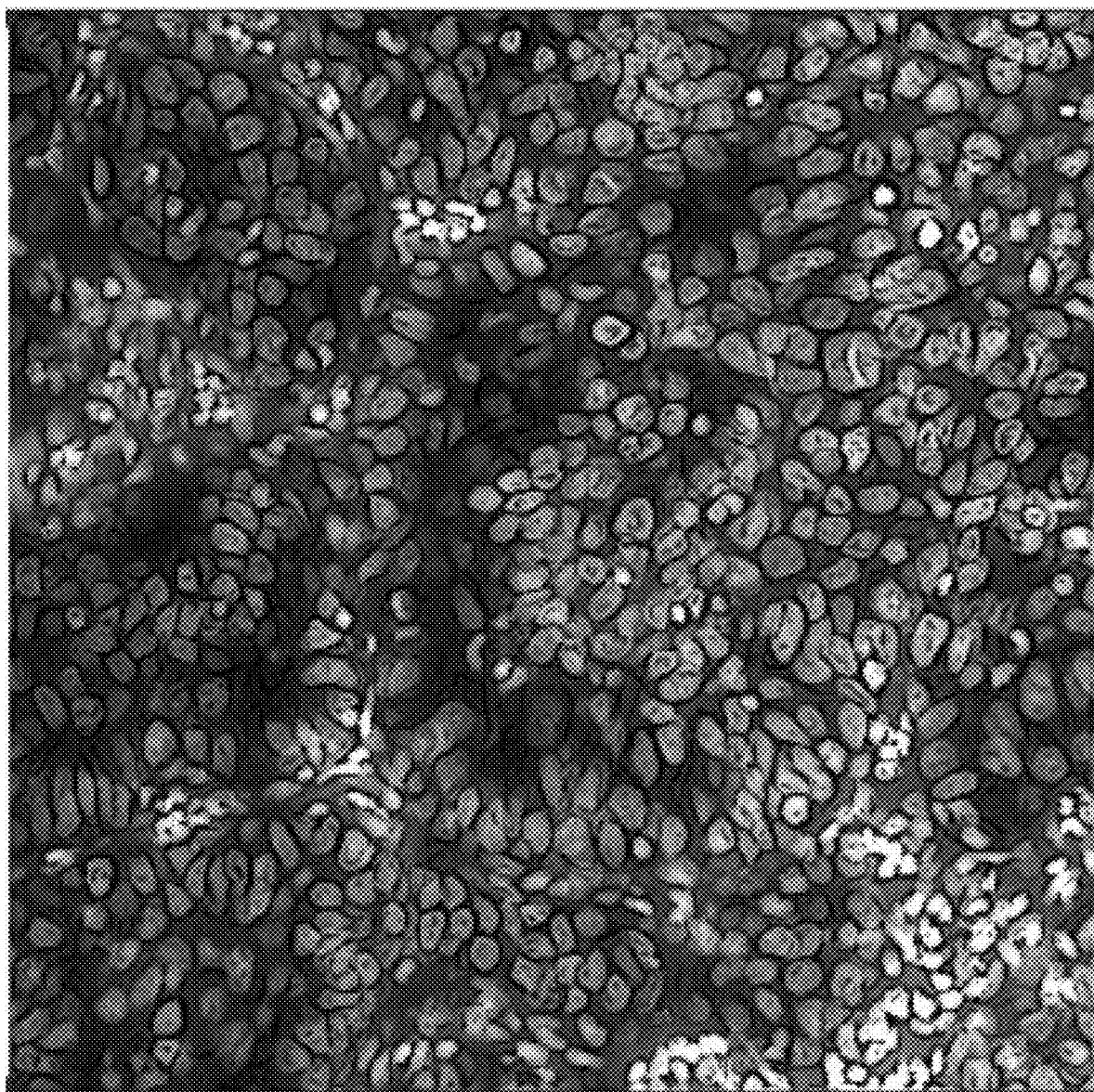
FIG. 9I illustrates a weighted combination image of FIGS. 9D and 9H.
Figure 9J:
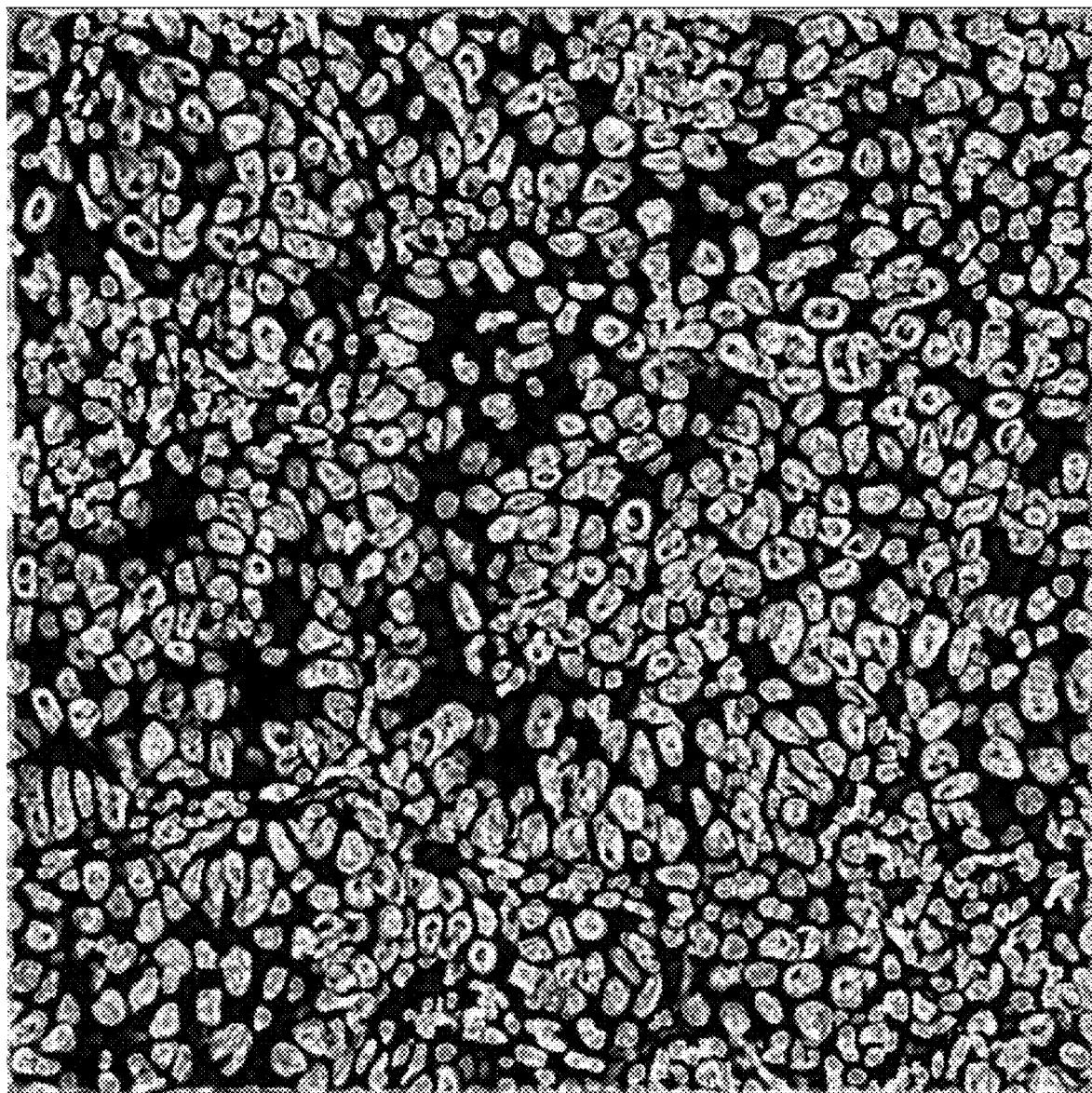
FIG. 9J illustrates a weighted combination image of FIGS. 9C and 9H.

In some embodiments, a Frangi filter is applied to the cytokeratin (KRT) stained image (FIG. 9E) ($I_{Frangi\_Cyto}$) to provide enhanced FIG. 9F. The Frangi filter is also applied to the combination of the PD1, CD8 and CD3 stained image $I_{Tcell}$ (FIG. 9G) using scale=1 micron (see FIG. 9H). The final combination of the image is provided as:

$$I_{Tcell} = \max(I_{CD8}, I_{CD3}, I_{PD1}),$$

$$I_{Frangi} = \max(I_{Frangi+\_Tcell}, I_{Frangi-\_Cyto}, I_{Frangi-\_Ki67})$$

$$I_{Combine2} = I_{DAPI} \cdot (1.0 - I_{Frangi}),$$

where $I_{Tcell}$ is the maximum of all three T-cell marker images; $I_{Frangi+\_Tcell}$, $I_{Frangi-\_Cyto}$, and $I_{Frangi-\_Ki67}$ are the Frangi filter output on $I_{Tcell}$, cytokeratin image $I_{Cyto}$, and Ki67 image $I_{Ki67}$, respectively.

In another embodiment, the DAPI channel (nuclei) is enhanced by a membrane stain and weighted by the DAPI line structure signal (obtained using the Frangi filter at scale=1 micron, represented by $I_{Frangi+\_DAPI(s=1)}$) to avoid suppressing the DAPI signal on nuclei when there is strong T Cell contributing signal on nuclei.

$$I_{Combine3} = I_{DAPI} \cdot (1 - I_{Frangi+\_DAPI(s=1)}) \cdot (1.0 - I_{Frangi})$$

As an alternative approach, the DAPI image $I_{DAPI}$ may be enhanced by applying a Frangi filter (Frangi+) with a larger scale (e.g. a scale of 3 microns). Compared with applying the Frangi filter (Frangi+) at a smaller scale, applying Frangi filter (Frangi+) at the larger scale results, at least in this particular embodiment, in an improved enhancement of nuclei main bodies. The enhanced nuclei image can then be combined with the enhanced cell boundary defining structure image, as set forth in the formulas below:

$$I_{Combine4} = (I_{Frangi+\_DAPI(s=3)}) \cdot (1.0 - I_{Frangi})$$

or $$I_{Combine5} = (I_{Frangi+\_DAPI(s=3)}) \cdot (1.0 - I_{Frangi+\_DAPI(s=1)}) \cdot (1.0 - I_{Frangi})$$

Figure 9K:
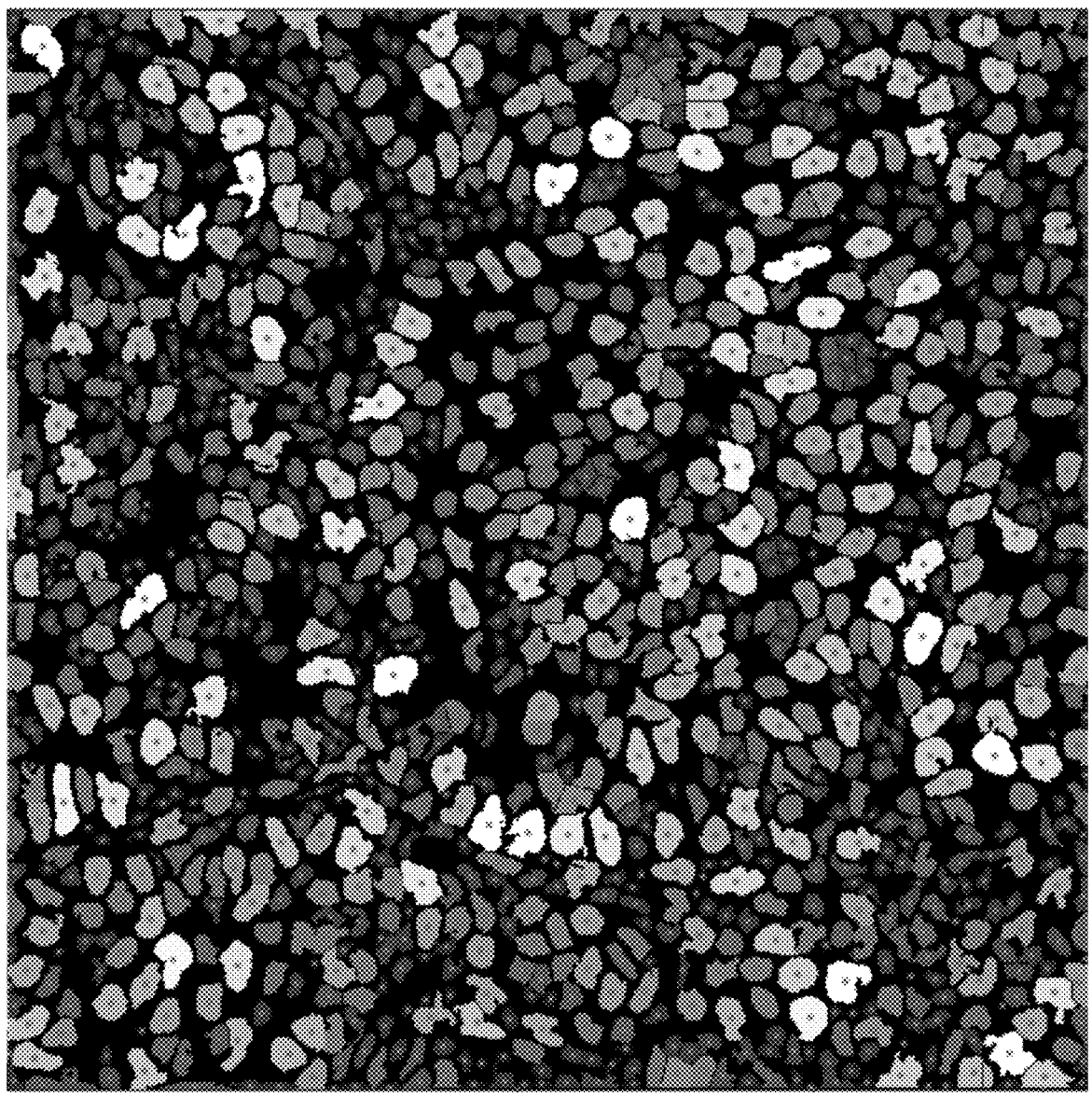
FIG. 9K illustrates a nuclei mask image generated by applying a fixed threshold onto the image of FIG. 9I.
Figure 9L:
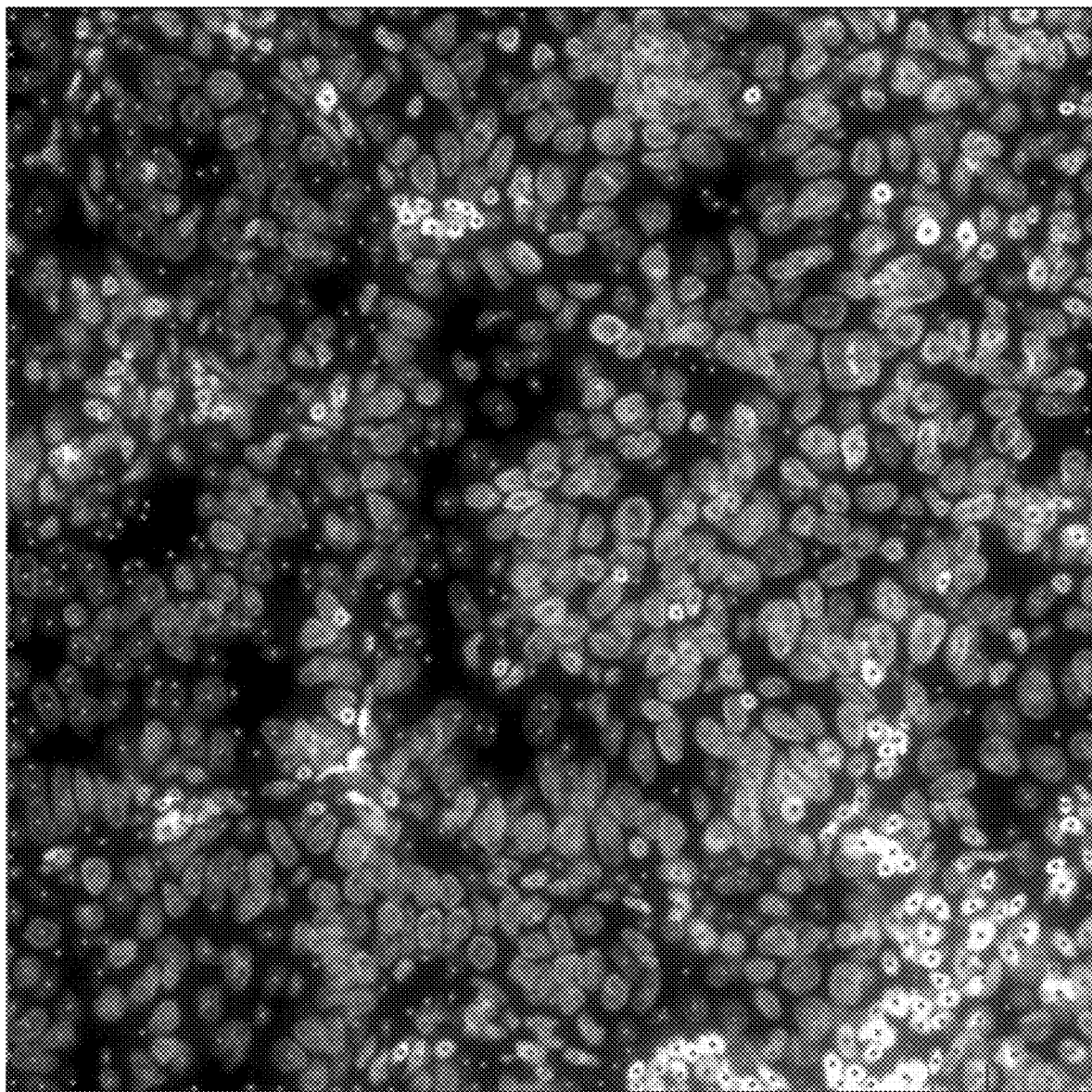
FIG. 9L illustrates the seed detection results on the original DAPI image channel image.

In this particular embodiment, all the cells appear as clearly defined "blobs" with similar contrast to the background. It is believed that this process simplifies the cell detection/segmentation task. FIG. 9K shows that a simple thresholding and connected component analysis can lead to good segmentation results.

Other Components for Practicing Embodiments of the Present Disclosure

The system 200 of the present disclosure may be tied to a specimen processing apparatus that can perform one or more preparation processes on the tissue specimen. The preparation process can include, without limitation, deparaffinizing a specimen, conditioning a specimen (e.g., cell conditioning), staining a specimen, performing antigen retrieval, performing immunohistochemistry staining (including labeling) or other reactions, and/or performing in situ hybridization (e.g., SISH, FISH, etc.) staining (including labeling) or other reactions, as well as other processes for preparing specimens for microscopy, microanalyses, mass spectrometric methods, or other analytical methods.

The processing apparatus can apply fixatives to the specimen. Fixatives can include cross-linking agents (such as aldehydes, e.g., formaldehyde, paraformaldehyde, and glutaraldehyde, as well as non-aldehyde cross-linking agents), oxidizing agents (e.g., metallic ions and complexes, such as osmium tetroxide and chromic acid), protein-denaturing agents (e.g., acetic acid, methanol, and ethanol), fixatives of unknown mechanism (e.g., mercuric chloride, acetone, and picric acid), combination reagents (e.g., Carnoy's fixative, methacarn, Bouin's fluid, B5 fixative, Rossman's fluid, and Gendre's fluid), microwaves, and miscellaneous fixatives (e.g., excluded volume fixation and vapor fixation).

If the specimen is a sample embedded in paraffin, the sample can be deparaffinized using appropriate deparaffinizing fluid(s). After the paraffin is removed, any number of substances can be successively applied to the specimen. The substances can be for pretreatment (e.g., to reverse protein-crosslinking, expose nucleic acids, etc.), denaturation, hybridization, washing (e.g., stringency wash), detection (e.g., link a visual or marker molecule to a probe), amplifying (e.g., amplifying proteins, genes, etc.), counterstaining, coverslipping, or the like.

The specimen processing apparatus can apply a wide range of substances to the specimen. The substances include, without limitation, stains, probes, reagents, rinses, and/or conditioners. The substances can be fluids (e.g., gases, liquids, or gas/liquid mixtures), or the like. The fluids can be solvents (e.g., polar solvents, non-polar solvents, etc.), solutions (e.g., aqueous solutions or other types of solutions), or the like. Reagents can include, without limitation, stains, wetting agents, antibodies (e.g., monoclonal antibodies, polyclonal antibodies, etc.), antigen recovering fluids (e.g., aqueous- or non-aqueous-based antigen retrieval solutions, antigen recovering buffers, etc.), or the like. Probes can be an isolated nucleic acid or an isolated synthetic oligonucleotide, attached to a detectable label or reporter molecule. Labels can include radioactive isotopes, enzyme substrates, co-factors, ligands, chemiluminescent or fluorescent agents, haptens, and enzymes.

The specimen processing apparatus can be an automated apparatus, such as the BENCHMARK XT instrument and SYMPHONY instrument sold by Ventana Medical Systems, Inc. Ventana Medical Systems, Inc. is the assignee of a number of United States patents disclosing systems and methods for performing automated analyses, including U.S. Pat. Nos. 5,650,327, 5,654,200, 6,296,809, 6,352,861, 6,827,901 and 6,943,029, and U.S. Published Patent Application Nos. 20030211630 and 20040052685, each of which is incorporated herein by reference in its entirety. Alternatively, specimens can be manually processed.

After the specimens are processed, a user can transport specimen-bearing slides to the imaging apparatus. In some embodiments, the imaging apparatus is a brightfield imager slide scanner. One brightfield imager is the iScan Coreo brightfield scanner sold by Ventana Medical Systems, Inc. In automated embodiments, the imaging apparatus is a digital pathology device as disclosed in International Patent Application No.: PCT/US2010/002772 (Patent Publication No.: WO/2011/049608) entitled IMAGING SYSTEM AND TECHNIQUES or disclosed in U.S. Patent Application No. 61/533,114, filed on Sep. 9, 2011, entitled IMAGING SYSTEMS, CASSETTES, AND METHODS OF USING THE SAME. International Patent Application No. PCT/US2010/002772 and U.S. Patent Application No. 61/533,114 are incorporated by reference in their entities.

The imaging system or apparatus may be a multispectral imaging (MSI) system or a fluorescent microscopy system. The imaging system used here is an MSI. MSI, generally, equips the analysis of pathology specimens with computerized microscope-based imaging systems by providing access to spectral distribution of an image at a pixel level. While there exists a variety of multispectral imaging systems, an operational aspect that is common to all of these systems is a capability to form a multispectral image. A multispectral image is one that captures image data at specific wavelengths or at specific spectral bandwidths across the electromagnetic spectrum. These wavelengths may be singled out by optical filters or by the use of other instruments capable of selecting a pre-determined spectral component including electromagnetic radiation at wavelengths beyond the range of visible light range, such as, for example, infrared (IR).

An MSI system may include an optical imaging system, a portion of which contains a spectrally-selective system that is tunable to define a pre-determined number N of discrete optical bands. The optical system may be adapted to image a biological sample, illuminated in transmission with a broadband light source onto an optical detector. The optical imaging system, which in one embodiment may include a magnifying system such as, for example, a microscope, has a single optical axis generally spatially aligned with a single optical output of the optical system. The system forms a sequence of images of the tissue as the spectrally selective system is being adjusted or tuned (for example with a computer processor) such as to assure that images are acquired in different discrete spectral bands. The apparatus may additionally contain a display in which appears at least one visually perceivable image of the tissue from the sequence of acquired images. The spectrally-selective system may include an optically-dispersive element such as a diffractive grating, a collection of optical filters such as thin-film interference filters or any other system adapted to select, in response to either a user input or a command of the pre-programmed processor, a particular pass-band from the spectrum of light transmitted from the light source through the sample towards the detector.

An alternative implementation, a spectrally selective system defines several optical outputs corresponding to N discrete spectral bands. This type of system intakes the transmitted light output from the optical system and spatially redirects at least a portion of this light output along N spatially different optical paths in such a way as to image the sample in an identified spectral band onto a detector system along an optical path corresponding to this identified spectral band.

Embodiments of the subject matter and the operations described in this specification can be implemented in digital electronic circuitry, or in computer software, firmware, or hardware, including the structures disclosed in this specification and their structural equivalents, or in combinations of one or more of them. Embodiments of the subject matter described in this specification can be implemented as one or more computer programs, i.e., one or more modules of computer program instructions, encoded on computer storage medium for execution by, or to control the operation of, data processing apparatus. Any of the modules described herein may include logic that is executed by the processor(s). "Logic," as used herein, refers to any information having the form of instruction signals and/or data that may be applied to affect the operation of a processor. Software is an example of logic.

A computer storage medium can be, or can be included in, a computer-readable storage device, a computer-readable storage substrate, a random or serial access memory array or device, or a combination of one or more of them. Moreover, while a computer storage medium is not a propagated signal, a computer storage medium can be a source or destination of computer program instructions encoded in an artificially generated propagated signal. The computer storage medium can also be, or can be included in, one or more separate physical components or media (e.g., multiple CDs, disks, or other storage devices). The operations described in this specification can be implemented as operations performed by a data processing apparatus on data stored on one or more computer-readable storage devices or received from other sources.

The term "programmed processor" encompasses all kinds of apparatus, devices, and machines for processing data, including by way of example a programmable microprocessor, a computer, a system on a chip, or multiple ones, or combinations, of the foregoing. The apparatus can include special purpose logic circuitry, e.g., an FPGA (field programmable gate array) or an ASIC (application-specific integrated circuit). The apparatus also can include, in addition to hardware, code that creates an execution environment for the computer program in question, e.g., code that constitutes processor firmware, a protocol stack, a database management system, an operating system, a cross-platform runtime environment, a virtual machine, or a combination of one or more of them. The apparatus and execution environment can realize various different computing model infrastructures, such as web services, distributed computing, and grid computing infrastructures.

A computer program (also known as a program, software, software application, script, or code) can be written in any form of programming language, including compiled or interpreted languages, declarative or procedural languages, and it can be deployed in any form, including as a stand-alone program or as a module, component, subroutine, object, or other unit suitable for use in a computing environment. A computer program may, but need not, correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, subprograms, or portions of code). A computer program can be deployed to be executed on one computer or on multiple computers that are located at one site or distributed across multiple sites and interconnected by a communication network.

The processes and logic flows described in this specification can be performed by one or more programmable processors executing one or more computer programs to perform actions by operating on input data and generating output. The processes and logic flows can also be performed by, and apparatus can also be implemented as, special purpose logic circuitry, e.g., an FPGA (field programmable gate array) or an ASIC (application-specific integrated circuit).

Processors suitable for the execution of a computer program include, by way of example, both general and special purpose microprocessors, and any one or more processors of any kind of digital computer. Generally, a processor will receive instructions and data from a read-only memory or a random-access memory or both. The essential elements of a computer are a processor for performing actions in accordance with instructions and one or more memory devices for storing instructions and data. Generally, a computer will also include, or be operatively coupled to receive data from or transfer data to, or both, one or more mass storage devices for storing data, e.g., magnetic, magneto-optical disks, or optical disks. However, a computer need not have such devices. Moreover, a computer can be embedded in another device, e.g., a mobile telephone, a personal digital assistant (PDA), a mobile audio or video player, a game console, a Global Positioning System (GPS) receiver, or a portable storage device (e.g., a universal serial bus (USB) flash drive), to name just a few. Devices suitable for storing computer program instructions and data include all forms of non-volatile memory, media, and memory devices, including by way of example semiconductor memory devices, e.g., EPROM, EEPROM, and flash memory devices; magnetic disks, e.g., internal hard disks or removable disks; magneto-optical disks; and CD-ROM and DVD-ROM disks. The processor and the memory can be supplemented by, or incorporated in, special purpose logic circuitry.

To provide for interaction with a user, embodiments of the subject matter described in this specification can be implemented on a computer having a display device, e.g., an LCD (liquid crystal display), LED (light emitting diode) display, or OLED (organic light emitting diode) display, for displaying information to the user and a keyboard and a pointing device, e.g., a mouse or a trackball, by which the user can provide input to the computer. In some implementations, a touch screen can be used to display information and receive input from a user. Other kinds of devices can be used to provide for interaction with a user as well; for example, feedback provided to the user can be in any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's client device in response to requests received from the web browser.

Embodiments of the subject matter described in this specification can be implemented in a computing system that includes a back-end component, e.g., as a data server, or that includes a middleware component, e.g., an application server, or that includes a front-end component, e.g., a client computer having a graphical user interface or a Web browser through which a user can interact with an implementation of the subject matter described in this specification, or any combination of one or more such back-end, middleware, or front-end components. The components of the system can be interconnected by any form or medium of digital data communication, e.g., a communication network. Examples of communication networks include a local area network ("LAN") and a wide area network ("WAN"), an internetwork (e.g., the Internet), and peer-to-peer networks (e.g., ad hoc peer-to-peer networks). For example, the network 20 of FIG. 1 can include one or more local area networks.

The computing system can include any number of clients and servers. A client and server are generally remote from each other and typically interact through a communication network. The relationship of client and server arises by virtue of computer programs running on the respective computers and having a client-server relationship to each other. In some embodiments, a server transmits data (e.g., an HTML page) to a client device (e.g., for purposes of displaying data to and receiving user input from a user interacting with the client device). Data generated at the client device (e.g., a result of the user interaction) can be received from the client device at the server.

Additional Embodiments

In another aspect of the present disclosure is a method of enhancing detection of nuclei within a multichannel image, e.g. a multichannel brightfield image, of a biological sample stained with hematoxylin and eosin and/or stained for the presence of one or more biomarkers comprising: unmixing the multichannel image into a plurality of unmixed image channel images, wherein each unmixed image channel image comprises signals corresponding to one of hematoxylin, eosin, or a single biomarker; applying a Frangi filter to at least a first of the unmixed image channel images of the plurality of unmixed image channel images to provide at least a first Frangi enhanced image channel image; generating a first combined image, wherein the first combined image comprises at least (i) the first Frangi enhanced image channel image or a derivative of the first Frangi enhanced image channel image; and (ii) at least one of (a) a second unmixed image channel image, and/or (b) a second Frangi enhanced image channel image; generating a refined image based at least on the first combined image; detecting nuclei in the first refined image using an automated image analysis algorithm. In some embodiments, the refined image is an inverse of the first combination image. In some embodiments, the refined image is a segmentation mask image. In some embodiments, the at least the first Frangi enhanced image channel image is a Frangi enhanced membrane image channel image. In some embodiments, Frangi enhanced membrane image channel image is derived from one or more unmixed membrane image channel images. In some embodiments, the at least the first Frangi enhanced image channel image is a Frangi enhanced nuclear image channel image.

In some embodiments, the at least the first Frangi enhanced image channel image is combined with a second Frangi enhanced image channel image, wherein the at least the first Frangi enhanced image channel image and the second Frangi enhanced image channel image are derived from different unmixed channel images. In some embodiments, the at least the first Frangi enhanced image channel image is combined with a second Frangi enhanced image channel image and a third Frangi enhanced image channel image, wherein the at least the first Frangi enhanced image channel image and one of the second or third Frangi enhanced image channel images are derived from different unmixed channel images. In some embodiments, the at least the first Frangi enhanced image channel image and the second Frangi enhanced image channel image are derived from the same unmixed image channel image, but where the Frangi filter is applied on the same unmixed image channel image at a different scaling factor. In some embodiments, the Frangi filter is applied at a first scaling factor to a first copy of the unmixed image channel image to generate an image channel image enhanced for elongated structures; and wherein the Frangi filter is applied at a second scaling factor to a second copy of the unmixed image channel image to generate an image channel image enhanced for blob-like structures. In some embodiments, the Frangi enhanced membrane image channel image is combined with at least an unmixed nuclear image channel image. In some embodiments, the unmixed nuclear channel and enhanced membrane image channel image is further combined with at least a second enhanced image channel image.

In another aspect of the present disclosure is a system for enhancing detection of cell nuclei within an image of a stained biological sample, wherein the system comprises: (i) one or more processors, and (ii) one or more memories coupled to the one or more processors, the one or more memories to store computer-executable instructions that, when executed by the one or more processors, cause the system to perform operations comprising: obtaining one or more input image channel images, wherein each obtained input image channel image comprises signals corresponding to one of a membrane stain or a nuclear stain; enhancing the membrane stain or the nuclear stain in a first of the one or more obtained input channel images by applying a filter adapted to enhance boundary structures to the first of the one or more obtained input channel images to provide a first enhanced image; generating a combination image based at least upon the first enhanced image; and detecting nuclei within the generated combination image or a segmentation mask image derived from the generated combination image.

In some embodiments, the combination image is generated by computing a summation of the first enhanced image or a further processed variant thereof and at least a second image. In some embodiments, the second image is a second of the one or more obtained input channel images. In some embodiments, the first of the one or more obtained input channel images comprises a membrane stain, and wherein the second of the one or more obtained input channel images comprises a nuclear stain. In some embodiments, the combination image is derived from an inverse of the first enhanced image.

In another aspect of the present disclosure is a method of enhancing the detection of cell nuclei within an image of a stained biological sample comprising: obtaining one or more input image channel images, wherein each obtained input image channel image comprises signals corresponding to one of a membrane stain or a nuclear stain; enhancing the membrane stain or the nuclear stain in a first of the one or more obtained input channel images by applying a filter adapted to enhance boundary structures to the first of the one or more obtained input channel images to provide a first enhanced image; generating a combination image based at least upon the first enhanced image; and detecting nuclei within the generated combination image or a segmentation mask image derived from the generated combination image.

In some embodiments, the combination image is generated by computing a summation of the first enhanced image or a further processed variant thereof and at least a second image. In some embodiments, the second image is a second of the one or more obtained input channel images. In some embodiments, the first of the one or more obtained input channel images comprises a membrane stain, and wherein the second of the one or more obtained input channel images comprises a nuclear stain. In some embodiments, the combination image is derived from an inverse of the first enhanced image.

In another aspect of the present disclosure is a method of enhancing the detection of cell nuclei within an image of a stained biological sample comprising: (a) obtaining one or more input image channel images, wherein each obtained input image channel image comprises signals corresponding to one of a membrane stain or a nuclear stain; (b) enhancing the membrane stain or the nuclear stain in a first of the one or more obtained input channel images by applying a Frangi filter to the first of the one or more obtained input channel images to provide a first enhanced image; (c) generating a refined image based at least on the first enhanced image, and (d) automatically detecting nuclei within the generated refined image, wherein the nuclei are detected by applying an automatic nuclei detection algorithm. In some embodiments, the detected nuclei are then superimposed, i.e. visualized, over an original whole slide image or any portion thereof. In some embodiments, the membrane stain is DAB and the nuclear stain is hematoxylin. In some embodiments, the nuclear stain is DAPI. In some embodiments, the obtained input channel images are unmixed brightfield images. In some embodiments, the obtained input channel images are darkfield images.

In some embodiments, the refined image is a segmentation mask image. In some embodiments, the segmentation mask image is derived from a combination image, the combination image being generated from at least the first enhanced image and a second image, whereby the at least the first enhanced image and the second image are combined in an additive manner or in a weighted manner. In some embodiments, the combination image is derived from at least first and second enhanced images, such as a combination of membrane enhanced images and nuclear stain enhanced images.

In some embodiments, the refined image is a combination image which is derived from at least the first enhanced image and a second image, e.g. a second enhanced image, another obtained input image or further processed variant thereof. In some embodiments, the first and second images are combined in an additive manner, i.e. they are summed together. In some embodiments, the first enhanced image is further processed prior to the generation of the combination image. In some embodiments, further processing of the first enhanced image comprises generating an inverse of the first enhanced image.

In another aspect of the present disclosure is a method of enhancing detection of cell nuclei within an image of a stained biological sample, wherein the system comprises: (i) one or more processors, and (ii) one or more memories coupled to the one or more processors, the one or more memories to store computer-executable instructions that, when executed by the one or more processors, cause the system to perform operations comprising: obtaining one or more input image channel images, wherein each obtained input image channel image comprises signals corresponding to one of a membrane stain or a nuclear stain; enhancing the membrane stain or the nuclear stain in a first of the one or more obtained input channel images by applying a Frangi filter to the first of the one or more obtained input channel images to provide a first enhanced image; generating a refined image based at least upon the first enhanced image; and detecting nuclei within the refined image. In some embodiments, the refined image is generated by thresholding the first enhanced image. In some embodiments, the refined image is generated by combining the first enhanced image with at least a second image to provide a combined image. In some embodiments, the refined image is generated by: (i) combining the first enhanced image with at least a second image to provide a combined image; and (ii) thresholding the combined image. In some embodiments, the second image is a second of the one or more input channel images. In some embodiments, the second image is a second enhanced image. In some embodiments, any combination image may be derived from three or more images, including any combination of original input image channel images or enhanced images.

In another aspect of the present disclosure is a system of enhancing detection of cell nuclei within an image of a stained biological sample, wherein the system comprises: (i) one or more processors, and (ii) one or more memories coupled to the one or more processors, the one or more memories to store computer-executable instructions that, when executed by the one or more processors, cause the system to perform operations comprising: (a) obtaining at least one input channel image comprising signals corresponding to a nuclear stain; (b) enhancing the nuclear stain in the at least one obtained input channel image comprising signals corresponding to the nuclear stain by applying a Frangi filter to the at least one obtained input channel image comprising signals corresponding to the nuclear stain to provide a first enhanced image; (c) generating a refined image from at least the first enhanced image; and (d) automatically detecting nuclei within the generated refined image, wherein the nuclei are detected by applying an automatic nuclei detection algorithm. In some embodiments, the method further comprises: obtaining at least one input channel image comprising signals correspond to a membrane stain; enhancing the membrane stain in the at least one obtained input channel image comprising signals corresponding to the membrane stain by applying a Frangi filter to the at least one obtained input channel image comprising signals corresponding to the membrane stain to provide a second enhanced image. In some embodiments, at least the first and second enhanced images are combined, such as in an additive or weighted manner, to provide the refined image. In some embodiments, the combination image may be used to detect nuclei; or, alternatively, a threshold may be applied to the combination image and the resulting segmentation mask image may be used to detect nuclei.

In another aspect of the present disclosure is a system of enhancing detection of cell nuclei within an image of a stained biological sample, wherein the system comprises: (i) one or more processors, and (ii) one or more memories coupled to the one or more processors, the one or more memories to store computer-executable instructions that, when executed by the one or more processors, cause the system to perform operations comprising: (a) obtaining at least one input channel image comprising signals corresponding to a membrane stain; (b) enhancing the membrane stain in the at least one obtained input channel image comprising signals corresponding to the membrane stain by applying a Frangi filter to the at least one obtained input channel image comprising signals corresponding to the membrane stain to provide a first enhanced image; (c) generating a refined image from at least the first enhanced image; and (d) automatically detecting nuclei within the generated refined image, wherein the nuclei are detected by applying an automatic nuclei detection algorithm. In some embodiments, the refined image is a combination image comprising: (i) a further processed variant of the first enhanced image, and (ii) a second obtained input channel image, the second obtained image channel image comprising signals corresponding to a nuclear stain. In some embodiments, the further processed variant of the first enhanced image is an inverse of the first enhanced image. In some embodiments, the other obtained input channel image comprises signals corresponding to hematoxylin.

In another aspect of the present disclosure is a system of enhancing detection of cell nuclei within an image of a biological sample stained with hematoxylin and eosin and/or stained for the presence of a plurality of biomarkers, wherein the system comprises: (i) one or more processors, and (ii) one or more memories coupled to the one or more processors, the one or more memories to store computer-executable instructions that, when executed by the one or more processors, cause the system to perform operations comprising: comprising: obtaining one or more input image channel images, wherein each obtained input image channel image comprises signals corresponding to one of hematoxylin, DAPI, or a stain indicative of the presence of a biomarker; enhancing boundary structures within at least a first of the one or more input image channel images by applying a Frangi filter to the at least the first of the one or more image channel images to provide at least a first Frangi enhanced image channel image; and detecting nuclei within a refined image derived from the at least one Frangi enhanced image channel.

In some embodiments, the refined image is a segmentation mask image. In some embodiments, the segmentation mask image is generated by thresholding the at least the first Frangi enhanced image channel image. In some embodiments, the segmentation mask image is generated by thresholding a combination image derived from the at least the first Frangi enhanced image channel image. In some embodiments, the combination image is derived by combining (i) the at least the first Frangi enhanced image channel image; and (ii) at least one of (a) a second of the one or more input image channel images, and/or (b) a second Frangi enhanced image channel image. In some embodiments, the combination image comprises a combination of the at least the first Frangi enhanced image channel image and the second Frangi enhanced image channel image. In some embodiments, the first Frangi enhanced image channel image and the second Frangi enhanced image channel images are derived from different input image channel images. In some embodiments, the first Frangi enhanced image channel image and the second Frangi enhanced image channel image are derived from the same input image channel image. In some embodiments, the first and second Frangi enhanced image channel images are derived by applying the Frangi filter at a different scaling factor. In some embodiments, one of the first or second Frangi enhanced image channel images comprise enhanced membrane boundaries; and another of the first or second Frangi enhanced image channel images comprise enhanced nuclear boundaries. In some embodiments, the combination image comprises a combination of the at least the first Frangi enhanced image channel image, the second Frangi enhanced image channel image, and a third Frangi enhanced image channel image, wherein at least two of the first, second, or third Frangi enhanced image channel images are derived from different input channel images.

In some embodiments, the refined image is a combination image derived by combining (i) an inverse of the first Frangi enhanced image channel image; and (ii) a second of the one or more input channel images. In some embodiments, the combination image is derived by combining (i) the at least the first Frangi enhanced image channel image; and (ii) at least one of (a) a second of the one or more input image channel images, and/or (b) a second Frangi enhanced image channel image.

All of the U.S. patents, U.S. patent application publications, U.S. patent applications, foreign patents, foreign patent applications and non-patent publications referred to in this specification and/or listed in the Application Data Sheet are incorporated herein by reference, in their entirety. Aspects of the embodiments can be modified, if necessary, to employ concepts of the various patents, applications, and publications to provide yet further embodiments.

Although the present disclosure has been described with reference to a number of illustrative embodiments, it should be understood that numerous other modifications and embodiments can be devised by those skilled in the art that will fall within the spirit and scope of the principles of this disclosure. More particularly, reasonable variations and modifications are possible in the component parts and/or arrangements of the subject combination arrangement within the scope of the foregoing disclosure, the drawings, and the appended claims without departing from the spirit of the disclosure. In addition to variations and modifications in the component parts and/or arrangements, alternative uses will also be apparent to those skilled in the art.

The invention claimed is:

1. A method of enhancing the detection of cell nuclei within a whole slide image of a stained biological sample comprising:
   (a) obtaining one or more input image channel images, wherein each obtained input channel image comprises signals corresponding to the presence of a nuclear biomarker stain or a membrane biomarker stain;
   (b) enhancing the membrane biomarker stain or the nuclear biomarker stain in a first of the one or more obtained input channel images by applying at least a boundary structure enhancing filter to the first of the one or more obtained input channel images to provide a first enhanced image; and
   (c) generating a refined image based at least upon the first enhanced image.

2. The method of claim 1, further comprising detecting nuclei within the generated refined image.

3. The method of claim 2, further comprising superimposing the detected nuclei over the whole slide image of the stained biological sample.

4. The method of claim 3, wherein the second image is a second of the one or more obtained input channel images.

5. The method of claim 4, wherein the nuclear biomarker stain is hematoxylin.

6. The method of claim 4, wherein the membrane biomarker stain identifies one or more lymphocyte biomarkers.

7. The method of claim 1, wherein the refined image is generated by computing a summation of the first enhanced image or a further processed variant image thereof and at least a second image.

8. The method of claim 7, wherein the first of the one or more obtained input channel images comprises signals corresponding to the membrane biomarker stain, and wherein the second of the one or more obtained input channel images comprises signals corresponding to the nuclear biomarker stain.

9. The method of claim 7, wherein the further processed variant image is an inverse of the first enhanced image.

10. The method of claim 1, wherein the refined image is a combination of the first enhanced image and a second enhanced image, wherein the second enhanced image is generated by applying the at least the boundary structure enhancing filter to a second of the one or more obtained input channel images.

11. The method of claim 10, wherein the first of the one or more obtained input channel images comprises signals corresponding to the presence of the nuclear biomarker stain; and wherein the second of the one or more obtained input channel images comprise signals corresponding to the presence of the membrane biomarker stain.

12. The method of claim 10, wherein the combination of the first enhanced image and the second enhanced image is weighted.

13. The method of claim 10, wherein the refined image further comprises a third enhanced image derived from a third of the one or more obtained input channel images.

14. The method of claim 1, wherein the biological sample is stained in a darkfield multiplex immunohistochemical assay.

15. The method of claim 1, wherein the biological sample is stained in a brightfield multiplex immunohistochemical assay.

16. A method of enhancing detection of cell nuclei within an image of a stained biological sample comprising:
(a) obtaining one or more unmixed image channel images from a whole slide image stained for the presence of at least one nuclear stain and for at least one membrane stain, wherein each obtained unmixed image channel image comprises signals corresponding to the at least one membrane stain or the at least one nuclear stain;
(b) enhancing the signals corresponding to the at least one membrane stain or the at least one nuclear stain in a first of the one or more obtained unmixed image channel images by applying a Frangi filter at a first scaling factor to the first of the one or more obtained unmixed image channel images to provide a first enhanced image; and
(c) generating a refined image, wherein the refined image is generated by combining the first enhanced image with at least a second enhanced image, wherein the second enhanced image is derived from the first of the one or more input channel images, and wherein the second enhanced image is generated by applying the Frangi filter at a second scaling factor to the first of the one or more input channel images, wherein the second scaling factor is different from the first scaling factor.

17. The method of claim 16, further comprising detecting nuclei within the generated refined image.

18. The method of claim 17, further comprising superimposing seed points representing the detected nuclei over the whole slide image.

19. The method of claim 16, wherein the refined image further comprises a third image, wherein the third image is derived from a second of the one or more unmixed image channel images, and wherein the third image is an enhanced image generated by applying the Frangi filter to the second of the one or more unmixed image channel images.

20. The method of claim 16, wherein the second of the one or more unmixed image channel images is different than the first of the one or more unmixed image channel images.

* * * * *